United States Patent
Adragna

(10) Patent No.: US 11,387,739 B2
(45) Date of Patent: Jul. 12, 2022

(54) DRIVER CIRCUIT FOR A RESONANT CONVERTER, RELATED INTEGRATED CIRCUIT, ELECTRONIC CONVERTER AND METHOD

(71) Applicant: STMicroelectronics S.r.l., Agrate Brianza (IT)

(72) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/006,022

(22) Filed: Aug. 28, 2020

(65) Prior Publication Data

US 2021/0067046 A1    Mar. 4, 2021

(30) Foreign Application Priority Data

Aug. 29, 2019   (IT) .................. 102019000015237

(51) Int. Cl.
*H02M 3/335* (2006.01)
*H02M 1/08* (2006.01)
*H02M 3/00* (2006.01)
*H02M 1/00* (2006.01)

(52) U.S. Cl.
CPC ......... *H02M 3/33569* (2013.01); *H02M 1/08* (2013.01); *H02M 3/01* (2021.05); *H02M 1/0009* (2021.05)

(58) Field of Classification Search
CPC ...... H02M 3/01; H02M 3/33569; H02M 1/08; H02M 1/0009; H02M 1/0025; H02M 1/0058; H02M 1/0064; H02M 3/3376; Y02B 70/10
See application file for complete search history.

(56) References Cited

U.S. PATENT DOCUMENTS

| | | | |
|---|---|---|---|
| 4,477,867 A | 10/1984 | Pellegrino | |
| 5,615,093 A * | 3/1997 | Nalbant | H02M 3/3376 363/25 |
| 7,545,369 B1 * | 6/2009 | Lan | G09G 3/3406 315/209 R |
| 8,773,872 B2 | 7/2014 | Adragna | |
| 2003/0132211 A1 * | 7/2003 | Aigner | B23K 9/1056 219/130.21 |

(Continued)

*Primary Examiner* — Kyle J Moody
(74) *Attorney, Agent, or Firm* — Seed Intellectual Property Law Group LLP

(57) ABSTRACT

A driver circuit for a resonant converter includes a comparator that generates a first control signal indicating when a resonant current changes sign. A first ramp generator circuit outputs a first ramp signal, and a comparison circuit determines whether the first ramp signal reaches a reference threshold. The driver circuit drives a half-bridge via drive signals during consecutive first second switching semi-periods, each of which ends when the comparison circuit indicates the first ramp signal has reached a reference threshold. A control circuit generates in each of the first and the second switching semi-periods control signals indicating a first interval and a second interval. A correction circuit modifies the first ramp signal to have a first gradient value during the first interval and a second gradient value during the second interval. Alternatively, the correction circuit modifies a reference threshold by adding a second ramp signal to an initial threshold value.

20 Claims, 23 Drawing Sheets

(56) References Cited

U.S. PATENT DOCUMENTS

2012/0069605 A1* 3/2012 Choi ................. H02M 3/337
  363/21.02
2018/0152111 A1  5/2018 Tschirhart et al.

* cited by examiner

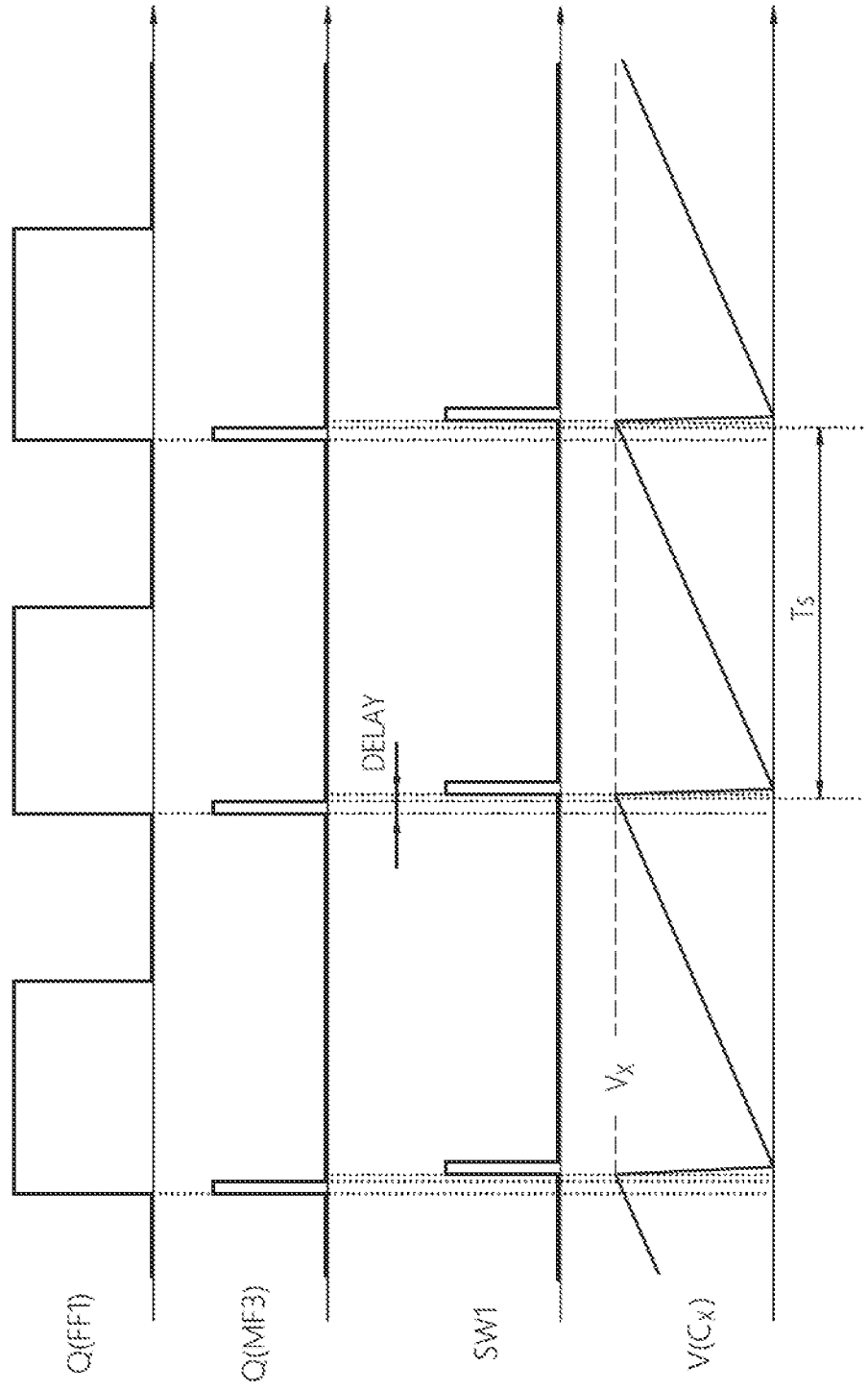

DRIVER CIRCUIT FOR A RESONANT CONVERTER, RELATED INTEGRATED CIRCUIT, ELECTRONIC CONVERTER AND METHOD

BACKGROUND

Technical Field

The embodiments of the present description refer to a control device of a switching resonant converter.

Description of the Related Art

Resonant converters are a wide range of switching converters characterized by the presence of a resonant circuit playing an active role in determining the input-output power flow. Considering the most common implementations, in these converters, a full-bridge (or half bridge) consisting of four (or two) power switches (typically power Field Effect Transistors, FET, such as Metal-Oxide-Semiconductor Field-Effect Transistors, MOSFET), supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave.

As a result, the circulating power may be modulated by changing the frequency of the square wave, while holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide DC power to a load. In offline applications, to comply with safety regulations, the rectification and filtering system supplying the load is coupled often to the resonant circuit by a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Presently, among the many types of resonant converters, the so-called LLC resonant converter is widely used, especially in the half bridge version thereof. The designation LLC comes from the resonant circuit employing two inductors (L) and a capacitor (C).

FIG. 1 shows an example of an LLC resonant converter 20. In general, an electronic converter 20 comprises:
  a positive input terminal 200a and a negative input terminal 200b for receiving a DC input voltage Vin; and
  a positive output terminal 202a and a negative output terminal 202b for providing a regulated (DC) output voltage Vout or output current Iout.

For example, the input voltage Vin may be provided by a DC voltage generator 10, such as a battery. However, the input voltage Vin may also be obtained from an AC voltage, e.g., by means of a rectifier circuit, such as a bridge rectifier, and an optional filter circuit, such as a capacitor. Conversely, the regulated output voltage Vout or output current Iout may be used to supply a load 30.

In the example considered, the electronic converter 20 comprises a half bridge comprising two electronic switches SW1 and SW2, such as FET, such as n-channel FET, e.g., NMOS, connected (e.g., directly) in series between the input terminals 200a and 200b, wherein the negative input terminal 200b usually represents a first ground GND1. For example, in the example considered, the drain terminal of the transistor SW1 is connected directly to the terminal 200a, the source terminal of the transistor SW1 is connected directly to the drain terminal of the transistor SW2 and the source terminal of the transistor SW2 is connected directly to the terminal 200b.

Accordingly, the half-bridge SW1, SW2 is supplied via the input voltage Vin and the intermediate node between the electronic switches SW1 and SW2 (e.g., the drain terminal of the transistor SW1) represents a switching node HB.

In the example considered, the control terminals, e.g., the gate terminals of respective FETs, of the electronic switches SW1 and SW2 are driven via a driver circuit 210, which is configured to generate respective drive signals HSGD and LSGD for the electronic switches SW1 and SW2.

Typically, the driver circuit 210 is configured to generate the drive signals HSGD and LSGD in order to repeat the following four phases for each switching cycle:
  during a first time-interval, closing the first electronic switch SW1 and opening the second electronic switch SW2, whereby the switching node HB is connected to the positive input node 200a, i.e., the input voltage Vin;
  during a second time-interval, opening both the first and the second electronic switch SW1/SW2;
  during a third time-interval, opening the first electronic switch SW1 and closing the second electronic switch SW2, whereby the switching node HB is connected to the negative input node 200a, e.g., ground GND1; and
  during a fourth time-interval, opening both the first and the second electronic switch SW1/SW2.

In the example considered, the switching node HB between the electronic switches SW1 and SW2 is connected to a (resonant) circuit block.

Specifically, in the example considered, this circuit comprises a transformer T comprising a primary winding T1 and a central tapped secondary winding comprising a first secondary winding T2a and a second secondary winding T2b connected in series.

In the example considered, the primary winding T1 of the transformer T is connected (e.g., directly) with a capacitor Cr and a first inductance Ls between the switching node HB and the negative terminal 200b. Moreover, a second inductance Lp is connected (e.g., directly) in parallel with the primary winding T1. Thus, in the example considered the capacitor Cr, the first inductance Ls and the second inductance Lp are connected in series (from which derives the naming LLC converter), and the inductance Lp is connected in parallel to the primary winding T1. For example, in FIG. 1, a first terminal of the capacitor Cr is connected (e.g., directly) to the switching node HB, a second terminal of the capacitor Cr is connected (e.g., directly) via the inductance Ls to a first terminal of the primary winding T1 and a second terminal of the primary winding T1 is connected (e.g., directly) to the terminal 200b.

In a real transformer T, anyway, the two windings T1 and T2 are not perfectly coupled, and a transformed T comprises also a leakage inductance and a magnetizing inductance. Substantially, such a leakage inductance may be modelled via an inductance connected in series with the primary winding T1. Conversely, the magnetizing inductance of the transform T (used to model the magnetic flux) may be modelled with an inductance connected in parallel with the primary winding T1. Thus, the inductance Ls may consist in the leakage inductance of the transformer T, may be implemented with an inductor connected in series with the primary winding T1, or may result from both the leakage inductance of the transformer T and such an inductor. Similarly, the inductance Lp may consist in the magnetizing inductance of the transformer T, may be implemented with an inductor connected in parallel with the primary winding T1, or may result from both the magnetizing inductance of the transformer T and such an inductor.

As mentioned before, in FIG. 1 is used a center-tap arrangement on the secondary side, i.e., the secondary winding comprises a first, a second and a center-tap terminal. Specifically, in the example considered, the center-tap terminal is connected (e.g., directly) to one of the output terminals 202a/202b, and the first and second terminal of the secondary winding T2 are connected (e.g., directly) via a respective diode Da and Db to the other output terminal 202a/202b. For example, in the example considered, the center-tap terminal is connected (e.g., directly) to the output terminals 202b, and the first and second terminal of the secondary winding T2 are connected (e.g., directly) to the anodes of respective diodes Da and Db and the cathodes of the diodes Da and Db are connected (e.g., directly) to the terminal 202a. Accordingly, due to the rectification function of the diodes Da and Db, the terminal 202a corresponds to the positive output terminal and the terminal 202b corresponds to the negative output terminal, which usually corresponds to a second ground GND2. However, by inverting the orientation of the diodes Da and Db, the terminal 202b would correspond to the positive output terminal.

In general, also other rectifiers (instead of the diodes Da and Db) may be used between the secondary winding T2 and the output terminals 202a and 202b. For example, the first and second terminal of the secondary winding T2 (which thus may also not comprise a center-tap terminal) may be connected to the output terminals 202a and 202b via a bridge rectifier.

Often, the electronic converter 20 may also comprise an output filter connected between the rectifier and the output terminals 202a and 202b. For example, in FIG. 1 a capacitor Cout is connected (e.g., directly) between the output terminals 202a and 202b.

Resonant converters offer considerable advantages as compared to the traditional switching converters (non-resonant converters, typically PWM—Pulse Width Modulation—controlled), such as waveforms without steep edges, low switching losses in the power switches due to the "soft" switching thereof, high conversion efficiency (>95% is usually reachable), ability to operate at high frequencies, low EMI (Electro Magnetic Interference) generation, and/or high power density (i.e., enabling to build conversion systems capable of handling considerable power levels in a relatively small space).

Thus, in the example considered, the electronic converter provides via the output terminals 202a and 202b a voltage Vout and a current Iout. Often a closed-loop (usually implemented with a negative-feedback control system) keeps thus either the output voltage Vout or the output current Iout of the converter constant upon changing the operating conditions, e.g., variation of the input voltage Vin and/or the output load 30.

For example, FIG. 2 shows an example of a control circuit for a generic half-bride resonant converter 20.

As mentioned before, a half-bridge resonant converter 20 comprises a half-bridge comprising two electronic switches connected in series between the input terminals 200a and 200b of the electronic converter 20. Moreover, the converter 20 comprises a circuit 204 comprising a resonant tank (e.g., capacitor Cr, inductances Ls and Lp, and transformer T), a rectifier circuit (e.g., diodes Da and Db) and an optional filter circuit (e.g., capacitor Cout). Specifically, the circuit 204 is connected on one side to the switching node HB (between the electronic switches SW1 and SW2) and the negative input terminal 200b (or alternatively the positive input terminal 200a) in order to receive a substantially square wave signal, and on the other side to the output terminals 202a and 202b in order to provide an output voltage Vout or output current Iout.

In order to implement a closed loop control, the converter 20 comprises a sensor 212 configured to monitor the output voltage Vout (for a voltage source) or output current Iout (for a current source). For example, in FIG. 2, the converter 20 is configured to provide a regulated voltage. Accordingly, the sensor 212 may be a voltage sensor configured to monitor the output voltage Vout. For example, in FIG. 2 is used a voltage divider comprising two resistors R1 and R2 connected between the terminals 202a and 202b, whereby the voltage sensor provides a measurement signal proportional to the output voltage Vout.

The measurement signal (indicative of the current Iout or voltage Vout) provided by the sensor 212 is provided to an error amplifier configured to generate an error signal Er. For example, the error amplifier may compare the measurement signal with a reference signal, such as a reference voltage Vref, and generate an error signal Er indicative of the difference between the measurement signal and the reference voltage Vref.

In the example considered, the error signal Er is then provided to the driver circuit 210 in order to modify a given control quantity x, wherein the energy transferred during each switching cycle substantially depends on the control quantity x. Generally, the error signal Er may be provided directly to the driver circuit 210 or indirectly, e.g., via an optocoupler 218 (which is usually used in case of isolated electronic converters). Moreover, the error signal Er or a signal indicative of (e.g., proportional to) the error signal Er (e.g., in case an optocoupler 218 is also used) provided to the driver circuit 210 may be any suitable control signal, such as a voltage Vc or a current Ic. Without loss of generality, in the following we will assume that the quantity x is modified as a function of a control current Ic. Moreover, although the current Ic is mainly indicated as being representative of the output voltage Vout of the converter, the current Ic may be representative also of the output current Iout.

Often, the error amplifier is implemented with an operational amplifier 214 receiving at input the measurement signal (e.g., at the inverting/negative input) and the reference signal (e.g., at the non-inverting/positive input). Moreover, the operation amplifier 214 has associated a feedback network 216 connected between the output of the operation amplifier and one of the input terminals (usually the inverting input terminal). For example, the feedback network 216 may comprise components for implementing the error amplifier as a regulator having a proportional (P) component (e.g., via resistor) and/or an integrative (I) component (e.g., via a capacitor). Thus, in general, the feedback network 216 implements a filter of the error amplifier. For example, such a filter 216 may be useful in order to select an appropriate frequency response of the error amplifier, e.g., in order to ensure:

a stable control loop (i.e., that, upon disturbances of the operating conditions of the converter, once the transient caused by the disturbance has subsided, the output parameter Vout/Iout tends to recover a constant steady state;

a good regulation (i.e., the new constant value recovered by the output parameter Voice/out following a disturbance is very close to that preceding the perturbation); and a good dynamic performance (i.e., during the transient following a disturbance, the output parameter Vout/Iout does not excessively deviate from the desired value and the transient itself is short).

The above-mentioned control objectives may be expressed in terms of some characteristic quantities of the transfer function of the control loop, such as the band width, the phase margin, the dc gain. For example, in a DC-DC converter, these objectives may be achieved by modifying the feedback network 216 in order to:

modify on the frequency response of the error amplifier, modifying the gain thereof, and conveniently placing the poles and zeroes of the transfer function thereof (frequency compensation).

As mentioned before, this is often achieved by using a passive feedback network 216 comprising one or more resistances and/or one or more capacitors of appropriate value.

However, in order to determine the frequency compensation needed to obtain the desired features of the transfer function of the control loop, it is desirable to know both the modulator gain, i.e., the gain of the system converting the control current Ic into the control quantity x, and the frequency response of the converter itself to the variations of the control quantity x.

The inventor has observed that the modulator gain usually does not depend on the switching frequency (at least within the range of the relevant frequencies), and is fixed inside the driver circuit 210. Moreover, although DC-DC converters are strongly non-linear systems (because of the switching action), with suitable approximations and under certain assumptions, their frequency response may be described and represented by a transfer function characterized by gain, zeroes and poles. This transfer function essentially depends on the converter topology, i.e., the mutual configuration of the elements handling the power, on its operation mode, i.e., whether, in a switching cycle, there is a continuous current circulation in the magnetic part (Continuous Current Mode, CCM) or not (Discontinuous Current Mode, DCM), and on the control quantity x controlled by the control loop.

For example, in resonant converters, the control quantity x used to control the converter is often directly the switching frequency of the square wave applied to the resonant circuit (Direct Frequency Control, DFC).

The inventor has however observed that this simple control method suffers from a dynamic behavior characterized by a strongly variable DC gain, and a number of poles varying from one to three and with a very mobile position, depending on the operating point. Additionally, the energy transfer strongly depends on the input voltage Vin (resulting e.g., in a poor audio-susceptibility), so that the control loop has to significantly change the operating frequency to compensate said variations, which are hardly unavoidable in converters operated from the power line (insofar as the input voltage Vin may vary due to the variations of the rectified mains voltage), thus implying the need of a high open-loop gain in the relevant frequency range.

All these characteristics make it practically impossible to obtain a dynamic behavior optimized under all operating conditions, and a considerable trade-off between stability, dynamic performance and input ripple rejection is required.

The inventor has observed that a possible remedy to these shortcomings consists of using a driver circuit 210 comprising a control module 220 implementing a control technique known as "Time-shift control" (TSC). The literature teaches that the dynamics of a TSC-controlled converter is that of a low-Q second-order system, i.e., featuring a pair of real poles well separated from one another (at least 5 times). In practice this means that it is possible to achieve excellent dynamic performance with little trade-off against other constraints and with significantly less design effort.

For example, U.S. Pat. No. 8,773,872 B2 discloses two TSC implementations.

In the first implementation (as shown in FIG. 4 of U.S. Pat. No. 8,773,872 B2), TSC is achieved by:

1. alternately charging and discharging a capacitor with a constant current between two voltage levels in the time intervals of a switching cycle when the voltage applied to the resonant tank and the current flowing through it have equal sign, 2. keeping the capacitor voltage constant in the time intervals of a switching cycle when tank voltage and current have opposite sign 3. toggling the half bridge and reversing the charge/discharge phases of the capacitor when the capacitor voltage touches either of the aforementioned voltage levels.

In the second implementation (as shown in FIG. 6 or 9 of U.S. Pat. No. 8,773,872 B2), TSC is achieved by:

1. charging a capacitor with a constant current up to a voltage level in the time interval of a switching half-cycle when the voltage applied to the resonant tank and the current flowing through it have equal sign, 2. keeping the capacitor voltage constant in the time interval of a switching half-cycle when tank voltage and current have opposite sign 3. toggling the half bridge and resetting the capacitor (typically at zero) when the capacitor voltage touches the aforementioned voltage level.

In both implementations, the constant current used to charge (and discharge too in the first implementation) the capacitor is proportional to the control current Ic. Moreover, in both implementations the control module 220 monitors also the current Is flowing from the half-bridge SW1/SW2 into the resonant tank. For example, as mentioned before, the resonant tank may be connected between the switching node HB and the negative terminal 200*b* (or alternatively the positive terminal 200*a*). In this case, a current sensor 222 may be connected in series with the resonant tank. For example, the current sensor 222 may be a shunt resistor (e.g., connected between the resonant tank and the terminal 200*b*, e.g., between the primary winding T1 of the transformer T and the terminal 200*b*) providing a voltage Vs indicative of (e.g., proportional to) the current Is flowing through the resonant tank. Specifically, U.S. Pat. No. 8,773,872 B2 uses a zero-current comparator in order to detect the sign of the current Is in the resonant tank. For example, in U.S. Pat. No. 8,773,872 B2 is used a comparator (reference sign CO1 in document U.S. Pat. No. 8,773,872 B2) referred to zero/ground, which receives a voltage Vs proportional to the instantaneous tank current.

The inventor has observed that these implementations tend to make the resonant current Is asymmetrical at light (small) load. Specifically, the inventor has observed that this asymmetry may derive from the input voltage offset of the zero-current comparator, and/or perturbation in the signals, resulting in a duty cycle of the square wave at the node HB different from the ideal 50%. This is due to a cumulative effect: any perturbation or asymmetry in the zero-current instant in a cycle propagates in the following cycles keeping its positive sign, in a sort of "positive feedback loop". If the equivalent gain of this positive loop exceeds unity, the loop becomes unstable and makes the duty cycle diverge from the ideal 50%. The worst consequence of that is an unequal distribution of the secondary current and, e.g., a resulting unequal thermal rise in the secondary rectifiers (D1 and D2). Another detrimental effect is the increase of the output voltage ripple.

The operating conditions where this instability occurs depend on the characteristics of the resonant tank, e.g., on the values of Cr, Ls, Lp and the turns ratio of the transformer (indicated in FIG. 1 as a:1:1) for a LLC converter. For example, the inventor has observed that this instability occurs normally at very light load (i.e., when the current sense signal Vs is very small and the offset of the zero-current comparator has a significant impact). However, in this case, while not being appreciated, there are usually no significant practical consequences due to the small current Is. Conversely, in some electronic converter, this may occur even at a relatively high load (e.g., at half-load) and in this case the unequal thermal stress might impact on system's reliability. Likewise, the increased output voltage ripple might exceed the maximum specified value.

BRIEF SUMMARY

Considering the foregoing, it is therefore an object of various embodiments to provide a TSC control device that is less sensitive to the input voltage offset of the zero-current comparator and/or to perturbations that tend to alter the duty cycle of the generated square-wave from 50%. This permits to obtain a more symmetrical tank current and, then, a more equal distribution of the secondary currents, e.g., among the rectifier diodes so that they are equally thermally stressed.

According to one or more embodiments, one or more of the above objects are achieved by a driver circuit for a resonant converter having the distinctive elements set forth specifically in the ensuing claims. Embodiments moreover concern a related integrated circuit, electronic converter and method.

The claims form an integral part of the technical teaching of the description provided herein.

As mentioned before, various embodiments of the present disclosure relate to a driver circuit for a resonant converter. For example, such a resonant converter is usually configured to generate an output voltage or output current at two output terminals from an input voltage applied to a positive and a negative input terminal. Specifically, in various embodiments, the resonant converter may comprise at least one half-bridge including a high side and a low side electronic switch connected in series between the positive and the negative input terminals, wherein the intermediate node between the high side and the low side electronic switch represents a switching node. A resonant tank, rectifier and filter circuit may be connected between the switching node and the two output terminals of the converter. For example, the resonant converter may be an LLC resonant converter as described in the foregoing.

In various embodiments, the driver circuit comprises terminals for interacting with the electronic converter. For example, a first and a second terminal may be connected to the control terminals of the high-side and the low-side electronic switch in order to drive the half-bridge via respective drive signals. A third terminal may be connected to a current sensor in order to receive a signal proportional to the resonant current flowing from the switching node to the resonant tank, rectifier and filter circuit. A fourth terminal may be connected to a feedback circuit in order to receive a feedback signal determined as a function of the output voltage or the output current.

In various embodiments, the driver circuit comprises an analog zero current comparator configured to generate a first control signal indicating when the resonant current changes sign as a function of the signal received at the third terminal.

In various embodiments, the driver circuit comprises also a first ramp generator circuit configured to provide at output a first ramp signal and a comparison circuit configured to determine whether the first ramp signal reaches at least one reference threshold.

According to various embodiments of the present disclosure, the driver circuit may drive the high-side and the low-side electronic switch periodically via the drive signals during a first and a second consecutive switching semi-period, wherein each of the first and the second switching semi-period ends when the comparison circuit indicates that the first ramp signal has reached a respective reference threshold. Specifically, once the first switching semi-period is started, the driver circuit opens the low-side electronic switch (immediately), and closes the high-side electronic switch after a delay, and once the second switching semi-period is started, the driver circuit opens the high-side electronic switch (immediately), and closes the low-side electronic switch after the delay.

For example, in order to determine the first and second switching semi-period, during one of the first and the second switching semi-period, the first ramp generator circuit may be configured to increase the first ramp signal and the comparison circuit may be configured to determine whether the first ramp signal reaches an upper reference threshold, and during the other of the first and the second switching semi-period, the first ramp generator circuit may be configured to decrease the first ramp signal, and the comparison circuit may be configured to determine whether the first ramp signal reaches a lower reference threshold.

Alternatively, during each of the first and the second switching semi-period, the first ramp generator circuit may be configured to increase the first ramp signal, and the comparison circuit may be configured to determine whether the first ramp signal reaches an upper reference threshold, wherein the first ramp signal is reset when the first ramp signal reaches the upper reference threshold. In a complementary manner, during each of the first and the second switching semi-period, the first ramp generator circuit may be configured to decrease the first ramp signal, and the comparison circuit may be configured to determine whether the first ramp signal reaches a lower reference threshold, wherein the first ramp signal is reset when the first ramp signal reaches the lower reference threshold.

Specifically, in various embodiments, the driver circuit comprises a control circuit and a correction circuit.

In various embodiments, the control circuit is configured to generate in each of the first and the second switching semi-period one or more control signals indicating a first interval staring at the instant when the respective semi-period is started and ending at the instant when the first control signal indicates that the resonant current has changed sign, and a second interval starting at the instant when the first control signal indicates that the resonant current has changed sign and the instant when the comparison circuit indicates that the first ramp signal has reached a respective reference threshold.

In various embodiments, the correction circuit is configured to modify the first ramp signal provided at input to the comparison circuit, whereby the first ramp signal has a first gradient value during the first interval and a second gradient value during the second interval, the first gradient value being a non-zero value and the absolute value of the second gradient value being greater than the absolute value of the first gradient value.

For example, in various embodiments, the first ramp generator circuit comprises an integrator circuit configured to generate the first ramp signal by integrating a first signal. In this case the correction circuit may modify the first ramp signal by adding to the first signal at the input of the analog integrator circuit a second signal. For example, for this purpose, the integrator circuit may comprise an integration capacitor, the driver circuit may comprise a first current generator configured to generate the first signal, and the correction circuit may comprise a second current generator configured to generate the second signal.

For example, in various embodiments, the first signal may be set to zero during the first interval and to a non-zero value during the second interval, and the second signal may be set to a constant non-zero value during the first and second interval. Alternatively, the first signal may be set to a non-zero value during the first and second interval, and the second signal may be set to zero during the first interval and to a constant non-zero value during the second interval. Alternatively, the first signal may be set to zero during the first interval and to a non-zero value during the second interval, and the second signal may be set to a constant non-zero value during the first interval and to zero during the second interval.

Conversely, in a digital implementation, the first ramp generator circuit may comprise a digital counter configured to generate the first ramp signal by increasing a count value by a given step size. In this case, the correction circuit may be configured to modify the first ramp signal by setting the step size to a first step value during the first interval and to a second step value during the second interval. Alternatively, the correction circuit may set a clock signal of the digital counter to a first clock signal during the first interval and to a second clock signal during the second interval.

Instead of modifying the input of the first ramp generator, the correction circuit may also modify the output of the first ramp generator. For example, when the first ramp generator circuit comprises an integrator circuit configured to generate the first ramp signal by integrating a first signal, the correction circuit may modify the first ramp signal by adding to the first ramp signal at the output of the analog integrator circuit a second ramp signal. For example, in various embodiments, the first signal is set to zero during the first interval and to a non-zero value during the second interval, and the second ramp signal corresponds to a linear ramp signal during the first and second interval. Alternatively, the first signal is set to a non-zero value during the first and second interval, and the second ramp signal corresponds to zero during the first interval and to a linear ramp signal during the second interval.

Instead of modifying the first ramp signal, the correction circuit may modify one or more of the reference thresholds of the comparison circuit by adding a second ramp signal to a respective initial threshold value. For example, in various embodiments, the first ramp generator circuit may again comprise an integrator circuit configured to generate the first ramp signal by integrating a first signal. In this case, the first signal may be set to zero during the first interval and to a non-zero value during the second interval, and the second ramp signal may correspond to a linear ramp signal during the first and second interval. Alternatively, the first signal may be set to a non-zero value during the first and second interval, and the second ramp signal may correspond to zero during the first interval and to a linear ramp signal during the second interval.

In various embodiments, in order to regulate the output voltage or output current, the second gradient value or at least one of the reference thresholds may be determined as a function of the feedback signal.

BRIEF DESCRIPTION OF THE SEVERAL VIEWS OF THE DRAWINGS

The embodiments of the present disclosure will now be described with reference to the annexed plates of drawings, which are provided purely to way of non-limiting example and in which:

The features and advantages of the present disclosure will become apparent from the following detailed description of practical embodiments thereof, shown by way of non-limiting example in the accompanying drawings, in which:

FIG. 6 shows time diagrams of the voltages involved in the device in

FIG. 4;

FIG. 7 shows time diagrams of the voltages involved in the device in

FIG. 5;

FIG. 25 shows time diagrams of the voltages involved in the voltage generator circuits illustrated in FIGS. 23 and 24.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

Figure 1:
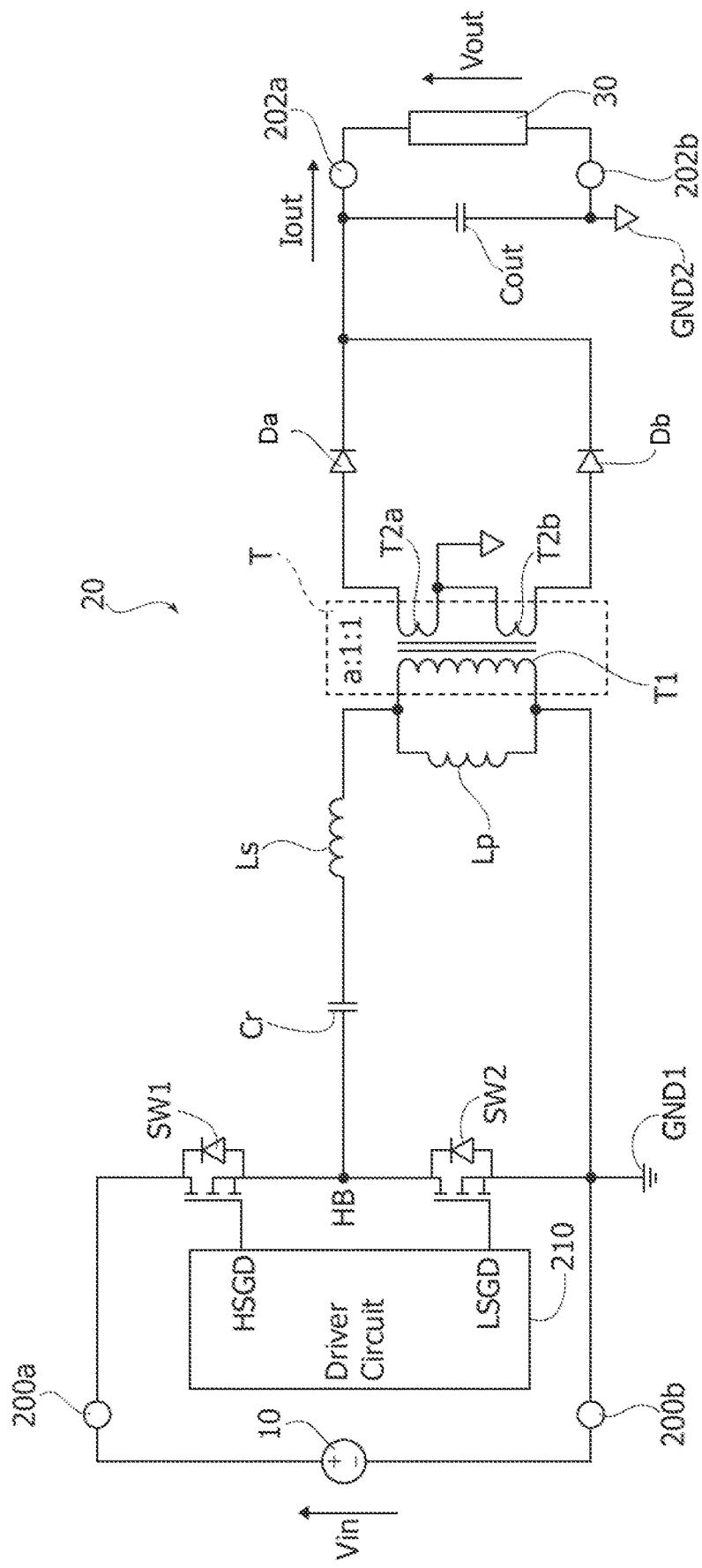
FIG. 1 shows a circuit schematic of an LLC resonant converter in accordance with the known art.
Figure 2:
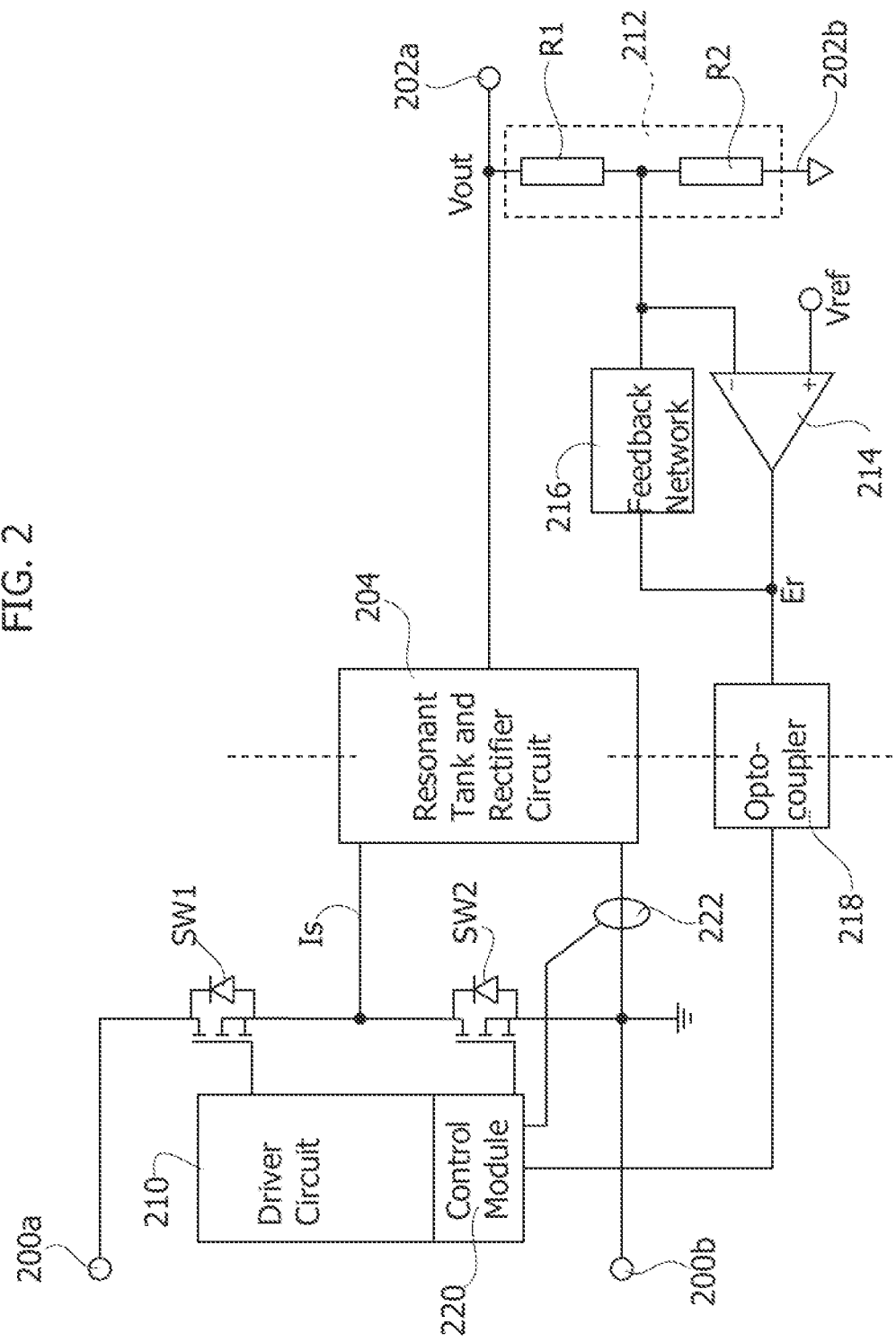
FIG. 2 shows a block diagram of a resonant converter with TSC regulation of the output voltage in accordance with the known art.

In FIGS. 3 to 20 described below, parts, elements or components that have already been described with reference to FIGS. 1 to 2 are designated by the same references used previously in these figures. The description of these elements has already been made and will not be repeated in what follows in order not to burden the present detailed description.

Figure 3:
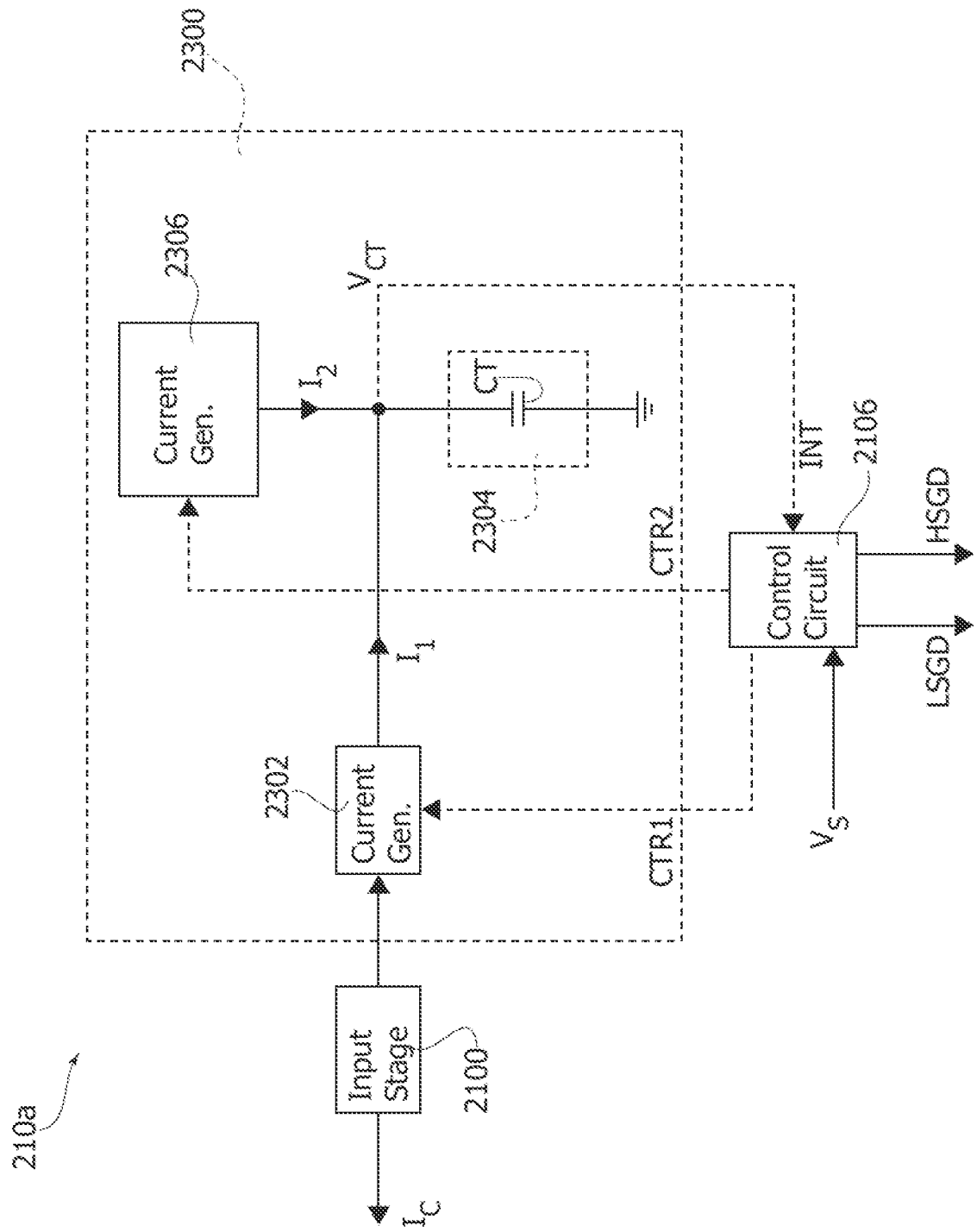
FIG. 3 shows a first embodiment of a control device for a resonant converter using enhanced TSC method.

FIG. 3 shows a circuit schematic of a control device 210a for a resonant converter in accordance with a first embodiment of the present disclosure.

For example, such a control device 210a may be used to control the operation of an (LLC) electronic converter as shown in FIGS. 1 and 2, and the respective description applies in its entirety.

Thus, also in the embodiment considered, the driver circuit 210a receives a feedback signal, such as a current Ic, determined as a function of the output voltage Vout or output current Iout. For example, in various embodiments, the control signal Ic is determined via a negative feedback control loop of the output voltage (see the description of FIG. 2). For example, when the driver circuit 210a is implemented in an integrated circuit, the driver circuit 210a may receive the feedback signal Ic via a pin of the integrated circuit.

Specifically, in the embodiment considered, the control current Ic is connected to an optional input stage 2100 essentially implementing a power amplifier.

Figure 8:
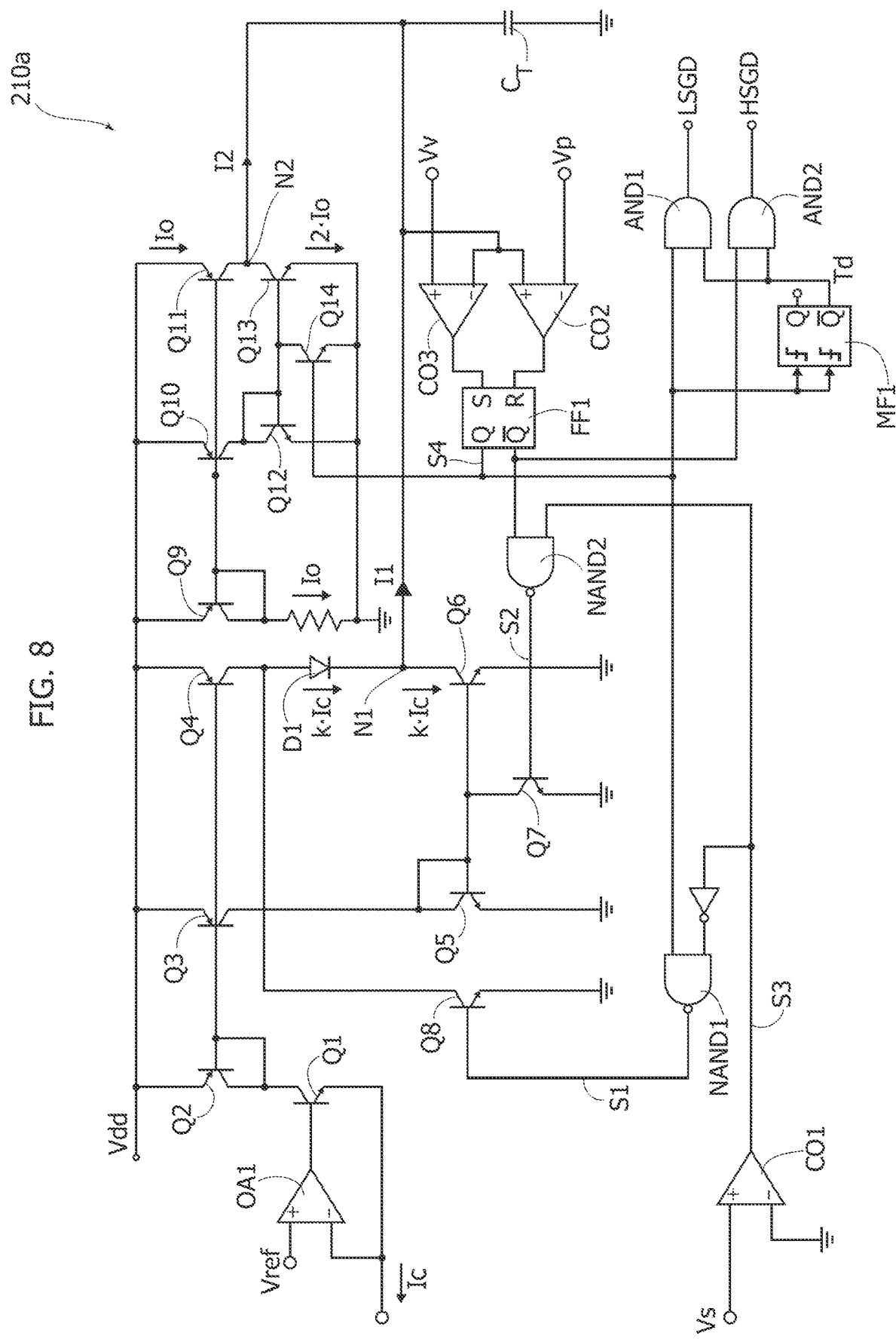
FIG. 8 shows an embodiment of the control device of FIG. 4.

For example, as shown in FIG. 8, the input stage may be implemented with an operational amplifier OA1 and a bipolar transistor Q1, such as a npn bipolar transistor. Specifically, in the embodiment considered, the control current Ic is connected to a first input terminal (e.g., the inverting terminal) of an operational amplifier OA1, wherein the operation amplifier OA1 receives a reference voltage Vref at a second input terminal (e.g., the non-inverting terminal) of an operational amplifier OA1. The output of the operational amplifier OA1 is connected to the base terminal of the bipolar transistor Q1, and the emitter terminal of the bipolar transistor Q1 is connected to the first input terminal (e.g., the inverting terminal) of the operational amplifier OA1. Thus, the output of the input stage 2100, e.g., the collector terminal of the bipolar transistor Q1, provides the current Ic.

In the embodiment shown in FIG. 3, the driver circuit comprises:

an integration circuit 2300 configured to generate an integration signal INT being proportional to the integral of the feedback signal Ic during given time periods; and a control circuit 2106 configured to control the operation of the integration circuit 2300 via one or more control signals CTR1 as a function of the measurement signal Vs (being proportional to the resonant current Is) and the integration signal INT.

Moreover, the control circuit 2106 is configured to generate the drive signals HSGD and LSGD for the high-side switch SW1 and the low-side switch SW2, respectively, as a function of the measurement signal Vs and the integration signal INT.

For example, in FIG. 3, the integration circuit 2300 comprises an analog integrator comprising a capacitor $C_T$ and a current generator 2302 configured to provide a current I1 to the capacitor $C_T$, wherein the current I1 is proportional to the feedback signal Ic. In various embodiments, the capacitor $C_T$ may be external with respect to the integrated circuit comprising the driver circuit 210a. Accordingly, the node N1 may be connected to a pin of such an integrated circuit. Accordingly, in the embodiment considered, the integration signal INT corresponds to the voltage $V_{CT}$ at the capacitor $C_T$.

Figure 4:
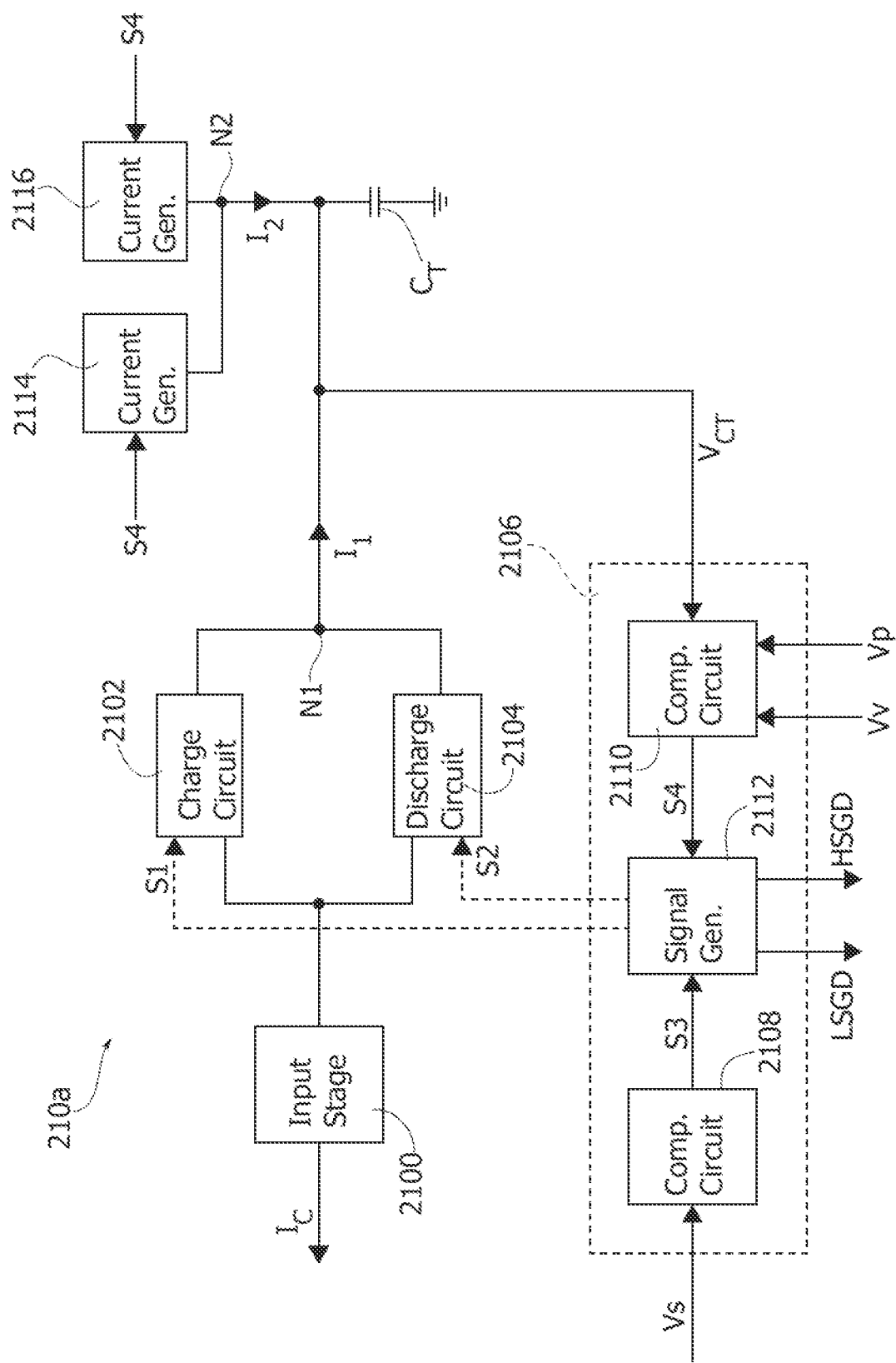
FIG. 4 shows a first embodiment of the control device of FIG. 3.

FIG. 4 shows a first embodiment of an analog integration circuit 2300. Specifically, in the embodiment considered, the driver circuit 210a comprises a charge circuit/current generator 2102 providing a current k·Ic to a node N1, wherein the charge circuit 2102 may be disabled/enabled as a function of the control signal S1, and a discharge circuit/current generator 2104 providing a current −k·Ic to the node N1 wherein the discharge circuit 2104 may be disabled/enabled as a function of the control signal S2. In the embodiment considered, the node N1 is connected to a first terminal of the capacitor $C_T$, wherein a second terminal of the capacitor $C_T$ is connected to a ground, e.g., GND1.

Accordingly, in the embodiment considered, the charge circuit 2102 and discharge circuit 2104 essentially implement the current generator 2302 configured to provide via the node N1 a current I1 to the capacitor $C_T$, which may be set to:

a current k·Ic (signal S1 enables the charge circuit and signal S2 disables the discharge circuit)

a current −k·Ic (signal S1 disables the charge circuit and signal S2 enables the discharge circuit); or zero (signals S1 and S2 disable both the charge circuit 2102 and the discharge circuit 2104).

Figure 6:
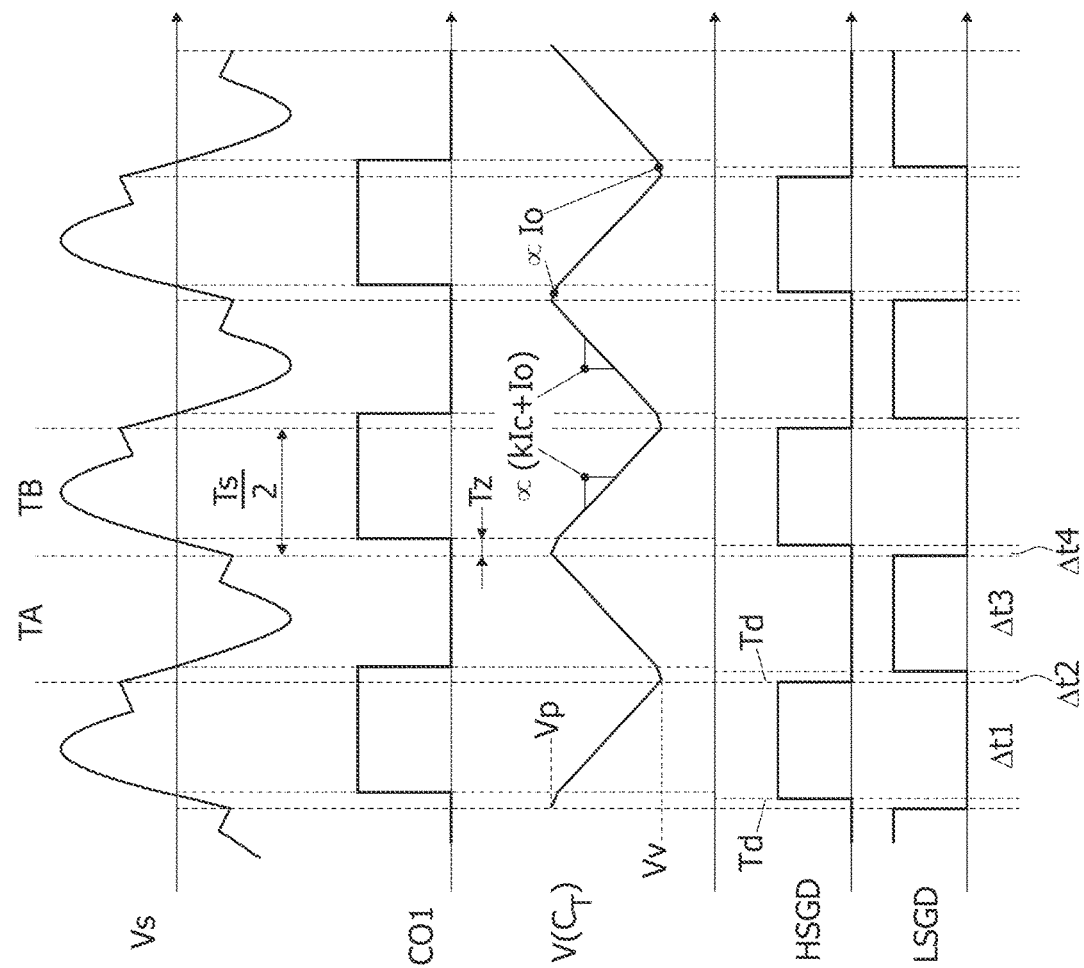

Thus, as shown in FIG. 6, essentially, the embodiment shown in FIG. 4 permits to charge and discharge the capacitor $C_T$ during given semi-periods TA and TB of each switching cycle Ts, thereby generating a voltage $V_{CT}$ having a triangular waveform.

In the embodiments considered, the control circuit 2106 is thus configured to generate the control signals S1 and S2 and the drive signals LSGD and HSGD as a function of the voltage $V_{CT}$ at the capacitor $C_T$ (at the node N1) and the measurement signal Vs.

Specifically, in various embodiments, the driver circuit 210a is configured to generate the drive signals HSGD and LSGD in order to repeat the following four phases for each switching cycle:

during a first time-interval $\Delta_t 1$, closing the first electronic switch SW1 and opening the second electronic switch SW2, whereby the switching node HB is connected to the positive input node 200a, i.e., the input voltage Vin;

during a second time-interval $\Delta_t 2$, opening both the first and the second electronic switch SW1/SW2;

during a third time-interval $\Delta_t 3$, opening the first electronic switch SW1 and closing the second electronic switch SW2, whereby the switching node HB is connected to the negative input node 200a, e.g., ground GND1; and during a fourth time-interval $\Delta_t 4$, opening both the first and the second electronic switch SW1/SW2.

Accordingly, in the embodiment considered, the semi-period TA corresponds to the second time-interval $\Delta_t 2$ and the third time-interval $\Delta_t 3$ (TA=$\Delta_t 2$+$\Delta_t 3$), and the semi-period TB corresponds to the fourth time-interval $\Delta_t 4$ and the first time-interval $\Delta_t 1$ (TB=$\Delta_t 4$+$\Delta_t 1$).

Specifically, in various embodiments, the time-interval $\Delta_t 2$ and the time-interval $\Delta_t 4$ have a constant duration Td. Accordingly, the driver circuit 210a has to determine the durations of the time-interval $\Delta_t 1$ and the time-interval $\Delta_t 3$. For example, in various embodiments, the control circuit 2106 is configured to determine the instants when the intervals TA and TB should end, i.e., when the intervals $\Delta_t 3$ and $\Delta_t 1$ should end.

For example, in the embodiment shown in FIG. 4, the control circuit 2106 may be configured to execute the following steps during the time interval TA:

once the interval TA is started, waiting that the signal Vs indicates that the resonant current become zero/negative (during this interval the current generators 2102 and 2104 are disabled);

at the instant when the signal Vs indicates that the resonant current become negative, enabling the current generator 2102 (via the signal S1), thereby charging the capacitor $C_T$ with a current k·Ic, and once the integration signal (voltage $V_{CT}$ at the capacitor $C_T$) reaches an upper threshold Vp, disabling the current generator 2102 (via the signal S1) and ending the interval TA, thereby ending the interval $\Delta_t 3$ and starting the interval TB.

Conversely, the control circuit 2106 may be configured to execute the following steps during the time interval TB:

once the interval TB is started, waiting that the signal Vs indicates that the resonant current become zero/positive (during this interval the current generators 2102 and 2104 are disabled);

at the instant when the signal Vs indicates that the resonant current become positive, enabling the current generator 2104 (via the signal S2), thereby discharging the capacitor $C_T$ with a current −k·Ic, and once the integration signal (voltage $V_{CT}$ at the capacitor $C_T$) reaches a lower threshold Vv, disabling the current generator 2104 (via the signal S2) and ending the interval TB, thereby ending the interval $\Delta_t 1$ and starting the interval TA.

In parallel the control circuit 2106 may:

once the interval TA is started, setting the signal LSGD to high after a period Td, thereby switching the low-side switch SW2 on, and at the end of the interval TA setting contemporaneously the signal LSGD to low, thereby switching the low-side switch SW2 off, once the interval TB is started, setting the signal HSGD to high after a period Td, thereby switching the high-side switch SW1 on, and at the end of the interval TB setting contemporaneously the signal HSGD to low, thereby switching the high-side switch SW1 off.

Generally, the role of the current generators 2102 and 2014 may also be inverted during the intervals TA and TB, i.e., the current generator 2102 may be enabled and the voltage $V_{CT}$ at the capacitor $C_T$ may be compared with the upper threshold Vp during the interval TB and the current generator 2104 may be enabled and the voltage $V_{CT}$ at the capacitor $C_T$ may be compared with the lower threshold Vv during the interval TA.

Figure 5:
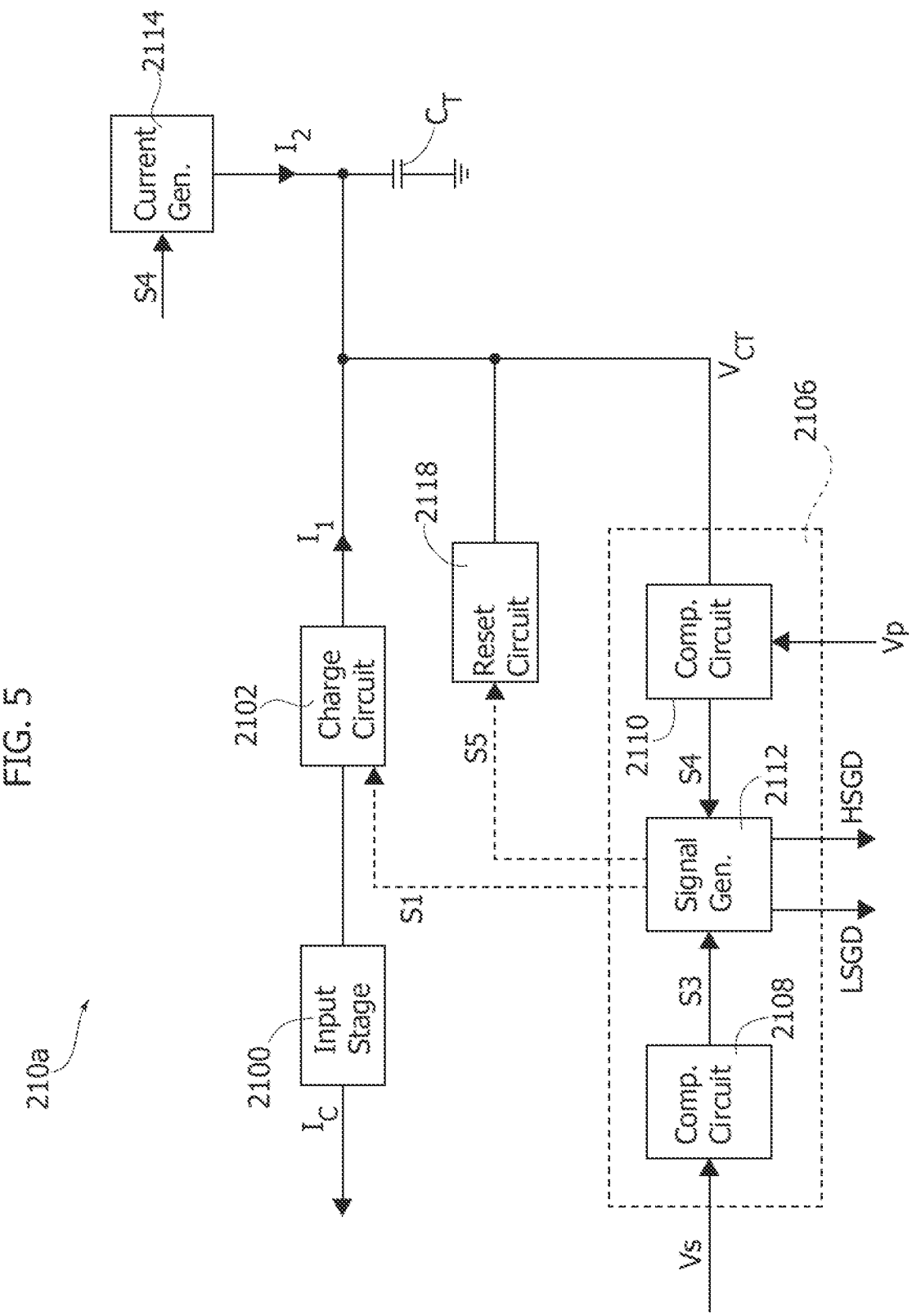
FIG. 5 shows a second embodiment of the control device of FIG. 3.

FIG. 5 shows a second embodiment of an analog integration circuit 2300. Specifically, in the embodiment considered, the driver circuit comprises a charge circuit/current generator 2102 providing a current k·Ic to the capacitor $C_T$, wherein the charge circuit 2102 may be disabled/enabled as a function of the control signal S1, and a reset circuit 2118 configured to reset the charge at the capacitor $C_T$ as a function of a control signal S5.

Figure 7:
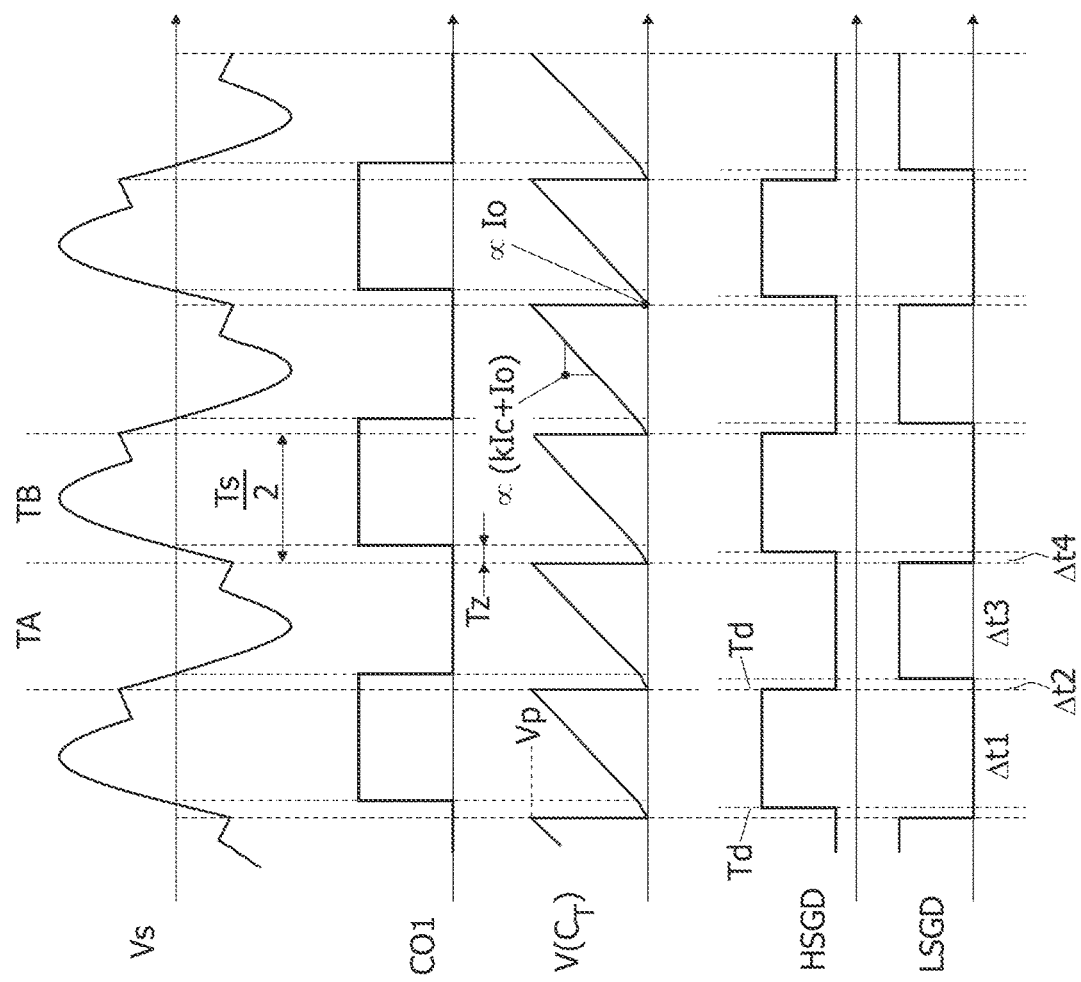

Thus, as shown in FIG. 7, essentially, the embodiment shown in FIG. 5 permits to reset the capacitor $C_T$ and charge the capacitor $C_T$ during each semi-period TA and TB, thereby generating a voltage $V_{CT}$ having a sawtooth waveform.

In the embodiments considered, the control circuit 2106 is thus configured to generate the control signals S1 and S5 and the drive signals LSGD and HSGD as a function of the voltage $V_{CT}$ at the capacitor $C_T$ (at the node N1) and the measurement signal Vs.

Specifically, also in this embodiment, the driver circuit 210a may generate the drive signals HSGD and LSGD in order to repeat the following four phases for each switching cycle:

during a first time-interval $\Delta_t 1$, closing the first electronic switch SW1 and opening the second electronic switch SW2, whereby the switching node HB is connected to the positive input node 200a, i.e., the input voltage Vin;

during a second time-interval $\Delta_t 2$, opening both the first and the second electronic switch SW1/SW2;

during a third time-interval $\Delta_t 3$, opening the first electronic switch SW1 and closing the second electronic switch SW2, whereby the switching node HB is connected to the negative input node 200a, e.g., ground GND1; and during a fourth time-interval $\Delta_t 4$, opening both the first and the second electronic switch SW1/SW2.

Accordingly, also in this case, the semi-period TA corresponds to the second time-interval $\Delta_t 2$ and the third time-interval $\Delta_t 3$ (TA=$\Delta_t 2$+$\Delta_t 3$), and the semi-period TB corresponds to the fourth time-interval $\Delta_t 4$ and the first time-interval $\Delta_t 1$ (TB=$\Delta_t 4$+$\Delta_t 1$). Specifically, in various embodiments, the time-interval $\Delta_t 2$ and the time-interval $\Delta_t 4$ may again have a constant duration Td.

Accordingly, the driver circuit 210a has to determine the durations of the time-interval $\Delta_t 1$ and the time-interval $\Delta_t 3$. Specifically, in various embodiments, the control circuit 2106 is configured to determine the instants when the intervals TA and TB should end, i.e., when the intervals $\Delta_t 3$ and $\Delta_t 1$ should end.

For example, in the embodiment shown in FIG. 5, the control circuit 2106 may be configured to execute the following steps during the time interval TA:

once the interval TA is started, waiting that the signal Vs indicates that the resonant current become zero/negative (during this interval the current generator 2102 is disabled);

at the instant when the signal Vs indicates that the resonant current become negative, enabling the current generator 2102 (via the signal S1), thereby charging the capacitor $C_T$ with a current k·Ic, and once the integration signal (voltage $V_{CT}$ at the capacitor $C_T$) reaches an upper threshold Vp, disabling the current generator 2102 (via the signal S1), resetting the integration signal via the reset circuit 2118 (via the signal S5) and ending the interval TA, thereby ending the interval $\Delta_t 3$ and starting the interval TB.

Conversely, the control circuit 2106 may be configured to execute the following steps during the time interval TB:

once the interval TB is started, waiting that the signal Vs indicates that the resonant current become zero/positive (during this interval the current generator 2102 is disabled);

at the instant when the signal Vs indicates that the resonant current become positive, enabling the current generator 2102 (via the signal S1), thereby charging the capacitor $C_T$ with a current k·Ic, and once the integration signal (voltage $V_{CT}$ at the capacitor $C_T$) reaches the upper threshold Vp, disabling the current generator 2102 (via the signal S1), resetting the integration signal via the reset circuit 2118 (via the signal S5) and ending the interval TB, thereby ending the interval $\Delta_t 1$ and starting the interval TA.

In parallel the control circuit 2106 may again:

once the interval TA is started, setting the signal LSGD to high after a period Td, thereby switching the low-side switch SW2 on, and at the end of the interval TA setting contemporaneously the signal LSGD to low, thereby switching the low-side switch SW2 off, once the interval TB is started, setting the signal HSGD to high after a period Td, thereby switching the high-side switch SW1 on, and at the end of the interval TB setting contemporaneously the signal HSGD to low, thereby switching the high-side switch SW1 off.

Thus, the embodiments have in common that the driver circuit 210a comprises a current generator providing a current proportional to the current Ic. Specifically, during each of the semi-periods TA or TB, the control circuit 2106 is configured to:

once the respective semi-period is started, waiting that the signal Vs indicates that the resonant current changes sign, i.e., become positive or negative;

at the instant when the signal Vs indicates that the resonant current has changed sign, enabling the current generator 2102, thereby applying a current proportional to the current Ic to the capacitor $C_T$, and once the integration signal INT (voltage $V_{CT}$ at the capacitor $C_T$) reaches a given threshold Vp/Vv, disabling the current generator and ending the respective semi-period, thereby starting the following semi-period (TB or TA).

As shown in FIG. 3, in various embodiments, the integration circuit 2300 comprises a second current generator 2306. Specifically, this current generator 2306 provides a second current I2 to the capacitor $C_T$.

Specifically, in various embodiments this current generator 2306 is always enabled, whereby during the time period between the instant when the respective semi-period TA/TB is started and the instant when the signal Vs indicates that the resonant current has changed sign, the capacitor $C_T$ receives a constant current I2=Io from the current generator 2306 (with I1=0, because the current generator 2302 is disabled); and during the time period between the instant when the signal Vs indicates that the resonant current has changed sign and the instant when the respective semi-period TA/TB ends, the capacitor $C_T$ receives a constant current I2=Io from the current generator 2306 and a current I1 proportional to the current Ic from the current generator 2302.

Generally, in particular when using an alternative charging and discharging (see embodiment of FIG. 4), the current I2 has the same sign as the current I1. Thus, as shown in FIG. 3, the current generator 2306 may receive a control signal CTR2 in order to switch the sign of the current I2.

For example, this is also shown in FIG. 4, wherein the current generator 2306 is implemented with a current generator 2114 providing a current Io and a current generator 2116 providing a current −Io, wherein one of the current generators 2114 or 2116 is enabled as a function of the signal S4. Conversely, in the embodiment shown in FIG. 5, the current generator 2306 may be implemented only with the current generator 2114 providing a current Io.

For example, FIG. 8 shows an embodiment of the driver circuit 210a shown in FIG. 4.

In the embodiment shown in FIG. 8, the current Ic (e.g., at the output of the input stage OA1, Q1) is provided to the input of a first current mirror (Q2, Q3, Q4). For example, in the embodiment the current mirror is implemented with bipolar transistors, such as pnp bipolar transistors. Accordingly, in the embodiment considered, the current Ic flows through the input Q2 of the current mirror, e.g., implemented with a first pnp bipolar transistor, and is mirrored to a first output Q3 of the current mirror, e.g., implemented with a second pnp bipolar transistor, and a second output Q4 of the current mirror, e.g., implemented with a second pnp bipolar transistor. The output Q3 of the current mirror (Q2–Q3) provides thus a first current proportional to the current Ic, and the output Q4 of the current mirror (Q2–Q4) provides a second current proportional to the current Ic.

This first current provided by the output Q3 of the current mirror (Q2–Q3) is then applied to the input Q5 of a second current mirror (Q5, Q6), e.g., implemented with bipolar transistors, such as npn bipolar transistors. The output Q3 of the current mirror (Q5–Q6) provides thus a current proportional to the first current which in turn is proportional to the current Ic.

In the embodiment considered, the output Q4 of the first current mirror (Q2–Q4) and the output Q6 of the second current mirror (Q5–Q6) are both connected to the node N1. Specifically, in various embodiment, by dimensioning in a suitable manner the current mirrors, the output Q4 of the first current mirror (Q2–Q4) provides a current k·Ic to the node N1 and the output Q6 of the second current mirror (Q5–Q6) provides a current −k·Ic to the node N1.

In the embodiment considered, the circuit comprises also sub-circuits for selectively disabling the current flow from the output Q4 of the first current mirror (Q2–Q4) and from the output Q6 of the second current mirror (Q5–Q6) to the node N1, respectively.

For example, in the embodiment considered, in order to selectively disable the current flow from the output Q4 of the first current mirror (Q2–Q4) to the node N1, a first sub-circuit comprises:
- a diode D1 connected between the output Q4 of the first current mirror and the node N1;
- an electronic switch Q8, such as a bipolar transistor, e.g., a npn bipolar transistor, connected between the output Q4 of the first current mirror and ground, wherein the electronic switch Q8 is driven as a function of a binary control signal S1.

Thus, when the electronic switch Q8 is closed, the current provided by the output Q4 of the first current mirror (Q2–Q4) flows to ground, and the diode D1 blocks a current flow from the node N1.

Conversely, in the embodiment considered, in order to selectively disable the current flow from the output Q6 of the second current mirror (Q5–Q6) to the node N1, a second sub-circuit comprises:
- an electronic switch Q7, such as a bipolar transistor, e.g., a npn bipolar transistor, configured to disable the second current mirror (Q5–Q6), wherein the electronic switch Q8 is driven as a function of a binary control signal S2.

Thus, in the embodiment considered, the current mirror Q2–Q4 and the first sub-circuit D1, Q8 implement the charge circuit 2102 providing a current k·Ic, wherein the charge circuit 2102 may be disabled/enabled as a function of the control signal S1, and the current mirror Q2–Q3, the current mirror Q5–Q6 and the second sub-circuit (Q7) implement the discharge circuit 2104 providing a current −k·Ic, wherein the discharge circuit 2104 may be disabled/enabled as a function of the control signal S2.

As mentioned before, in the embodiment considered, the control circuit 2106 is configured to generate the control signals S1 and S2 (FIG. 4) or the control signals S1 and S5 as a function of the voltage $V_{CT}$ at the capacitor $C_T$ (at the node N1) and the measurement signal Vs.

For example, in various embodiments, the signal Vs proportional to the resonant current is provided to a comparator 2108, which thus generates a binary control signal S3 indicating whether the signal Vs (the resonant current) is positive or negative. For example, in the embodiment shown in FIG. 4, the circuit 2108 is implemented with a comparator CO1 receiving at a positive input terminal the voltage Vs, a negative input terminal is connected to ground, e.g., GND1, and the output of the comparator CO1 provides the signal S3. Accordingly, in the embodiment considered, the signal S3 is high when the signal Vs (the resonant current) is positive.

Moreover, in the embodiment considered, the control circuit 2106 comprises a circuit 2110 configure to set a binary control signal S4 to a first logic level (e.g., to low) when the voltage $V_{CT}$ is smaller than a lower threshold Vv, and to a second logic level (e.g., to high) when the voltage $V_{CT}$ is greater than an upper threshold Vp. Thus, the circuit 2110 essentially implements a comparator with hysteresis having respective lower and upper thresholds Vv and Vp.

For example, in various embodiments, the circuit 2106 comprises:
- a first comparator CO3 receiving the voltage $V_{CT}$ at a negative input terminal, the voltage Vv at a positive input terminal;
- a second comparator CO2 receiving the voltage $V_{CT}$ at a positive input terminal, the voltage Vp at a negative input terminal; and
- a set-reset flip-flop FF1, receiving at a set input terminal the signal at the output of the comparator CO3 and at a reset input terminal the signal at the output of the comparator CO2, wherein the output (Q) of the flip-flop FF1 provides the signal S4.

In various embodiments, the signals S3 and S4 are elaborated by a circuit 2112 in order to generate the signals S1 and S2, and also the drive signals HSGD and LSGD for the switches SW1 and SW2.

Specifically, in the embodiment considered, the charge circuit 2102 is enabled when the signal S3 indicates that the resonant current is negative, and the signal S4 indicates that the voltage $V_{CT}$ is smaller than the upper threshold Vp. Conversely, in the embodiment considered, the discharge circuit 2104 is enabled when the signal S3 indicates that the resonant current Is is positive, and the signal S4 indicates that the voltage $V_{CT}$ is greater than the lower threshold Vv.

In the embodiment considered, the signal S4 is also fed to a monostable device MF1. Specifically, the output of the monostable device MF1 is set to high after a delay of Td with respect to each rising or falling edge of the signal S4. The output of the monostable device MF1 and the signal S4 are fed to a logic gate AND1, such as a AND gate, in order to generate the signal LSGD. Moreover, the output of the monostable device MF1 and the inverted version of the signal S4 (e.g., at an inverted output of the flip-flop FF1) are fed to a logic gate AND2, such as a AND gate, in order to generate the signal HSGD. Accordingly, essentially, the monostable device MF1 and the logic gates AND1 and AND2 implement a circuit configured to:
- set the signal LSGD to high (thereby closing the low-side electronic switch SW2), after a delay Td with respect to a rising edged in the signal S4;
- set the signal LSGD to low (thereby opening the low-side electronic switch SW2), when the signal S4 goes to low (substantially contemporaneously with the falling edge of the signal S4);
- set the signal HSGD to high (thereby closing the high-side electronic switch SW1), after a delay Td with respect to a falling edged in the signal S4; and
- set the signal HDGD to low (thereby opening the high-side electronic switch SW1), when the signal S4 goes to high (substantially contemporaneously with the rising edge of the signal S4).

In general, the monostable device MF1 may also be implemented with other delay circuits, such as a delay line.

Accordingly, as also shown in FIG. 6, when the signal HSDG is set to high (high-side electronic switch SW1 is closed) and the resonant current is positive, the control circuit 2106 enables the discharge circuit 2104. Once the voltage $V_{CT}$ reaches the lower threshold Vv, the signal S4 is set to high, whereby the control circuit 2106 sets the signal HSDG to low. After the (dead) time Td, the control circuit 2106 sets then the signal LSDG to high (low-side electronic switch SW2 is closed). Once the resonant current becomes negative, the control circuit 2106 enabled the charge circuit 2102. Once the voltage $V_{CT}$ reaches the upper threshold Vp, the signal S4 is set to low, whereby the control circuit 2106 sets the signal LSDG to low. After the (dead) time Td, the control circuit 2106 sets then the signal HSDG to high. Once the resonant current becomes positive, the control circuit 2106 enables again the discharge circuit 2102.

Specifically, in the embodiment considered, the control circuit 2106 is configured to end the time-interval $\Delta_t 1$, when the voltage $V_{CT}$ reaches the lower threshold Vv. Specifically, in the embodiment considered, the control circuit 2106 deactivates contemporaneously the discharge circuit 2104, and once the resonant current becomes positive, the control circuit 2106 activates the charge circuit 2102. Similarly, the control circuit 2106 is configured to end the time-interval $\Delta_c 3$, when the voltage $V_{CT}$ reaches the upper threshold Vp. Specifically, in the embodiment considered, the control circuit 2106 deactivates contemporaneously the charge circuit 2102, and once the resonant current becomes negative, the control circuit 2106 activates the discharge circuit 2102. Thus, while the time Td (between the instant when the voltage e $V_{CT}$ reaches the upper threshold/reset of the signal LSGD and the instant when the signal HSGD is set) is fixed, the time Tz between the instant when the voltage e $V_{CT}$ reaches the upper threshold Vp and the instant when the discharge circuit is activated (because the resonant current becomes positive) is variable.

In the embodiment considered, the current generator 2114 is implemented with a:
  a bias circuit, such as a resistor or a current generator, generating a current Io; and
  a current mirror, e.g., implemented with bipolar transistors, such as pnp bipolar transistors, wherein an input Q9 of the current mirror receives the current Io provided by the bias circuit and an output Q11 of the current mirror is connected to a node N2, which in turn is connected to the capacitor $C_T$.

In the embodiment considered, the current generator 2116 is implemented with a:
  a second output Q10 of the current mirror Q9–Q11; and
  a second current mirror, e.g., implemented with bipolar transistors, such as npn bipolar transistors, wherein an input Q12 of the current mirror receives the current provided by the output Q10 of the first current mirror and an output Q13 of the second current mirror is connected to a node N2.

Specifically, the second current mirror Q12–Q13 may be selectively enabled via an electronic switch Q14, such as a bipolar transistor, driven via the signal S4. Moreover, the output Q11 of the current mirror Q9–Q11 provides always the current Io. Thus, in order to provide either the current Io or –Io, the current mirror Q12–Q13 may be dimensioned (e.g., via a mirroring factor of 2) in order to provide a current –2Io to the node N2.

Thus, in the embodiment considered, if the signal S2 at the output of CO1 is firstly high, the output of the gate NAND1, receiving the negated output of the comparator CO1 and the output Q of the flip-flop FF1 at the input, is thus high. The transistor Q8, connected between transistor Q4 and the ground GND (corresponding e.g., to GND1), is switched on and diverts the current flowing through the bipolar transistor Q4 to ground. Being the output Q of FF1 high, the transistor Q14 is on so that the mirror Q12–Q13 is off and Q11 is delivering a current Io to the timing capacitor $C_T$. In this way, $C_T$ is charged by the current Io only and a rising voltage ramp of slope Io/$C_T$ will be observed.

After some time the resonant current becomes negative and so does the signal Vs: the output of comparator CO1 (signal S3) will become low, the inputs of the gate NAND1 will be both high and, therefore, the output thereof (signal S1) will become low. The transistor Q8 is switched off and the current mirrored from the transistor Q4 is diverted into the capacitor $C_T$ through the diode D1. On the other hand, the output Q of the flip-flop FF1 being low, the output of the gate NAND2 receiving the signal Q and the output of the comparator CO1 are high, whereby transistor Q7 connected between the common base terminals of transistors Q5 and Q6 and ground GND, is switched on and keeps the mirror Q5–Q6 switched off. The current kIc from the transistor Q4 will add to Io and charge the capacitor $C_T$, so a rising voltage ramp of slope (kIc+Io)/$C_T$ will be observed thereon. A ramp with such slope is produced from the instant when the current of the resonant circuit is negative and, i.e., the sign thereof is the same as that of the voltage applied to the resonant circuit itself (negative per se when the transistor SW2 of the half-bridge is switched on).

As soon as the voltage on the capacitor $C_T$ reaches the reference voltage Vp, the comparator CO2 configured to compare the voltage $V_{CT}$ at the ends of the capacitor $C_T$ with the reference voltage Vp, resets the SR flip-flop FF1 whose output Q becomes zero. This causes the half-bridge to be switched: the output LSGD immediately becomes zero and, after a delay Td generated by MF1 together with the gate AND2, the output HSGD of the gate AND2 becomes high, and the transistor SW1 of the half-bridge is switched on. The output of gate NAND1 is forced high and the transistor Q8 is switched on; the current flowing through transistor Q4 is diverted towards ground GND. The inversely biased diode D1 isolates the capacitor $C_T$ thus preventing it from discharging through the transistor Q8. Simultaneously, being the output Q of FF1 low, the transistor Q14 is off so that the mirror Q12–Q13 is on and Q13 sinks a current 2Io; since Q11 is still delivering a current Io, the timing capacitor $C_T$, is charged by a net current equal to Io and a falling voltage ramp of slope –Io/$C_T$ will be observed.

Up to now, the mirror Q5–Q6 was switched off. At the input of the gate NAND2, however, the signal Q is now high, whereby the output of the gate depends on the status of the comparator CO1. Due to the conduction period of the transistor SW2 of the half-bridge, the current is negative when the half-bridge is switched, whereby the output of comparator CO1 is still low, the output of the gate NAND2 is high, the transistor Q7 is switched on and the mirror Q5–Q6 is switched off. Due to switching, however, the voltage now applied to the resonant circuit is positive, whereby after a short time also the current of the resonant circuit and the voltage Vs will become positive. The output of CO1 becomes high, that of NAND2 with both inputs high becomes low and the mirror Q5–Q6 switches on taking out a current equal to Ic from the capacitor $C_T$. A falling voltage ramp of slope—(kIc+Io)/$C_T$ will be observed thereon. A ramp with such slope is produced from the instant when the current of the resonant circuit is positive and the sign thereof is the same as that of the voltage applied to the resonant circuit itself (positive per se when the MOSFET SW1 of the half-bridge is switched on).

The discharge proceeds until the voltage $V_{CT}$ reaches the value Vv when the comparator CO3 sets the SR flip-flop FF1 again, bringing the output Q thereof high and still switching off the mirrors Q5–Q6 and Q12–Q13, stopping the discharge of capacitor $C_T$. The output of the gate NAND1 is still high, since the current of the resonant circuit is still positive and the output of comparator CO1 is high, the transistor Q8 is switched on and the diode D1 is inversely biased. Therefore, the current charging $C_T$ is Io only.

Due to switching, however, the voltage now applied to the resonant circuit is negative whereby, after a short time, the current of the resonant circuit and the voltage Vs will also become negative. The output of comparator CO1 becomes low and, therefore, also that of NAND1, the transistor Q8 is switched off and the current flowing through the transistor Q4 charges the capacitor $C_T$ again, etc.

Thus, essentially, the control circuit 210a shown in FIGS. 4 and 8 is configured to:
  alternately charge and discharge the capacitor $C_T$ with a first, non-zero, constant current Io in the time intervals of a switching cycle Ts when tank voltage and current have opposite sign (S3 is high and S4 is high, or S3 is low and S4 is low), alternately charge and discharge the capacitor $C_T$ with a second constant current kIc+Io in the time intervals of a switching cycle Ts when the voltage applied to the resonant tank and the current flowing through it have equal sign (S3 is high and S4 is low, or S3 is low and S4 is high), where said second constant current includes a current Ic representative of the feedback loop that controls the output voltage or the output current of the converter and is larger than the first non-zero constant current Io, and toggle the half bridge and reversing the charge/discharge phases of the capacitor $C_T$ when the capacitor voltage $V_{CT}$ touches a lower or a higher threshold value Vv and Vp.

The equation describing the charge of capacitor $C_T$ in a switching half-period starting at t=0 and ending at t=Ts/2 (being Ts the switching period), which in the ideal case should correspond to the duration of the semi-periods TA and TB, and where the tank current changes sign at t=Tz, by denoting with Vv (for example, equal to 1V) the valley voltage of the waveform on the capacitor $C_T$ and Vp (for example, equal to 4V) the peak voltage of the waveform, may be written as:

$$Vp = Vv + \frac{1}{C_T}\left[IoTz + (kIc + Io)\left(\frac{Ts}{2} - Tz\right)\right] \quad (1)$$

Noticing that the commanded time-shift $T_{SH}$ equals Ts/2−Tz, this equation may be rewritten as:

$$Vp = \quad (2)$$
$$Vv + \frac{1}{C_T}\left[Io\left(\frac{Ts}{2} - T_{SH}\right) + (kIc + Io)T_{SH}\right] = Vv + \frac{1}{C_T}\left(Io\frac{Ts}{2} + kIcT_{SH}\right)$$

Solving this equation for $T_{SH}$, it is possible to find the control law linking the commanded time-shift to the control current Ic:

$$T_{SH} = \frac{(Vp - Vv)C_T - Io\frac{Ts}{2}}{kIc}. \quad (3)$$

Figure 9:
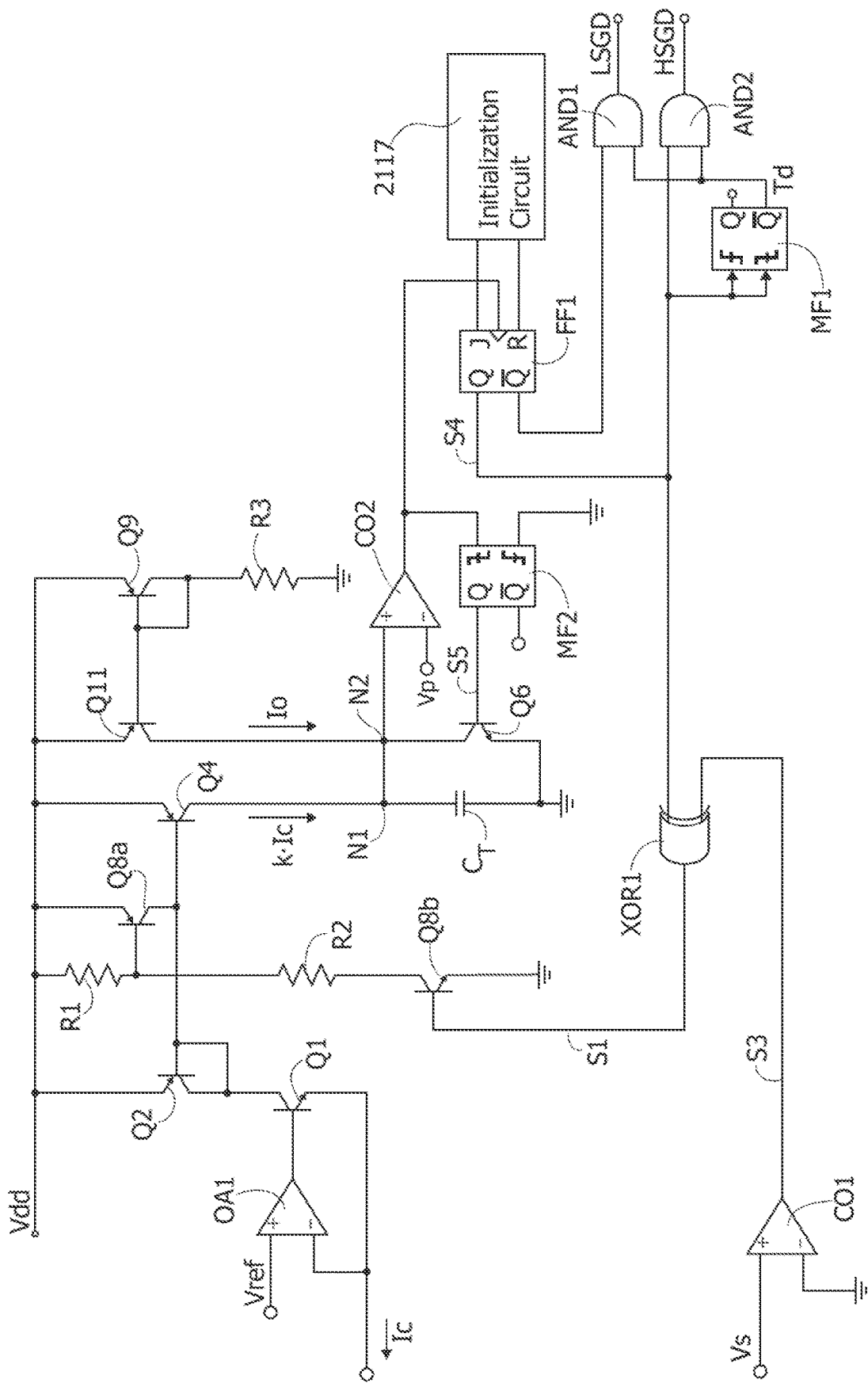
FIG. 9 shows an embodiment of the control device of FIG. 5.

FIG. 9 shows a circuit schematic of a control device in line with the embodiment shown in FIG. 5.

The control current Ic (which is modulated by the negative feedback control loop of the output voltage or current) is again provided to an optional input stage comprising an operational amplifier OA1 and transistor Q1 (see also the respective description of FIG. 8). Thus, the output of the operational amplifier OA1 controls a bipolar transistor Q1 allowing the current Ic to be delivered again towards a current mirror Q2–Q4, e.g., implemented with bipolar transistors, such as pnp bipolar transistors connected to a supply voltage Vdd. Accordingly, when enabled, the output Q4 of the current mirror provides again a current kIc to a node N1, which is also connected to the capacitor $C_T$.

FIG. 9 shows also an alternative sub-circuit for enabling the output Q4 of the current mirror Q2–Q4, which may also be used in place of the diode D1 and electronic switch Q8.

Specifically, in the embodiment considered, the current mirror Q2–Q4 may be selectively disabled via an electronic switch Q8a, e.g., a pnp bipolar transistor. In the embodiment considered, in order to correctly drive the control terminal of the electronic switch Q8a (e.g., the base terminal of a respective transistor), the sub-circuit may also comprise a pull-up resistor R1, and an electronic switch Q8b connected (optionally with a further resistor R2) between the control terminal of the electronic switch Q8a and ground, e.g., GND1. Accordingly, in the embodiment considered, the signal S1 may be applied to the control terminal of the electronic switch Q8b.

Thus, in the embodiment considered, the current mirror Q2–Q4 and the sub-circuit comprising the components Q8a, R1, R2 and Q8b implement the current generator 2102 of FIG. 5 providing a current kIc, which may be enabled/disabled selectively as a function of the control signal S1.

In the embodiment considered, the current generator 2114 is implemented (similar to the embodiment shown in FIG. 8) via:

a bias circuit configured to generate a current Io, such as a resistor R3; and a current mirror Q9–Q11, receiving at the input Q9 the current Io and providing at the output Q11 a current Io to the node N2, which is again connected to the capacitor $C_T$.

Accordingly, in the embodiment considered, when the current mirror Q2–Q4 is enabled, i.e., when the bipolar transistor Q8a having the collector and emitter terminals coupled between the supply voltage Vdd and the base terminal of transistors Q2 and Q4 is off, the mirror Q2–Q4 sources the current kIc towards the node N1/the capacitor $C_T$ thus charging it. The bipolar transistor Q8a is off (and the mirror Q2, Q4 is on) when the bipolar transistor Q8b is off; the bipolar transistor Q8a is on (and the mirror Q2, Q4 is off) when the bipolar transistor Q8b, driven by the exclusive-OR gate XOR1, is on. The capacitor $C_T$ is charged also by the current Io delivered by the current source made up of Q9, Q11 and R3 (which defines the value of Io≈Vdd/R3, assuming that Vdd>>Vbe). In various embodiments, this generator is always on.

In line with the description of FIG. 5, in the embodiment considered, the driver circuit 210a comprises also a reset circuit 2118. Specifically, in the embodiment considered, the reset circuit 2118 is implemented with an electronic switch Q6, such as a (e.g., npn) bipolar transistor Q6, configured to short-circuit the capacitor $C_T$, e.g., by connecting the node N1 to ground, as a function of the control signal S5.

Accordingly, in the embodiment considered, the control circuit 2106 has to generate the various control signals. Generally, in line with the description of FIG. 8, a comparator CO1 is used to generate the control signal S3 as a function of the measurement signal Vs.

Moreover, during each semi-period TA/TB, the driver circuit 210a is configured to:

a) enable the current generator 2102, i.e., enable the output Q4 of the current mirror Q2–Q4, when the signal Vs indicates that the resonant current has changed sign;

b) determine when the voltage $V_{CT}$ reaches the threshold Vp; and c) when the voltage $V_{CT}$ reaches the threshold Vp, reset the capacitor $C_T$ and start a new semi-period.

For this purpose, the circuit comprises again a comparator CO2 configured to determine when the voltage $V_{CT}$ reaches/exceeds the threshold Vp. The output of the comparator may then be provided to an optional trigger generator circuit, e.g., in the form of a monostable circuit MF2, configured to generate the control signal S5 used to reset the capacitor $C_T$ at the end of the semi-periods TA and TB.

In the embodiment considered, the output of the comparator CO2 is also provided to a flip-flop FF1, which changes output level in response to each rising edge of the signal at the output of the comparator. For example, in various embodiments is used a J-K flip-flop, which receives the signal at the output of the comparator CO2 as clock signal. Generally, such a J-K flip flop may have associated a circuit providing respective values in order to perform a toggling/inversion of the output levels, e.g., by applying a "1" to the J terminal and a "1" to the K terminal of the JK flip-flop FF1. Accordingly, the output of the flip-flop FF1 may again be used as control signal S4.

In the embodiment considered, a logic gate XOR1, such as an XOR gate, may then be used to generate the signal S1 as a function of the signals S3 and S4, because the current kIc should be enabled when the signal S3 is high and the signal S4 is low or when the signal S3 is low and the signal S4 is high. In fact, in the embodiments shown in FIGS. 5 and 9, the driver circuit 210a is configured to:

charge the capacitor $C_T$ with a first, non-zero, constant current Io in the time interval Tz of a switching half-cycle TA, TB) when the tank voltage and current have opposite sign (S3 is high and S4 is high, or S3 is low and S4 is low), charge the capacitor $C_T$ with a second constant current kIc+Io in the time interval of a switching half-cycle (TA, TB) when the voltage applied to the resonant tank and the current flowing through it have equal sign (S3 is high and S4 is low, or S3 is low and S4 is high), where the second (constant) current includes a current k representative of the feedback loop that controls either the output voltage or the output current of the converter and is larger than the first non-zero constant current Io, and toggle the half bridge and reset the capacitor $C_T$ when the capacitor voltage $C_T$ reaches a threshold voltage Vp.

In the embodiment considered, the signals LSGD and HSGD may thus be generated as in FIG. 8 as a function of the signal S4 (and its inverted version), e.g., by using a monostable circuit MF1 and two logic gates AND1 and AND2.

Specifically, in the embodiment considered, the voltage $V_{CT}$ on the capacitor $C_T$ is initially zero. An initialization circuit 2117 sets up the inputs J and K of the flip-flop FF1, e.g., to "0" and "1", respectively, so that the output Q thereof (signal S4) is low (and, therefore, the not-Q thereof is high), then it sets J=K="1". Thereby, from now, the flip-flop FF1 will act as a Toggle at every positive edge applied to its asynchronous input/clock input from the comparator CO2, adapted to compare the voltage $V_{CT}$ across the capacitor $C_T$ with the reference voltage Vp. Being the signal S4 asserted low, after a delay Td performed by the monostable device MF1, together with the gate AND1, the output LSGD becomes high and the low-side transistor of the half-bridge is switched on. The signal Vs is initially positive so the output (signal S3) of the comparator CO1 is firstly high, the output (signal S1) of the OR-exclusive port XOR1 receiving the signals S3 and S4 is thus high. The bipolar transistor Q8b is on and so is the bipolar transistor Q8a, thus the mirror Q2-Q4 is off, the capacitor $C_T$ is charged by the current Io only and a ramp with a slope of Io/$C_T$ will be observed.

When the signal Vs becomes negative as a result of the natural evolution of the tank current, the signal S3 becomes low, the inputs of the gate XOR1 will be both low and, therefore, the output (signal S1) thereof will become low. Transistor Q8b is switched off, transistor Q8a is switched off accordingly, and mirror Q2-Q4 is switched on, so that the current kIc flowing through transistor Q4 charges the capacitor $C_T$ and an ascendant voltage ramp of slope (kIc+Io)/$C_T$ will be observed thereon. Such a higher slope ramp is produced from the instant when the current of the resonant circuit becomes negative, i.e., it has the same sign as the voltage applied to the resonant circuit itself (negative per se when the low-side transistor of the half-bridge is switched on).

As soon as the voltage $V_{CT}$ on the capacitor $C_T$ reaches the reference voltage Vp, the output of comparator CO2 becomes high thus inverting the status of the outputs of flip-flop FF1, whose output Q (signal S4) becomes high (and not-Q becomes low). This causes the half-bridge to be switched: the output LSGD immediately becomes zero and, after a delay Td generated by the monostable device MF1 together with the gate AND2, the output HSGD becomes high, and the high-side transistor SW1 of the half-bridge is switched on.

Simultaneously, the output of the comparator CO2 going high triggers the monostable device MF2 that releases a short pulse that turns temporarily on the bipolar transistor Q6, which therefore quickly discharges the capacitor $C_T$. The duration of the pulse output by MF2 and, then, the on-time of Q6 should be sufficient to totally discharge $C_T$, so that the voltage $V_{CT}$ is reset essentially at zero.

The signal Vs is still negative, whereby the output of comparator CO1 (signal S3) is low and the output (signal S1) of gate XOR1, being the signal S4 high, is forced high and therefore the transistor Q8b and Q8a are switched on, thus switching off the current mirror Q2-Q4. Again, the capacitor $C_T$ is charged by the current Io only and a ramp with a slope of Io/$C_T$ will be observed as long as the voltage Vs remains negative.

Due to switching, however, the voltage now applied to the resonant circuit is positive whereby, after a short time, the current of the resonant circuit will also become positive, and so will do the voltage Vs. The output (signal S3) of comparator CO1 becomes high, that of gate XOR1 (signal S1), with both inputs being high (signals S3 and S4), becomes low, the transistors Q8b and Q8a are switched off and current mirror Q2-Q4 switches on charging the capacitor $C_T$ with its current kIc. An ascendant voltage ramp of slope (kIc+Io)/$C_T$ will be observed thereon. Such a ramp is produced from the instant when the current of the resonant circuit is positive and, i.e., the sign thereof is the same as that of the voltage applied to the resonant circuit itself (positive per se when the high-side transistor of the half-bridge is switched on).

This charge proceeds until the voltage across the capacitor $C_T$ reaches the value Vp once again, and the output of CO2 becomes high, therefore inverting the status of the outputs of FF1, whose output Q (signal S4) becomes zero. This causes the half-bridge to be switched: the output HSGD immediately becomes zero and, after a delay Td generated by MF1 together with the gate AND1, the output LSGD becomes high, and the low-side transistor the half-bridge is switched on.

Simultaneously, the output of CO2 going high triggers the monostable device MF2 that releases a short pulse that turns temporarily on the bipolar transistor Q6, which therefore quickly discharges the capacitor $C_T$. The duration of the pulse output by MF2 and, then, the on-time of Q6 should again be sufficient to totally discharge $C_T$, so that the voltage $V_{CT}$ is reset essentially at zero and a new cycle with the same phases as previously described starts.

Also in this case, the feedback current Ic controls the time distance between the zero crossings of the current of the resonant circuit and the following switching of the half-bridge. The equations describing the operation of this circuit and the resulting control law can be found by (1), (2) and (3) in which Vv=0.

The inventor has observed that the embodiments disclosed herein permit to implement a driver circuit 210*a* less prone to alter the duty cycle of the generated square-wave from 50% and, then, able to mitigate the issue of asymmetries in the resonant current and unequal distribution of the secondary currents.

For example, with reference to the embodiment shown in FIG. 9 and assuming that the zero-current comparator CO1 has a positive offset, e.g., 5 mV, the tank current is recognized as negative as long as the voltage Vs is smaller than 5 mV and positive only when Vs is greater than 5 mV. Therefore, in the positive half-cycles TB (i.e., when the high-side switch SW1 of the half-bridge is on) the positive-going zero-crossing of the tank current is detected when it is already greater than zero and then later than in the negative half-cycles TA (i.e., when the low-side switch SW2 of the half-bridge is on) where the negative-going zero-crossing of the tank current is detected when it is still greater than zero. As a result, with a fixed commanded time-shift $T_{SH}$, the duration of the positive half-cycles TB will be longer than the negative half-cycles TA.

Without the described compensation technique, e.g., Io=0, the commanded time-shift $T_{SH}$ is exactly the same in both half-cycles, so any mismatch ΔTz in the detection of the zero-crossing instants translates into the same mismatch in the duration of the two half-cycles.

With the proposed method, the value of the ramp at the end of the slow-charge phase with the proposed compensation technique only will be higher in the positive half-cycles TB (where it lasts longer) than in the negative half-cycles TA (where it is shorter). Therefore, in the positive half-cycles TB it will take a shorter time for the ramp to reach the reference level Vp and a longer time in the negative half-cycles TA. There will be a mismatch $\Delta T_{SH}$ of the commanded time-shift in the two half-cycles that has the opposite sign of ΔTz, so that it tends to compensate ΔTz.

In general, also other disturbance causing a change ΔTz in the instant Tz when the zero-crossing of the Vs signal is detected may be partly compensated by a change $\Delta T_{SH}$ that will reduce the change in the duration of the resulting half-cycle.

Noticeably, in the embodiments considered, the constant current source Io is always active along each switching half-cycle (TA or TB).

As an alternative option, this current source might be active only during the first interval Tz of each semi-period TA/TB (i.e., for 0≤t≤Tz), so that the slopes of the ramp for Tz≤t≤Ts/2 in each switching half-cycle would be ±kIc/$C_T$ (instead of ±(kIc+Io)/$C_T$).

As another alternative option, the constant current source Io might be active only during the time interval Tz<t≤Ts/2 and the current ±kIc always active during each switching half-cycle, so that the slopes of the ramp would be ±kIc/$C_T$ for 0≤t≤Tz and again ±(kIc+Io)/$C_T$ in the remainder of the switching half-cycle.

In fact, the inventor has observed that any current generator (or combination of current generates) configured to generate a lower slope in the time interval 0≤t≤Tz and a greater slope in the time interval Tz≤t≤Ts/2 may be used.

In the embodiments considered so far the amplitude of the ramps is constant and the feedback current Ic modulates the slope of the ramp in the time interval Tz<t≤Ts/2 and optionally also in the interval 0≤t≤Tz, thus modulating the commanded $T_{SH}$. In general, a similar modulation of the time $T_{SH}$ may be achieved by keeping constant the slopes of the ramps (a lower slope in the time interval 0≤t≤Tz and a greater slope in the time interval Tz<t≤Ts/2) and modulating/varying the amplitude of the ramps as a function of the current Ic. This modulation may involve either of the two voltage levels Vp or Vv (or both of them).

Figure 10:
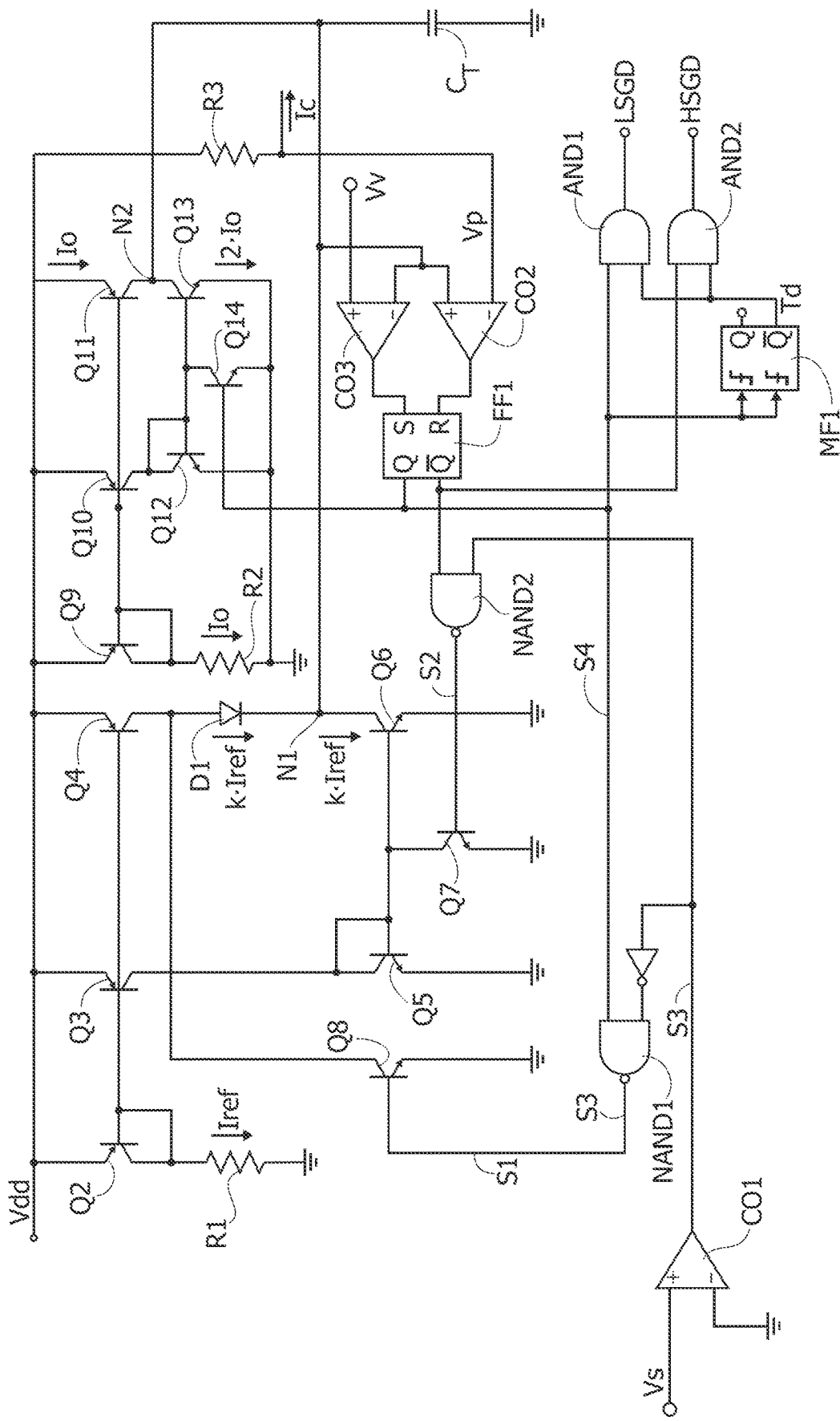
FIG. 10 shows a second embodiment of a control device for a resonant converter using enhanced TSC method.

For example, FIG. 10 shows an embodiment in line with the arrangement shown in FIG. 8, wherein the feedback current Ic modulates the voltage level Vp only.

In this case, the input Q2 of the current mirror Q2–Q3/Q2–Q4 is connected to a bias circuit, such as a resistor R1, configured to generate a (constant) reference current Iref. Accordingly, when enabled, the output Q4 provides a current k·Iref to the node N1 and the output Q6 of the current mirror Q5–Q6 provides a current –k·Iref to the node N1.

As earlier mentioned, unlike the previous embodiments where Vp was internally fixed and the control current Ic determined the slope of the ramp $V_{CT}$, in this case the control current Ic (which again may be received at an external pin) is used to modulate the reference voltage Vp. For example, in the embodiment considered, the terminal receiving the current Ic is connected (e.g., directly) to a first terminal of a resistor R3 and the second terminal of the resistor R3 is connected (e.g., directly) to the supply voltage Vdd. Accordingly, the voltage at the first terminal of the resistor R3 may be used as reference voltage Vp, with Vp=Vdd–R3·Ic.

The inventor has observed that this operation is still consistent with the required operation of the loop: in the embodiments where Ic controls the slope of the ramp $V_{CT}$, a larger Ic produces a faster charge and, then a shorter $T_{SH}$; vice versa a smaller Ic produces a slower charge and, then a longer $T_{SH}$. Similarly, in this embodiment a larger Ic produces a lower Vp and, then, a shorter $T_{SH}$; a smaller Ic produces a larger Vp and, then a longer $T_{SH}$.

The remaining blocks/circuits and the operation of this circuit are identical to those of the circuit shown in FIG. 8, so they will not be described again.

Therefore, the control law linking the commanded time-shift $T_{SH}$ to the control voltage Vp (that is a function of the control current Ic) is:

$$T_{SH} = \frac{(Vp - Vv)C_T - Io\frac{Ts}{2}}{kI_1}. \tag{4}$$

Accordingly, in the embodiment considered, the driver circuit 210*a* is configured to:
- alternately charge and discharge the capacitor $C_T$ with a first, non-zero, constant current Io in the time intervals of a switching cycle when tank voltage and current have opposite sign,
- alternately charge and discharge the capacitor $C_T$ with a second constant current, larger than the first non-zero constant current, in the time intervals of a switching cycle when the voltage applied to the resonant tank and the current flowing through it have equal sign, and
- toggling the half bridge and reversing the charge/discharge phases of the capacitor $C_T$ when the capacitor voltage reaches a lower or an upper threshold value, where (at least) the upper threshold value is determined as a function of the feedback control signal Ic.

Generally, while in the embodiments described in the foregoing, a fixed current Io and optionally Iref has been used, one or more of these currents may also be settable, e.g., by providing a terminal of the driver circuit 210a to be connected to a respective external bias circuit, such as an external resistor R2 or resistor R1.

Figure 14:
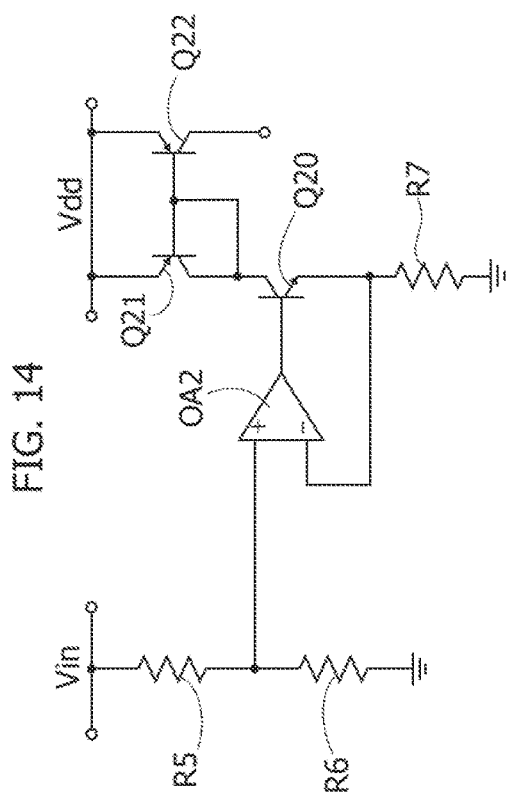
FIG. 14 shows an example of generation of a current control signal proportional to the input voltage of a converter.

Conversely, FIG. 14 shows an embodiment wherein the current may be set via a voltage signal. For example, in the embodiment considered, the voltage signal is provided via a resistive voltage divider comprising two resistors R5 and R6 connected between a voltage, such as the input voltage Vin, and ground, e.g., GND1. For example, this has the advantage that the voltage signal is determined as a function of (is proportional to) the input voltage Vin. For example, this provides a kind of feedforward control, permitting to reduce the changes needed in the control signal Ic to keep the output voltage (or current) regulated when the input voltage Vin changes, thus further improving the transient response to input voltage variations and the rejection of the input voltage ripple.

In the embodiment considered, the voltage signal (e.g., at the resistor R6) is connected to a first (e.g., the non-inverting) input of an operation amplifier OA2, the output of the operation amplifier OA2 is connected to a variable current generator Q20, e.g., implemented with a (e.g., npn) bipolar transistor. The output of the current generator Q20 is connector via a resistor R7 to ground, thereby generating a voltage at the resistor being proportional to the current provided by the current generator Q20. By connecting the voltage to a second (e.g., the inverting) input terminal of the operation amplifier OA2, the operation amplifier OA2 will essentially vary the output signal, thereby varying the current provided by the current source Q20, in order to impose the voltage signal at the first input terminal on the resistor R7.

In the embodiment considered, a current mirror Q21–Q22, e.g., implemented with (e.g., pnp) bipolar transistors, may thus be used to provide a current proportional to the voltage signal.

A similar modification as discussed with respect to FIG. 10 may also be performed in the embodiment of FIG. 9. Specifically, in this case the current generator 2102, which may be enabled selectively as a function of the signal S1, provides a current k·Iref and the current generator 2114 provides always a current Io.

Figure 11:
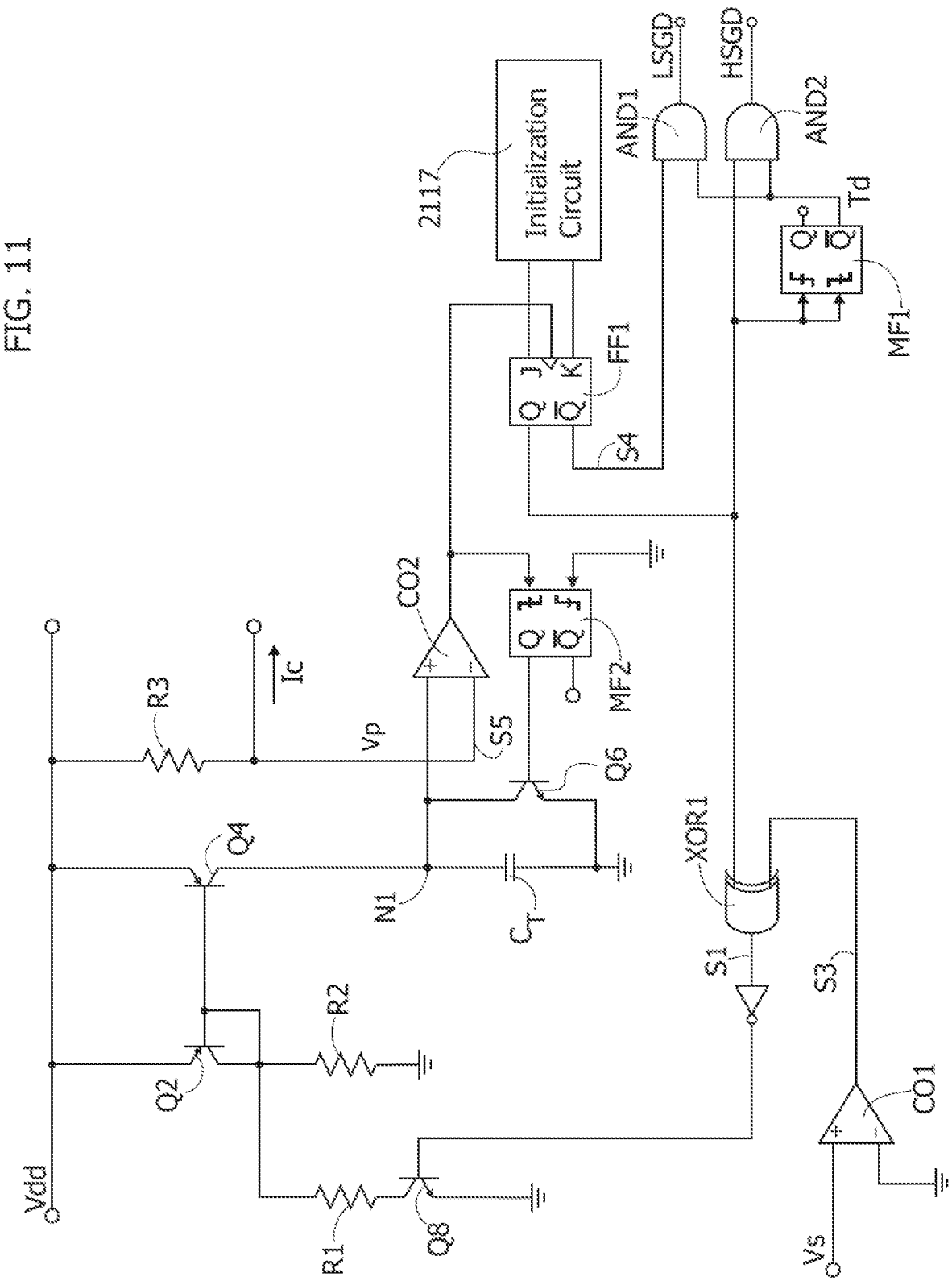
FIG. 11 shows a third embodiment of a control device for a resonant converter using enhanced TSC method.

For example, in FIG. 11 is shown an embodiment, wherein both current generators 2102 and 2114 are implemented with the same current generator, which comprises:
 a first bias circuit, such as a first resistor R1,
 an electronic switch Q8 configured to selectively enable the first bias circuit as a function of the control signal S1, and
 a second bias circuit, such as a second resistor R2, configured to provide the current Io,
 a current mirror Q2–Q4, wherein the input Q2 of the current mirror is connected to the first and second bias circuit.

Specifically, in the embodiment considered, the capacitor $C_T$ is charged by the current delivered by the output Q4 of the current mirror Q2–Q4. In the embodiment considered (when using resistors as bias circuits), the value of this current is defined differently, depending on the state of the electronic switch Q8/signal S1: assuming that Vdd>>Vbe, when the electronic switch Q8 is off the output Q4 provides a current $Io_1 \approx Vdd/R2$, and when the electronic switch is Q8 is on the output Q4 provides a current $Io_2 \approx Vdd/(R1/R2)$ (parallel connection of the resistors R1 and R2, with $Io_2 > Io_1$.

Specifically, considering the logic levels of the signal S1, the electronic switch Q8 is driven by the negated/inverted signal S1, i.e., the electronic switch Q8 is off when the signal S1 is high (i.e., when the tank current and the applied voltage have opposite signs) and is on when the signal S1 is low (i.e., when the tank current and the applied voltage have the same sign).

In the embodiment considered, this current generator is always on but could be optionally switched off during the discharge/reset of $C_T$ to reduce the overall consumption. The same applies also to the embodiments described with respect to FIGS. 5 and 9.

Moreover, in line with the description of FIG. 10, a resistor R3 connected to the supply voltage may be used to generate the reference voltage Vp as a function of the current Ic.

The remaining blocks/circuits and the operation of this circuit are identical to those of the circuit shown in FIG. 9, so they will not be described again.

Thus, in the embodiment considered, the voltage $V_{CT}$ on the capacitor $C_T$ is initially zero. The initialization circuit 2117 sets the inputs J and K of the flip-flop FF1 to "0" and "1", respectively, so that the output Q (signal S4) thereof is low, then the circuits 2117 sets J=K="1". Thereby, from now, the flip-flop FF1 will act as a Toggle at every positive edge applied to its asynchronous/clock input from the comparator CO2, adapted to compare the voltage $V_{CT}$ across the capacitor $C_T$ with the reference voltage Vp determined as a function of the control current Ic. Being Q (signal S4) asserted low, after a delay Td performed by the monostable device MF1 having the output Q (signal S4) of the flip-flop FF1 at the input, together with the gate AND1, the output LSGD becomes high and the low-side transistor SW2 of the half-bridge is switched on. The signal Vs is initially positive so the output of the comparator CO1 is firstly high, the output (signal S1) of the OR-exclusive port XOR1 receiving the output of comparator CO1 and the output Q (signal S4) (currently low) of flip-flop FF1 at the input is thus high. Accordingly, the bipolar transistor Q8 is off, and the current generator Q2–Q4 charges the capacitor $C_T$ with a current $Io_1$, and a ramp with a slope of $Io_1/C_T$ will be observed.

When the signal Vs becomes negative as a result of the natural evolution of the tank current, the output (signal S3) of the comparator CO1 will become low, the inputs of the gate XOR1 will be both low and, therefore, the output (signal S1) thereof will become low. Accordingly, the transistor Q8 is switched on and the current generator Q2–Q4 charges the capacitor $C_T$ with a current $Io_2$, wherein in general $Io_2=k\cdot Io_1$, and an ascendant voltage ramp of slope $Io_2/C_T$ will be observed thereon. Such a (k times) higher slope ramp is produced from the instant when the current of the resonant circuit becomes negative, i.e., it has the same sign as the voltage applied to the resonant circuit itself (negative per se when the low-side transistor of the half-bridge is switched on).

As soon as the voltage $V_{CT}$ on the capacitor $C_T$ reaches the reference voltage Vp, the output of comparator CO2 becomes high thus inverting the status of the output (signal S4) of flip-flop FF1, whose output Q (signal S4) becomes one. This causes the half-bridge to be switched: the output LSGD immediately becomes zero and, after a delay Td generated by the monostable device MF1 together with the gate AND2, the output HSGD becomes high, and the high-side transistor of the half-bridge is switched on.

Simultaneously, the output of CO2 going high triggers the monostable device MF2 that releases a short pulse that turns temporarily on the bipolar transistor Q6, which therefore quickly discharges the capacitor $C_T$. The duration of the pulse output by MF2 and, then, the on-time of Q6 should be sufficient to totally discharge $C_T$, so that the voltage $V_{CT}$ is reset essentially at zero.

The signal Vs is still negative, whereby the output of comparator CO1 is low and the output (signal S1) of gate XOR1, being Q (signal S4) high, is forced high and therefore the transistor Q8 is off. Again, the capacitor $C_T$ is charged by the current $Io_1$ delivered by the current generator Q2–Q4 and a ramp with a slope of $Io_1/C_T$ will be observed as long as the voltage Vs remains negative.

Due to switching, however, the voltage now applied to the resonant circuit is positive whereby, after a short time, the current of the resonant circuit will also become positive, and so will do the voltage Vs. The output (signal S3) of comparator CO1 becomes high, that of gate XOR1 (signal S1), with both inputs being high, becomes low, the transistors Q8 is switched on and the current generator Q2–Q4 charges the capacitor $C_T$ with its current $Io_2$. An ascendant voltage ramp of slope $Io_2/C_T$ (k times larger than $Io_1/C_T$) will be observed thereon. Such a ramp is produced from the instant when the current of the resonant circuit is positive and, i.e., the sign thereof is the same as that of the voltage applied to the resonant circuit itself (positive per se when the high-side transistor SW1 of the half-bridge is switched on).

This faster charge proceeds until the voltage across the capacitor $C_T$ reaches the value Vp once again, and the output of CO2 becomes high, therefore inverting the status of the outputs of FF1, whose output Q (signal S4) becomes zero. This causes the half-bridge to be switched: the output HSGD immediately becomes zero and, after a delay Td generated by MF1 together with the gate AND1, the output LSGD becomes high, and the low-side transistor SW2 the half-bridge is switched on.

Simultaneously, the output of CO2 going high triggers the monostable device MF2 that releases a short pulse that turns temporarily on the bipolar transistor Q6, which therefore quickly discharges the capacitor $C_T$. The duration of the pulse output by MF2 and, then, the on-time of Q6 should be sufficient to totally discharge $C_T$, so that the voltage $V_{CT}$ is reset essentially at zero and a new cycle with the same phases as previously described starts.

The equations describing the operation of this circuit and the resulting control law can be found following the same method used to derive (1), (2), (3) and (4), with Vv=0. The result is:

$$T_{SH} = \frac{VpC_T - Io_1 \frac{Ts}{2}}{(k-1)Io_1}. \quad (5)$$

Accordingly, in the embodiment considered, the driver circuit 210a is configured to perform the following steps during each half-period (TA or TB):

charge the capacitor $C_T$ with a first, non-zero, constant current in a first time-interval Tz of a switching half-cycle (TA or TB) when the tank voltage and current have opposite sign (i.e., before the comparator CO1 signals that the resonant current has changed sign), charge the capacitor $C_T$ with a second constant current, larger than the first non-zero constant current, up to an upper reference voltage Vp that is a function of a feedback signal Ic representative of the feedback loop that controls either the output voltage or the output current of the converter, in a second time interval of a switching half-cycle when the voltage applied to the resonant tank and the current flowing through it have equal sign (i.e., after the comparator CO1 signals that the resonant current has changed sign), and toggle the half bridge and resetting the capacitor $C_T$ (and ending the respective half-period TA or TB) when the capacitor voltage $V_{CT}$ reaches the upper reference voltage.

Accordingly, in the embodiments discussed so far, during each semi-period TA and TB, the integration circuit 2300 is configured to:

during a first interval (Tz) between the instant when the respective interval (TA or TB) starts and the instant when the comparator CO1 signals via the signal S3 that the resonant current has changed sign/reached zero (i.e., when the voltage at the resonant tank and the resonant current have opposed signs), generate an integration signal INT (e.g., $V_{CT}$) by integrating a signal having a given first (and preferably constant) amplitude; and during a second interval between the instant when the comparator CO1 signals via the signal S3 that the resonant current has changed sign/reached zero and the instant when the comparator CO2 signals that the integration signal has reached a given threshold value (i.e., when the voltage at the resonant tank and the resonant current have the same sign), generate the integration signal INT (e.g., $V_{CT}$) by integrating a signal having a given second amplitude, wherein the second amplitude is in general greater than the first amplitude.

Specifically, in the embodiments discussed with respect to FIGS. 3 to 9, the driver circuit 210a is configured to determine the second amplitude during the second time interval (and optionally also the first amplitude during the first time interval) as a function of the feedback control signal Ic, while the threshold value Vp remains constant. Conversely, in the embodiments shown in FIGS. 10 and 11, the driver circuit 210a is configured to determine the threshold value Vp (and/or Vv) as a function of the feedback control signal Ic, while the first and the second amplitude during the first and second time interval remain constant.

In general, while so far current signals (Ic, Iref and Io) have been processed, these signals may also be replaced with voltage signals. Moreover, instead of performing an analog processing, at least part of the operations may also be implemented in digital, e.g., by means of a suitable programming of a digital microprocessor.

Figure 12:
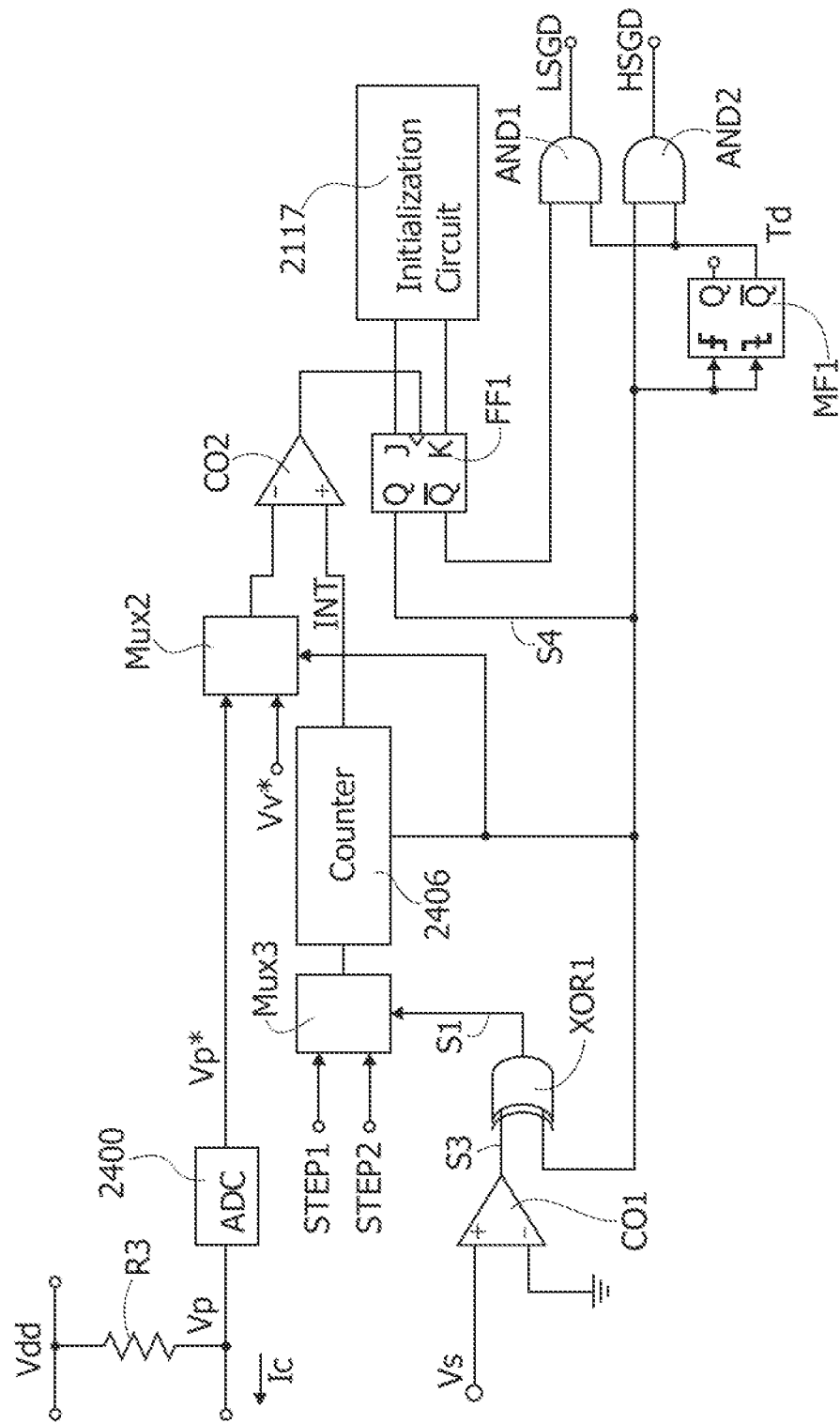
FIGS. 12 and 13 show digital implementations of the control device of FIG. 10.

For example, FIG. 12 shows a possible implementation wherein part of the blocks of FIG. 10 are implemented in digital.

Specifically, in the embodiment considered, the driver circuit 210a comprises an analog-to-digital converter (ADC) 2400 for determining a digital signal indicative of the feedback signal Ic. For example, in the embodiment considered, the feedback current Ic is connected to a first terminal of a resistor R3 and a second terminal of the resistor is connected to the supply voltage Vdd. Accordingly, the ADC 2400 may converter the voltage at the first terminal of the resistor R3. In general, the circuit for the Ic to Vp conversion (R3), and/or the ADC 2400 may be either internal or external to the integrated circuit of the driver circuit 210a.

In the embodiment considered, the digital sample acquired by the ADC 2400 corresponds thus to (or in general may be used to determine) a digital version Vp* of the upper threshold Vp.

In the embodiment considered, this binary word Vp* is applied to one input of a (digital) multiplexer MUX2 that, on the other input, receives a binary word Vv* indicative of the lower threshold Vv. The digital signal selected by the multiplexer MUX2 is applied the inverting input of a digital comparator CO2. The digital comparator CO2 receives also the output of an up-down N-bit counter 2406 on its non-inverting input.

In the embodiment considered, the counter direction of the counter 2406 and the selection performed by the multiplexer MUX2 is determined as a function of the signal provided by the comparator CO2 and is reversed at the beginning of each switching half-cycle (TA or TB): when the output of the comparator CO2 is low the counter 2406 counts up and MUX2 provides Vp* on to the inverting input of CO2; when it is high, the counter 2406 counts down and MUX2 passes Vv* on to the inverting input of CO2.

For example, in the embodiment shown in FIG. 12, the output of the comparator CO2 may again be fed to a JK flip-flop with associated initialization circuit 2117, which thus provides a signal S4 indicating whether the half-period is the interval TA (low-side switch closed) or TB (high-side switch closed).

Figure 13:
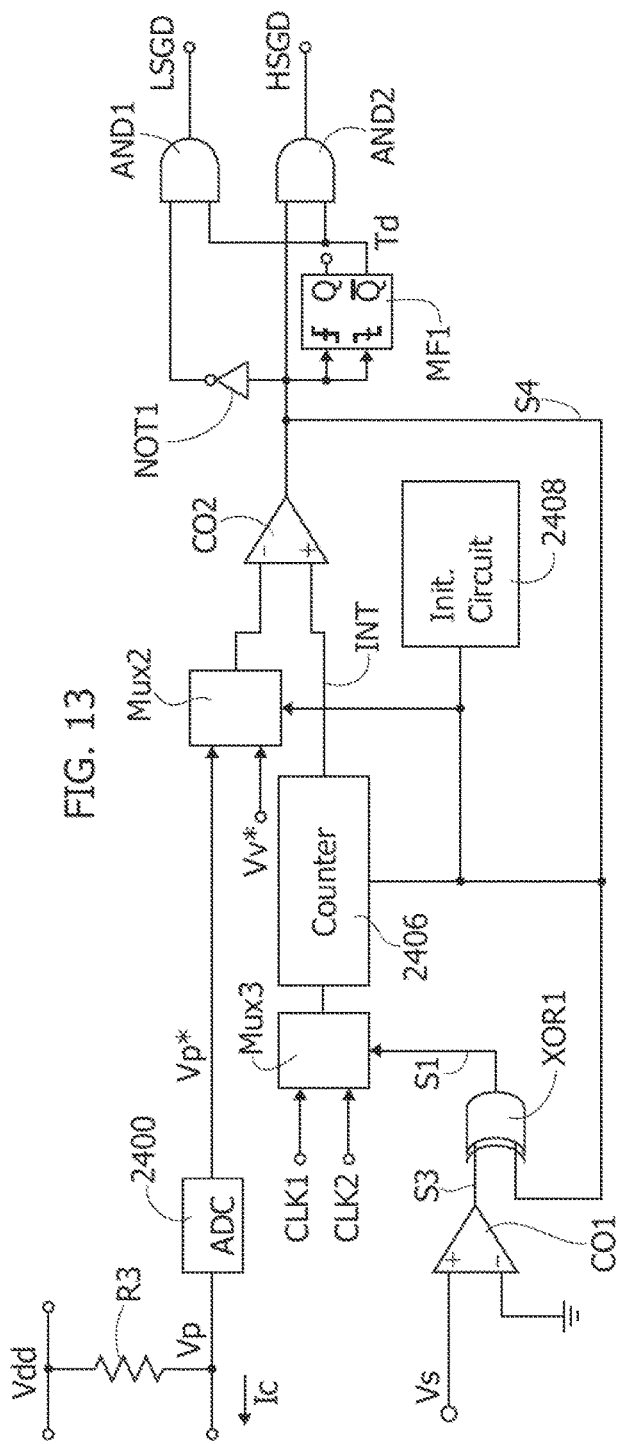

Conversely, FIG. 13 shows that in a digital implementation, the flip-flop FF1 is not strictly necessary (and may be omitted), because when switching immediately the threshold values at the multiplexor MUX2, the signal at the output of the comparator CO2 corresponds directly to the signal S4. However, in this case is preferably used a circuit 2408 which is configured to select the initial configuration for the counter 2406 and the multiplexor MUX2.

In the embodiment considered, the digital counter 2406 is thus configured to (in each half-period TA or TB):

during a first interval (Tz) between the instant when the respective interval (TA or TB) starts and the instant when the comparator CO1 signals via the signal S3 that the resonant current has changed sign/reached zero (i.e., when the voltage at the resonant tank and the resonant current have opposed signs), generate an integration signal INT by integrating (i.e., increasing or decreasing) a count value with a first step size STEP1; and during a second interval between the instant when the comparator CO1 signals via the signal S3 that the resonant current has changed sign/reached zero and the instant when the comparator CO2 signals that the integration signal has reached a given threshold value, generate the integration signal INT by integrating (i.e., increasing or decreasing) the count value with a second step size STEP2, wherein the second step size is greater than the first step size.

For example, in FIG. 12, a multiplexor MUX3 is used to provide the step size STEP1 or STEP2 to the counter 2406 as a function of the signal S3 (e.g., again at the output of an XOR gate XOR1 receiving the signals S3 and S4).

Conversely, as shown in FIG. 13, the step size may also remain constant, but the counter clock signal is changed, i.e.:

during a first interval (Tz) between the instant when the respective interval (TA or TB) starts and the instant when the comparator CO1 signals via the signal S3 that the resonant current has changed sign/reached zero (i.e., when the voltage at the resonant tank and the resonant current have opposed signs), generate an integration signal INT by integrating (i.e., increasing or decreasing) a count value with a constant step size in response to a first clock signal CLK1; and during a second interval between the instant when the comparator CO1 signals via the signal S3 that the resonant current has changed sign/reached zero and the instant when the comparator CO2 signals that the integration signal has reached a given threshold value, generate the integration signal INT by integrating (i.e., increasing or decreasing) the count value with a constant step size in response to a second clock signal CLK2, wherein the second clock signal CLK2 is faster than the first clock signal CLK1.

For example, in the embodiment considered, the clock signal of the counter 2406 is selected amongst the clock signals CLK1 and CLK2 via a multiplexor MUX3, which is driven via a logic (e.g., XOR gate) XOR1 receiving at input the signals S3 and S4. For example, the clock signal CLK1 may be derived from the clock signal CLK2 by means of a frequency divider. In the embodiment considered, the signal S3 is determined again as in the previous embodiments via an analog comparator CO1.

Generally, the blocks MF1 and the gates AND1 and AND2 may also be implemented via a corresponding digital processing in order to set:

in response to a rising edge of the signal S4, set the signal LSGD immediately to low and the signal HSGD to high after a delay Td; and in response to a falling edge of the signal S4, set the signal HSGD immediately to low and the signal LSGD to high after a delay Td.

Accordingly, in the embodiments shown in FIGS. 12 and 13, e.g., due to the initialization circuits 2117 or 2408, the counter 2406 is set initially to zero, the count direction is up and the multiplexor MUX2 provides the value Vp*. Consistently with this, the output of the comparator CO2 is low, so that the drive signal HSGD is asserted low and, after a delay Td (e.g., via the monostable device MF1 having the output Q of the flip-flop FF1 at the input, together with the gate AND1), the output LSGD becomes high and the low-side transistor SW2 of the half-bridge is switched on.

Assuming that the signal Vs is initially positive, so the output of the comparator CO1 (signal S3) is firstly high, the output of the port XOR1 (signal S1) is thus high. Accordingly, the multiplexor MUX3 selects the smaller step size STEP1 (FIG. 12) or slower clock signal CLK1 (FIG. 13), and the counter 2406 starts counting. When the signal Vs becomes negative as a result of the natural evolution of the tank current, the output of the comparator CO1 (signal S3) will become low, the inputs of the gate XOR1 will be both low and, therefore, the output thereof (signal S1) will become low. Accordingly, the multiplexor MUX3 selects the greater step size STEP2 (FIG. 12) or faster clock signal CLK2 (FIG. 13), and the counter continues counting.

Accordingly, in both cases, the effective increase rate/gradient (with respect to a given reference period e.g., 1 s) of the signal INT at the output of the counter 2406 increase from the instant when the current of the resonant circuit becomes negative, i.e., it has the same sign as the voltage applied to the resonant circuit itself (negative per se when the low-side transistor of the half-bridge is switched on).

As soon as the signal INT at the output of the counter 2406 reaches the reference digital word Vp*, the output of the digital comparator CO2 becomes high, thereby setting the signal S4 to high. This causes the half-bridge to be switched: the output LSGD immediately becomes zero and, after a delay Td (e.g., generated by the monostable device MF1 together with the gate AND2), the output HSGD becomes high, and the high-side transistor SW1 of the half-bridge is switched on.

Simultaneously, being the signal S4 high, the counter 2406 reverses its direction from up to down and the multiplexor MUX2 outputs Vv*, which confirms that the output of CO2 remains high. As described in the foregoing, for this reason the flip-flop FF1 may be omitted.

The signal Vs is still negative, whereby the output of comparator CO1 (signal S3) is low and the output of gate XOR1 (signal S1), being the signal S4 high, is forced high. Accordingly, the multiplexor MUX3 selects the smaller step size STEP1 (FIG. 12) or slower clock signal CLK1 (FIG. 13), and the counter 2406 starts counting down. When the signal Vs becomes positive as a result of the natural evolution of the tank current, the output of the comparator CO1 (signal S3) will become high, the inputs of the gate XOR1 will be both high and, therefore, the output thereof (signal S1) will become low. Accordingly, the multiplexor MUX3 selects the greater step size STEP2 (FIG. 12) or faster clock signal CLK2 (FIG. 13), and the counter continues counting.

Accordingly, in both cases, the effective increase rate/gradient (with respect to a given reference period e.g., 1s) of the signal INT at the output of the counter 2406 increase from the instant when the current of the resonant circuit becomes positive, i.e., it has the same sign as the voltage applied to the resonant circuit itself (positive per se when the high-side transistor of the half-bridge is switched on).

As soon as the signal INT at the output of the counter 2406 reaches the reference digital word Vv*, the output of the digital comparator CO2 becomes low, thereby setting the signal S4 to low. This causes the half-bridge to be switched: the output HSGD immediately becomes low and, after a delay Td (e.g., generated by MF1 together with the gate AND1), the output LSGD becomes high, and the low-side transistor SW2 the half-bridge is switched on.

Simultaneously, being the output of the digital comparator CO2 low, the counter reverses its direction from down to up and the multiplexor MUX2 selects the value Vp*, which confirms that the output of CO2 remains low, and a new cycle with the same phases as previously described starts.

Thus, also in the digital implementations, during each semi-period TA and TB, the integration circuit 2300 is configured to:
  during a first interval (Tz) between the instant when the respective interval (TA or TB) starts and the instant when the comparator CO1 signals via the signal S3 that the resonant current has changed sign/reached zero (i.e., when the voltage at the resonant tank and the resonant current have opposed signs), generate an integration signal INT (e.g., $V_{CT}$) having a first (non-zero) rising rate/gradient; and
  during a second interval between the instant when the comparator CO1 signals via the signal S3 that the resonant current has changed sign/reached zero and the instant when the comparator CO2 signals that the integration signal has reached a given threshold value, generate the integration signal INT (e.g., $V_{CT}$) having a second rising rate/gradient, wherein the second rising rate/gradient is greater than the first rising rate/gradient.

Also in this case, the second rising rate/gradient or alternatively the threshold value (Vp and Vv, or only Vp) of at least one of the semi-period TA and TB may be determined as a function of the feedback control signal Ic.

Generally, the frequencies of the clock signals CLK1 and/or CLK2, or the step sizes STEP1 and/or STEP2 may be settable.

Thus, essentially, the integration signal INT results for a combination of:
  during the complete semi-period TA or TB, a first linear part/ramp signal resulting from the integration of a constant signal (e.g., Io), and
  only during the second interval, a second (usually linear) part/ramp resulting from the integration of a second signal (e.g., Iref or kIc).

Thus, the signal INT may be considered as the superposition of two ramps, one starting at the beginning of each half cycle and the other starting from the moment the zero-current comparator detects a change of sign in the resonant current. In the embodiments considered so far this ramp superposition was achieved primarily by summing (or in general modifying) signals at the input of an (analog or digital) integrator. However, in general, instead of adding the signal Io to the input of the integration circuit, the corresponding first linear part/ramp signal may also be added directly to the output of the integration circuit.

Figure 15:
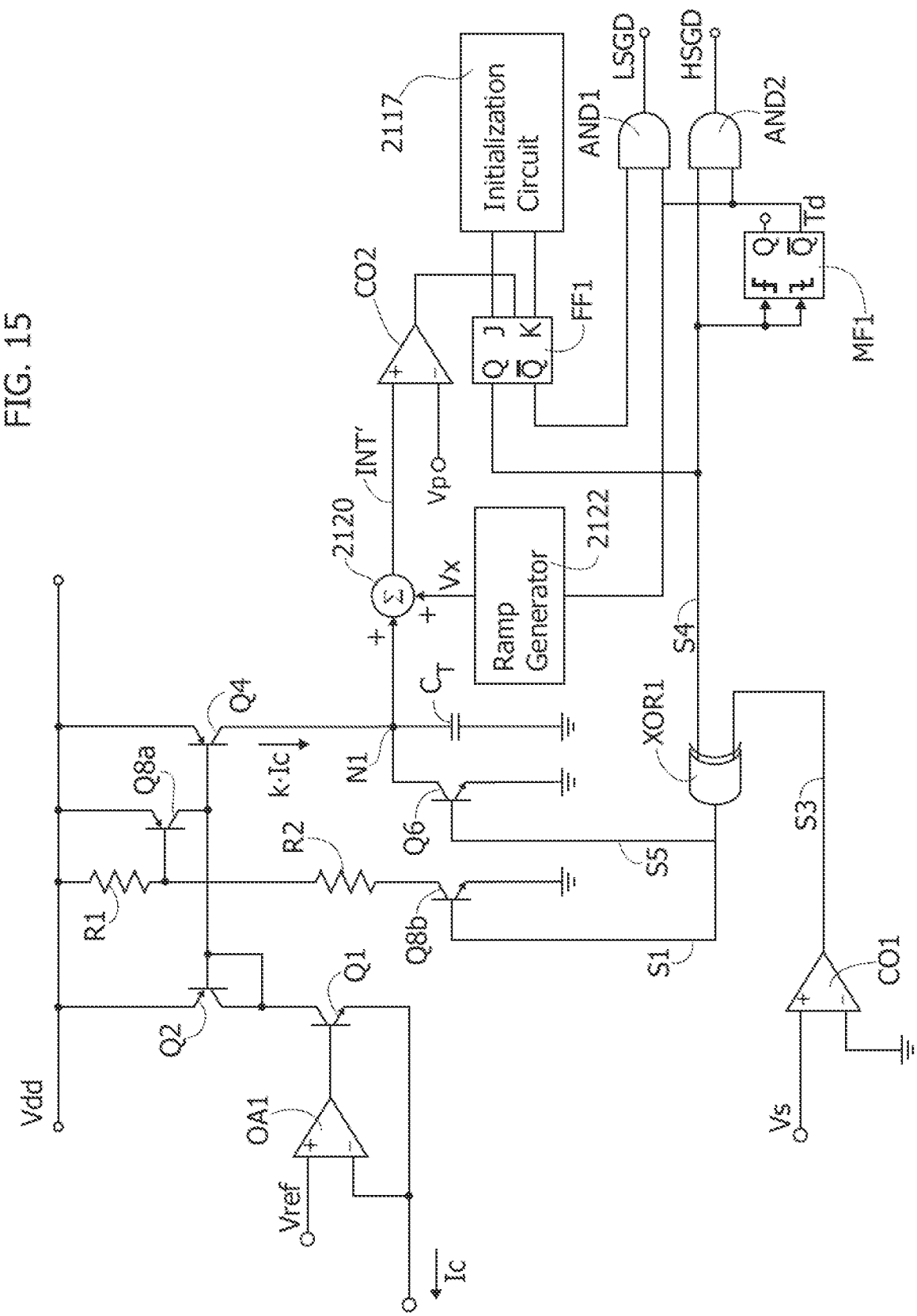
FIG. 15 shows a fourth embodiment of a control device for a resonant converter using enhanced TSC method.

For example, this is schematically shown in FIG. 15, which is essentially based on the embodiment of FIG. 9.

Specifically, the following modifications have been introduced with respect to FIG. 9:
  the current generator 2114 (e.g., implemented with the components R3, Q9 and Q11) has been removed;
  a ramp generator 2122 has been added, wherein the ramp generator 2122 essentially provides a voltage signal Vx corresponding to the integral of a constant value (which corresponds e.g., to the current Io discussed in the foregoing); and
  a (voltage) adder 2120 has been added, wherein the adder 2120 receives at input the integration signal INT/voltage $V_{CT}$ and the voltage signal Vx, and provides at output a signal INT', which is provided to the input of the comparator CO2.

In general, the ramp generator 2122 should be reset at the end or beginning of each half-period TA/TB. Accordingly, the ramp generator 2122 may be reset together with the capacitor $C_T$, e.g., via the reset circuit 2118, e.g., via the monostable device MF2. Conversely, in the embodiment considered, the capacitor $C_T$ is reset via the signal S1 (insofar as the capacitor should not be charged during the initial part Tz of the semi-periods TA and TB), while the ramp generator 2122 is reset separately at the end or beginning of each half-period TA/TB, e.g., by using again a monostable device MF2 or by using the signal at the output of the monostable device MF1.

Figure 16:
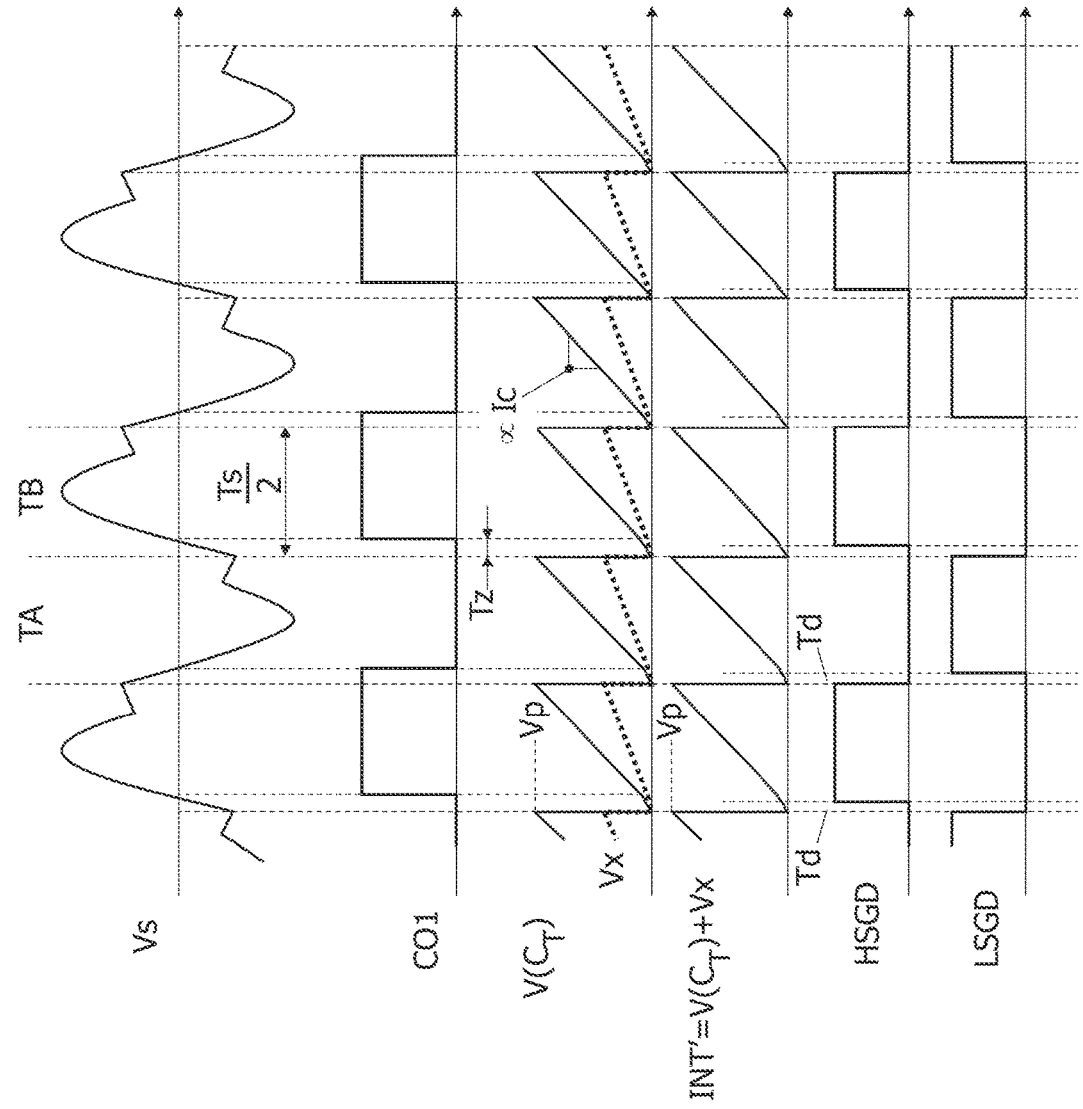
FIG. 16 shows time diagrams of the voltages involved in the device in FIG. 15.

For example, FIG. 16 shows exemplary waveforms for the voltage $V_{CT}$ at the capacitor $C_T$, the voltage Vx and the combined integration signal INT.

In general, similar modification may also be performed in the other embodiments.

Accordingly, in general, the driver circuit 210a comprises terminals (e.g., pins of a respective integrated circuit) configured to be connected to:
  the control (e.g., gate) terminals of a high-side and a low-side electronic switch SW1 and SW2 connected in series between a positive terminal 200a and a negative terminal 200b, wherein the intermediate node between two electronic switches SW1 and SW2 represents a switching node HB;
  a current sensor 222 able to monitor the resonant current Is flowing from the switching node HB to the resonant tank; and
  a feedback circuit 212-218 providing a feedback signal Ic determined as a function of the output voltage Vout or current Iout.

Specifically, the driver circuit 210a comprises an (analog or digital) integration circuit 2300, an (analog) comparator 2108/CO1 and a comparison circuit 2110 comprising at least one (analog or digital) comparator CO2/CO3.

Specifically, in various embodiments, the comparator 2108/CO1 is configured to generate a signal S3 indicating when the resonant current changes sign as a function of the signal Vs provided by the current sensor 222. The integration circuit 2300 receives at input a first signal and provides at output an integration signal INT. The comparison circuit is configured to determine whether the integration signal INT reaches at least one reference threshold Vp/Vv.

Specifically, during each semi-period TA/TB of each switching cycle Ts the driver circuit 210a is configured to:
during a first interval (Tz) between the instant when the respective semi-period (TA or TB) starts and the instant when the comparator CO1 signals via the signal S3 that the resonant current has changed sign (i.e., when the voltage at the resonant tank and the resonant current have opposed signs), set the first signal to zero; and
during a second interval between the instant when the comparator CO1 signals via the signal S3 that the resonant current has changed sign/reached zero and the instant when the comparison circuit signals that the integration signal INT has reached the at least one reference threshold Vp/Vv, determine the first signal (kIc or −kIc) as a function of a second signal (Ic or Iref).

In various embodiments, the second signal (Ic) or alternatively at least one of the reference thresholds Vp/Vv is determined as a function of the feedback signal Ic.

Specifically, in the embodiments considered till now, the driver circuit 210a is configured to modify the integration signal INT provided to the comparison circuit 2110 by:
adding a constant offset (e.g., Io or −Io based on the half-period) to the input of the integration circuit 2300; or
adding a linear ramp signal (Vx) to the integration signal INT at the output of the integration circuit 2300/at the input of the comparison circuit 2110.

Specifically, when the first signal at the input of the integration circuit 2300 is positive, a positive ramp signal has to be added to the threshold signal Vp, and when the first signal at the input of the integration circuit 2300 is negative, a negative ramp signal has to be added to the threshold signal Vp.

However, the inventor has found, adding a linear ramp signal (Vx) to the integration signal INT at a first input of a comparator (e.g., CO2) is equivalent to subtracting the same ramp signal (Vx) (or adding its negative version) to the upper threshold signal Vp at the second input of the comparator. Specifically, when the threshold signal corresponds to an upper threshold value Vp, a negative ramp signal has to be added to the threshold signal Vp, and when the threshold signal corresponds to a lower threshold value Vv, a positive ramp signal has to be added to the threshold signal Vv.

Figure 17:
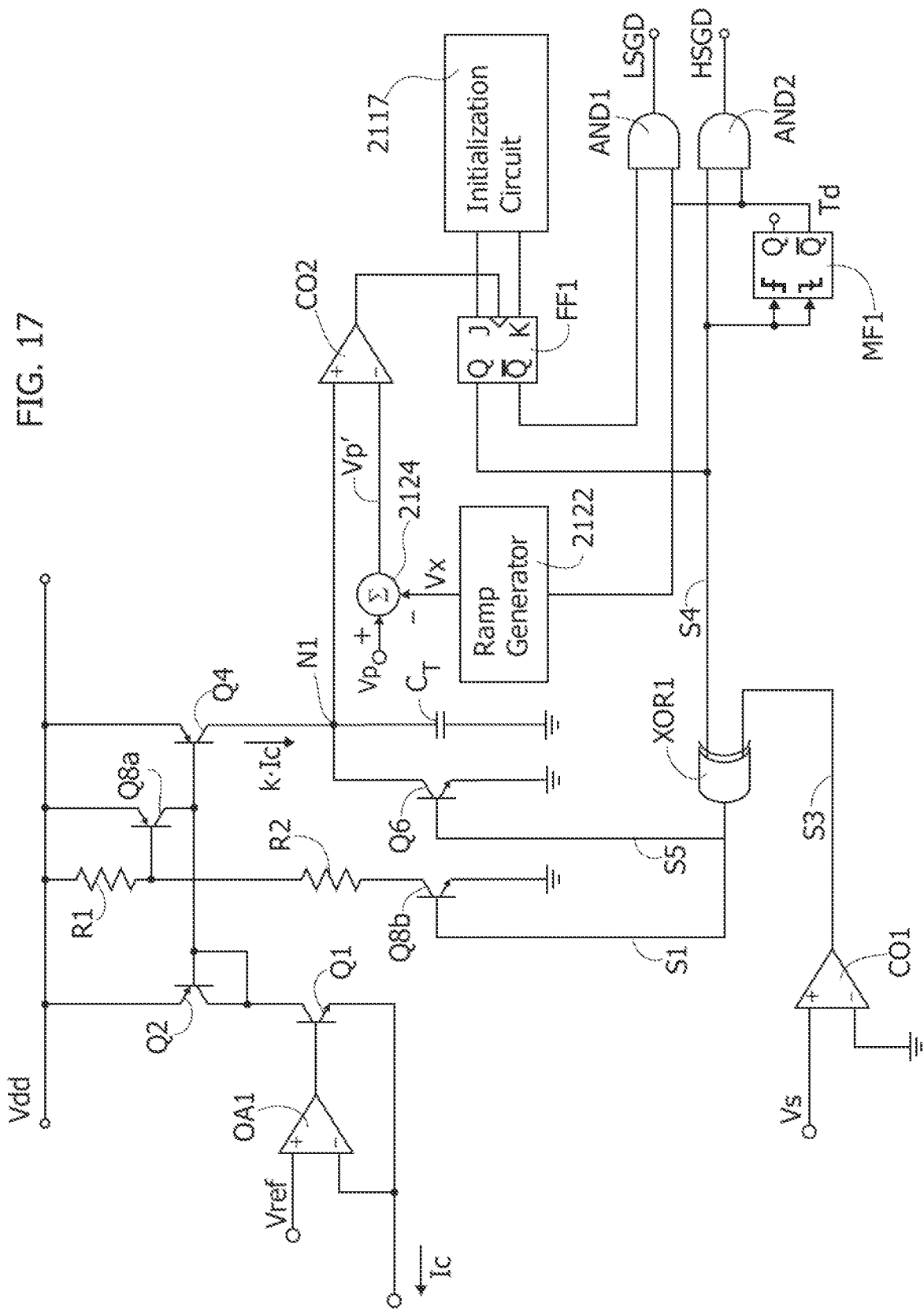
FIG. 17 shows a fifth embodiment of a control device for a resonant converter using enhanced TSC method.

For example, this is schematically shown in FIG. 17, wherein the adder 2120 has been removed and a (adder or subtractor) circuit 2124 has been added, wherein the circuit is configured to generate a modified threshold signal Vp' at the input of the comparator CO2 by adding a negative ramp signal to the threshold signal Vp or subtracting a positive ramp signal from the threshold signal Vp.

Figure 18:
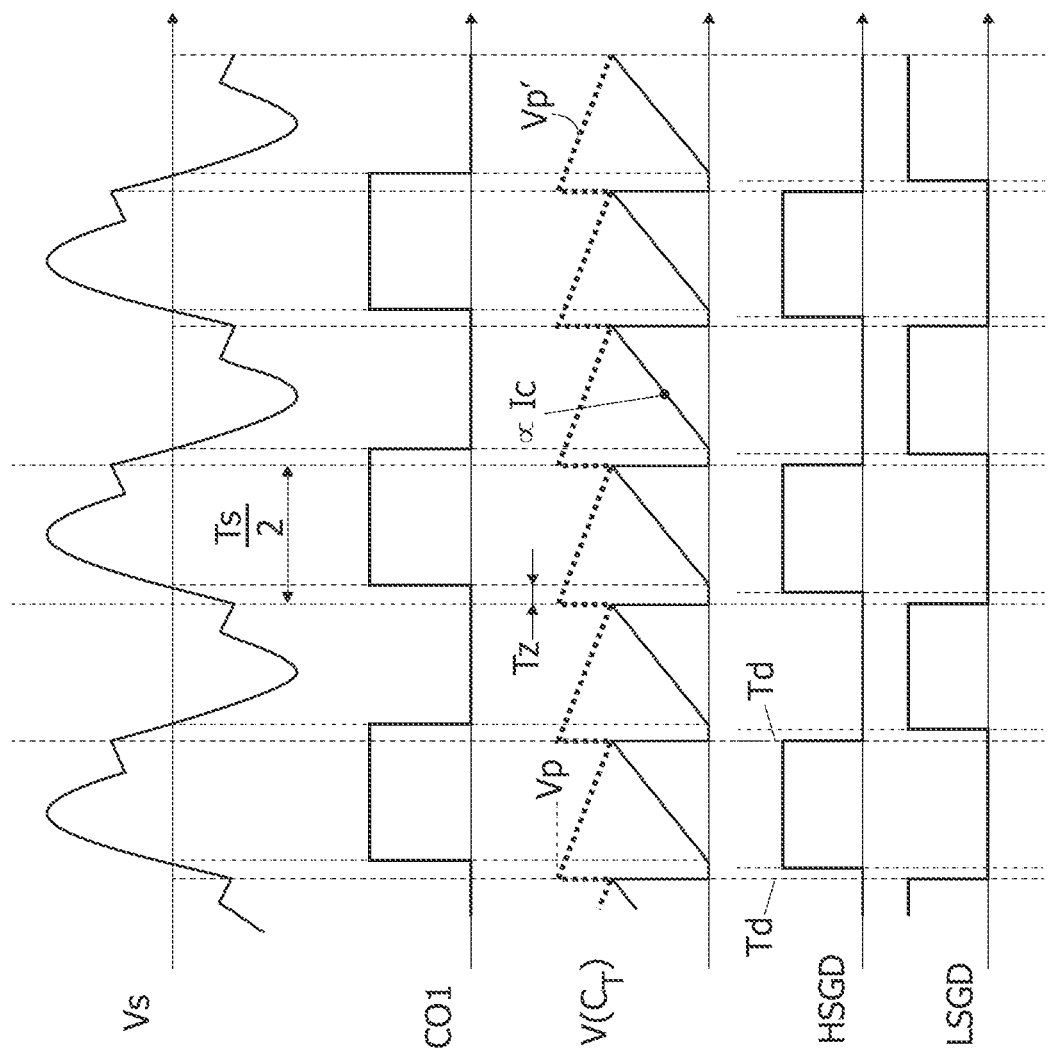
FIG. 18 shows time diagrams of the voltages involved in the device in FIG. 17.

For example, FIG. 18 shows exemplary waveforms for the voltage $V_{CT}$ at the capacitor $C_T$, the voltage Vp and the modified threshold signal Vp'.

Figure 19:
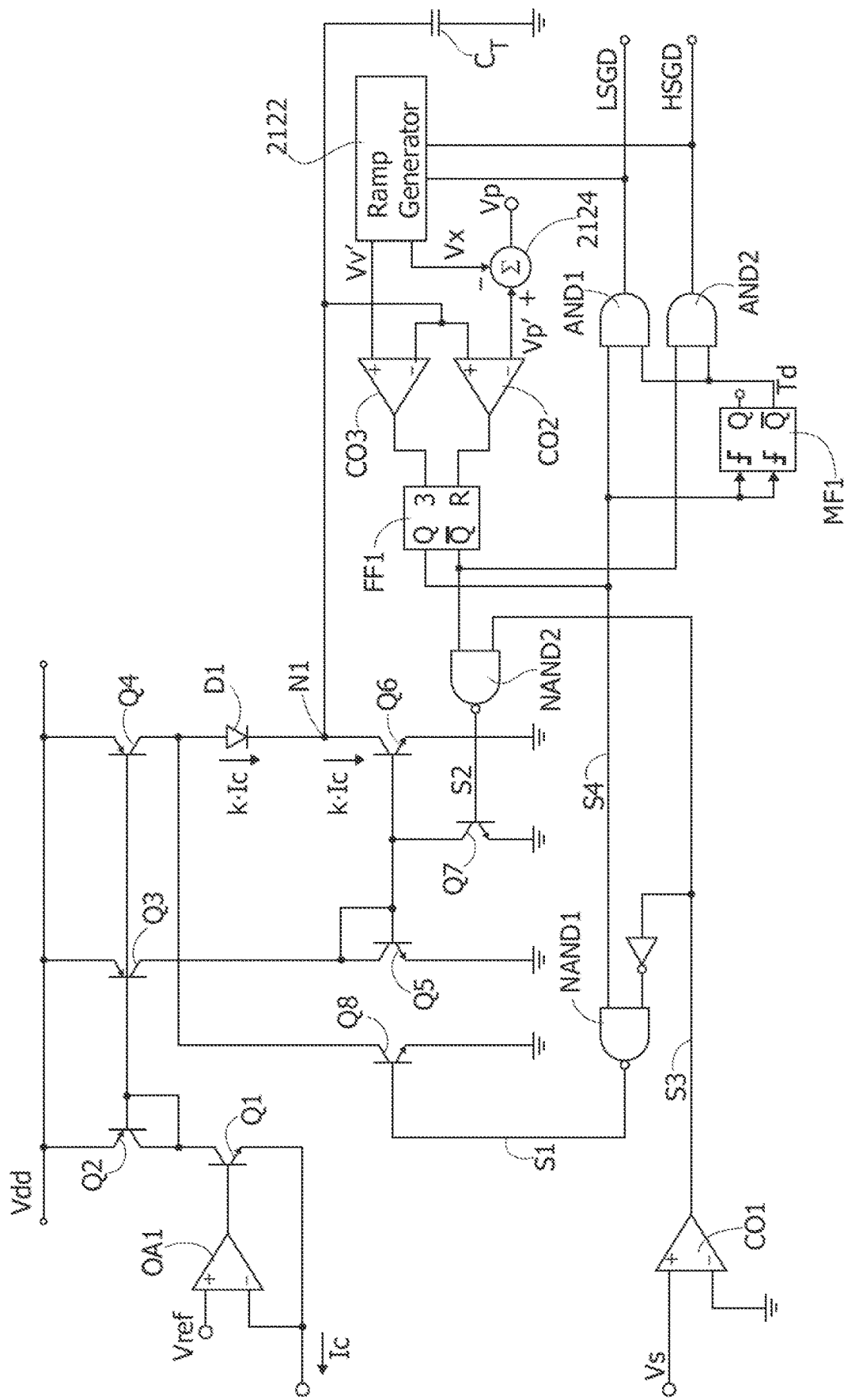
FIG. 19 shows a sixth embodiment of a control device for a resonant converter using enhanced TSC method.

Conversely, FIG. 19 shows an embodiment in line with the arrangement shown in FIG. 8.

Also in this case the additional current generator 2114/2116 has been removed. Moreover, the ramp generator 2122 and the subtractor circuit 2124 has been added.

Accordingly, in the embodiment considered, the lower threshold signal Vv provided to the comparison circuit (CO2, CO3) corresponds to the ramp signal Vx, and the upper threshold signal Vp' provided to the comparison circuit (CO2, CO3) corresponds to an upper threshold Vp minus the ramp signal Vx.

Figure 20:
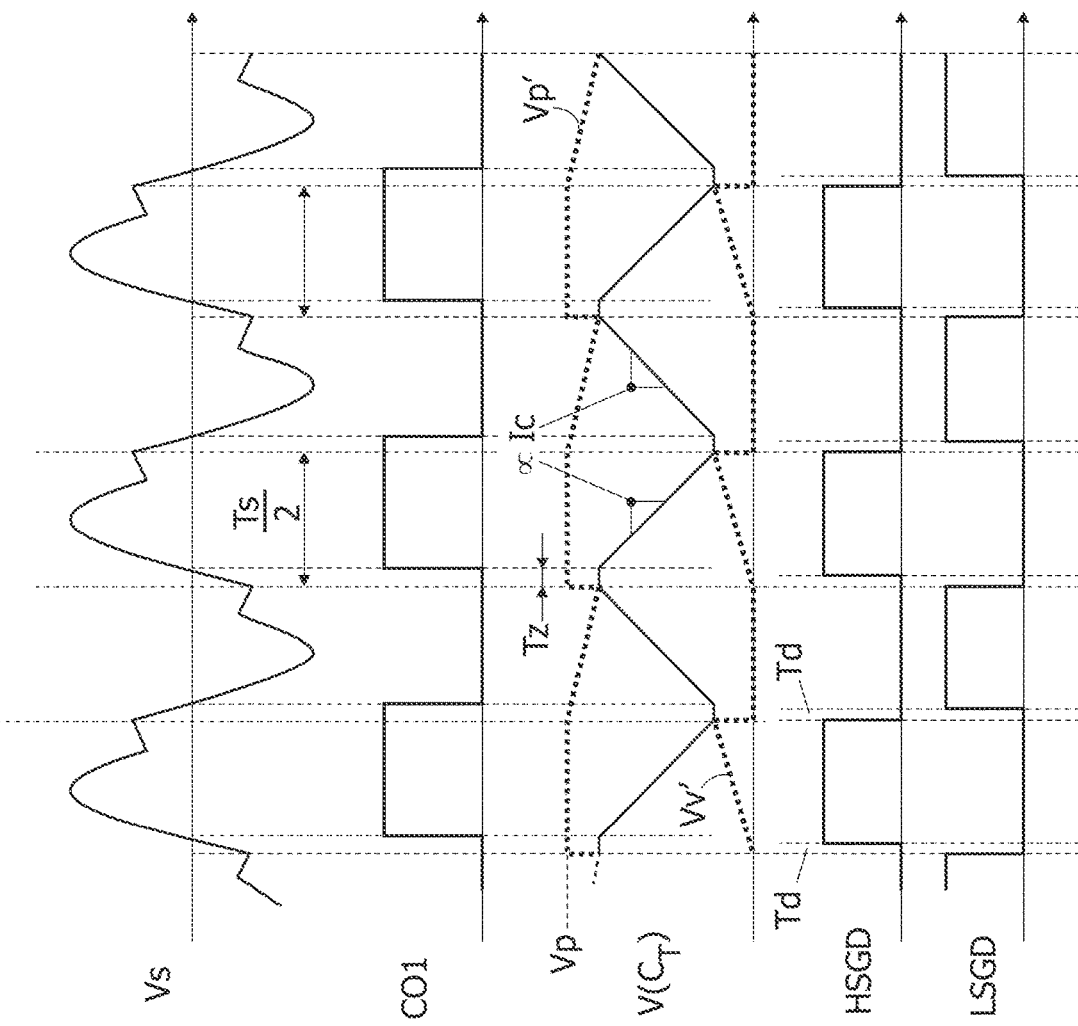
FIG. 20 shows time diagrams of the voltages involved in the device in FIG. 19.

For example, FIG. 20 shows exemplary waveforms for the voltage $V_{CT}$ at the capacitor $C_T$, the voltage Vp and the modified threshold signal Vp'.

Thus, in the embodiments considered, the driver circuit 210a may comprise a correction circuit (e.g., blocks 2306; 2114; 2114 and 2116; Mux3, 2122) configured to:
modify the (first) ramp signal INT provided at input to the comparison circuit 2110 (either by modifying the input signal of the ramp generator/integrator circuit or adding a ramp signal to the signal at the output of the ramp generator/integrator circuit), whereby the ramp signal INT has a first gradient value (e.g., Io or kIc) during the interval Tz and then a second gradient value (e.g., kIc+Io or Io+kIref) during the remainder of the respective semi-period, wherein the first gradient value is a non-zero value and the absolute value of the second gradient value is greater than the absolute value of the first gradient value (preferably the first and second gradient value have the same sign), or
modify one or more of the reference thresholds (Vp/Vv) of the comparison circuit (2110) by adding a (second) ramp signal (e.g., Vx) to a respective initial threshold value.

For example, in order to implement the first option, the driver circuit 210a may be configured to modify the (first) ramp signal INT by:
setting the input signal of the integration circuit 2300 during the first interval (Tz) to a first value (e.g., Io, kIref or kIc), and
setting the input signal of the integration circuit 2300 during the second interval (Tz) to a second value (e.g., kIref+Io, kIc+Io, or also kIref or kIc if these values are greater than the first value).

For example, any of the following solutions may be used for this purpose:
the first signal may be set to zero during the first interval (Tz) and to a non-zero value (kIc; kIref) during the second interval, and the second signal may be set to a constant non-zero value (Io) during the first (Tz) and second interval; or
the first signal is set to a constant non-zero value (kIc; kIref) during the first (Tz) and the interval, and the second signal is set to zero during the first interval (Tz) and to a constant non-zero value (Io) during the second interval; or
the first signal is set to zero during the first interval (Tz) and to a non-zero value (kIc; kIref) during the second interval, and the second signal is set to a constant non-zero value (Io) during the first interval (Tz) and to zero during the second interval.

Alternatively, the input signal of the integration circuit 2300 may be set to zero during the first interval (Tz) and to a non-zero value (e.g., kIc; kIref) during the second interval. In this case, the (first) ramp signal INT may be modified by adding a second ramp signal (Vx) to the ramp signal INT, wherein this ramp signal corresponds to a linear ramp signal during the first (Tz) and second interval. In a complementary manner, the input signal of the integration circuit 2300 may be set to a constant non-zero value (kIc; kIref) during the first (Tz) and second interval, and the ramp signal (Vx) may correspond to zero during the first interval (Tz) and to a linear ramp signal during the second interval.

Conversely, in order to implement the second option, the input signal of the integration circuit 2300 may be set to zero during the first interval (Tz) and to a non-zero value (kIc; kIref) during the second interval. In this case, the second ramp signal added to the threshold value (Vx) may correspond to a linear ramp signal during the first (Tz) and second interval. In a complementary manner, the input signal of the integration circuit 2300 may be set to a non-zero value (kIc; kIref) during the first (Tz) and second interval, and the second ramp signal (Vx) may correspond to zero during the first interval (Tz) and to a linear ramp signal during the second interval.

In general, while the above embodiments are equivalent from a function point of view, the specific embodiments may be more or less complex and/or suitable for analog or digital implementation. For example, the embodiment shown in Figure provides a very low complexity solution.

Moreover, various known integrated control circuits implementing a Time-shift control (without the above modifications) are already available. Thus, the embodiments disclosed herein may also be used to modify such integrated circuits or add the above modification externally to the driver circuit. For example, in driver circuits 210 using an external capacitor $C_T$, the addition current generators 2114 and optionally 2116 may be added to the electronic converter, (thereby implementing option a) without having to modify the integrated circuit of the driver circuit 210. Similarly, in driver circuits 210 where the threshold value(s) Vp and/or Vv may be set externally, these signals may be modified externally in order to implement option c).

A series of simulations have been carried out on an exemplary converter to compare the secondary currents mismatch caused by the input offset of the zero-current comparator with the prior art TSC method and the novel TSC method. Additionally, the small-signal response of the converter has been checked to assess the impact of the novel method on its dynamic characteristics.

The exemplary converter is an LLC resonant converter running off a 400 Vdc bus (Vin in FIG. 1) and rated for 12 V/20 A output, characterized by the following key parameters: a=16, Cr=39 nF, Ls=105 µH, Lp=560 µH. The control device in FIG. 9 has been used. The tests have been done at 10% load and with a Vs signal of about 0.26 V peak amplitude. The input offset of the zero-current comparator CO1 has been swept from 0 to 5 mV (corresponding to about 2% of the peak amplitude of Vs) with 1 mV steps. The test showed that with the proposed modified TSC method the mismatch is reduced on average by a factor of two.

Repeating the tests with half the signal amplitude of Vs, the benefit of the proposed modified TSC method is even more pronounced. For example, with 5 mV offset the mismatch of the secondary currents is over 91% without performing the proposed compensation (which means that the output current is almost entirely carried by one rectifier only) and is reduced at 38.4% with the proposed modified TSC method, therefore by a factor 2.4.

As to the dynamic characteristics of the converter, the traditional and the proposed modified TSC are practically equivalent.

The following description, with reference to FIGS. 21 through 25, provides further embodiments of the present disclosure for enhanced time-shift control (ETSC) applicable to resonant converters. The already disclosed embodiments and the detailed explanation of their operation are described previously herein, e.g., with respect to FIGS. 1 through 20, and reference will be made hereinafter to at least some aspects of the embodiments previously described herein.

At least four different basic implementations of ETSC are described with respect to FIGS. 1 through 20. They are based on generating a two-slope ramp voltage across a capacitor CT. For example, as shown and described with respect to FIG. 6, in some embodiments, the two-slope ramp appears when the capacitor is both charged and discharged between two voltage reference levels, so that the waveform is somewhat symmetrical. In other embodiments, for example as shown in FIG. 7, the two-slope ramp only charges the capacitor, whereas the discharge is ideally instantaneous, thus generating a sort of sawtooth. As previously described, in some embodiments the control loop acts on the charging and discharging currents, in other embodiments the control loop acts on one of the voltage reference levels.

In embodiments that will be described in the following with respect to FIGS. 21 through 25, the control loop acts on the charging and discharging currents.

In the embodiments described with respect to FIGS. 21 through 25, the two-slope ramp has a first lower slope in the initial part of each switching half-period, as long as the current in the resonant tank and the applied voltage have opposite signs, and a second steeper slope in the remaining part of the switching half-period where current and voltage have equal signs.

The first lower slope is associated to a fixed current Io that charges the capacitor throughout the entire switching half-period, whereas the second steeper slope is associated to the superposition of this fixed current to a second current k*Ic where k is a constant and Ic is the control current of the control loop that regulates the output voltage (or current) of the converter. This has been previously described herein, for example, with respect to FIGS. 6 and 7.

In general, in any implementation or embodiment of ETSC, the second slope will be always greater than the first slope. This is instrumental to the fundamental objective of ETSC, i.e., reducing the sensitivity of the duty cycle of the generated square-wave to the input voltage offset of the comparator that senses the sign of the resonant current. This offset causes the duty cycle to deviate from the ideal target of 50% and the sensitivity of the traditional TSC methodology has been found to be an issue under some circumstances.

The additional embodiments described with respect to FIGS. 21 through 25 are based on swapping the currents that act along a switching half-period. More particularly, the first lower slope will be determined by the current k*Ic representative of the feedback loop, which charges the capacitor throughout the entire switching half-period; the second steeper slope will be determined by the superposition of k*Ic to the fixed current Io.

Figure 21:
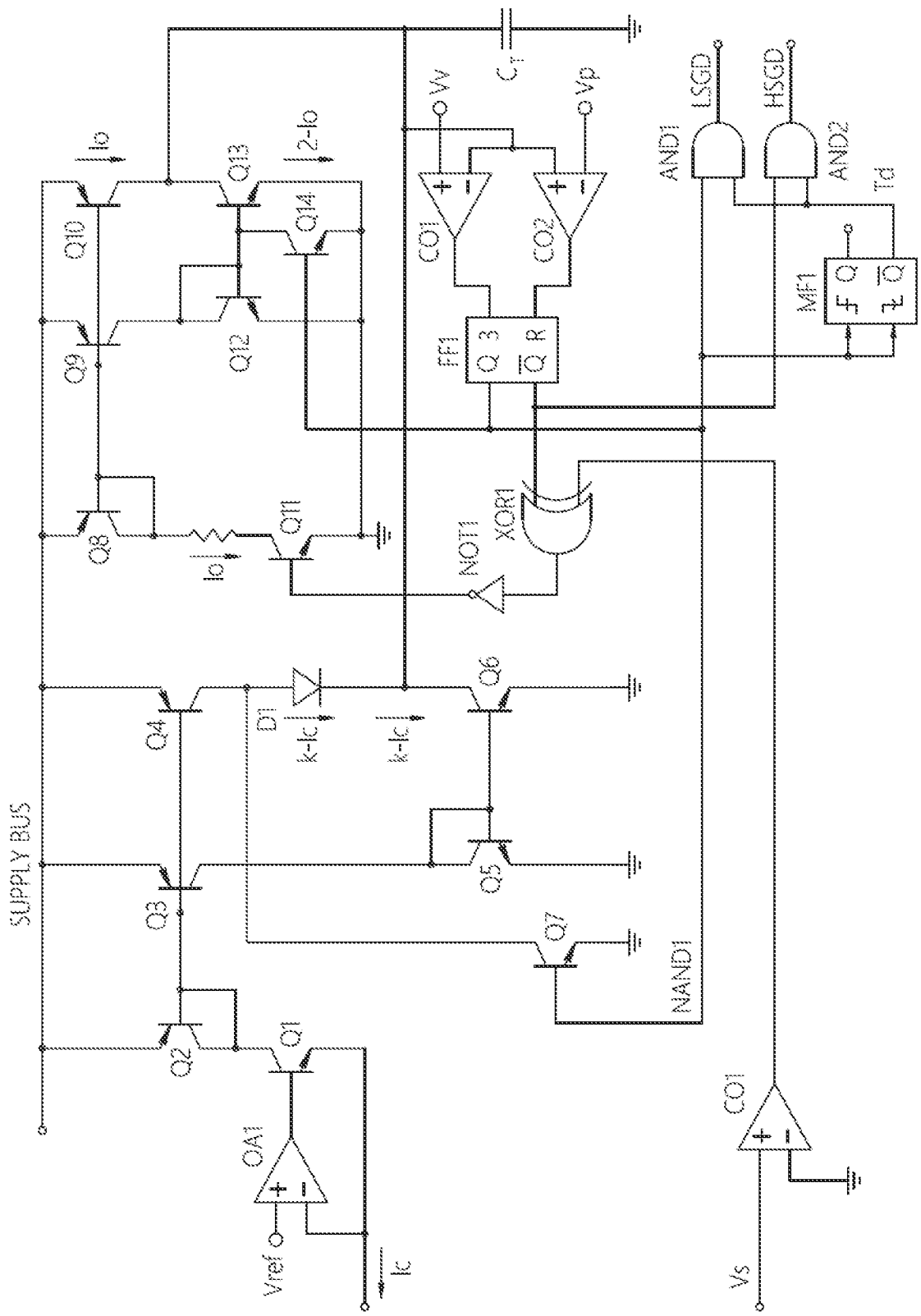
FIG. 21 shows a further embodiment of a control device, which is a modification of the control device illustrated in FIG. 8.
Figure 22:
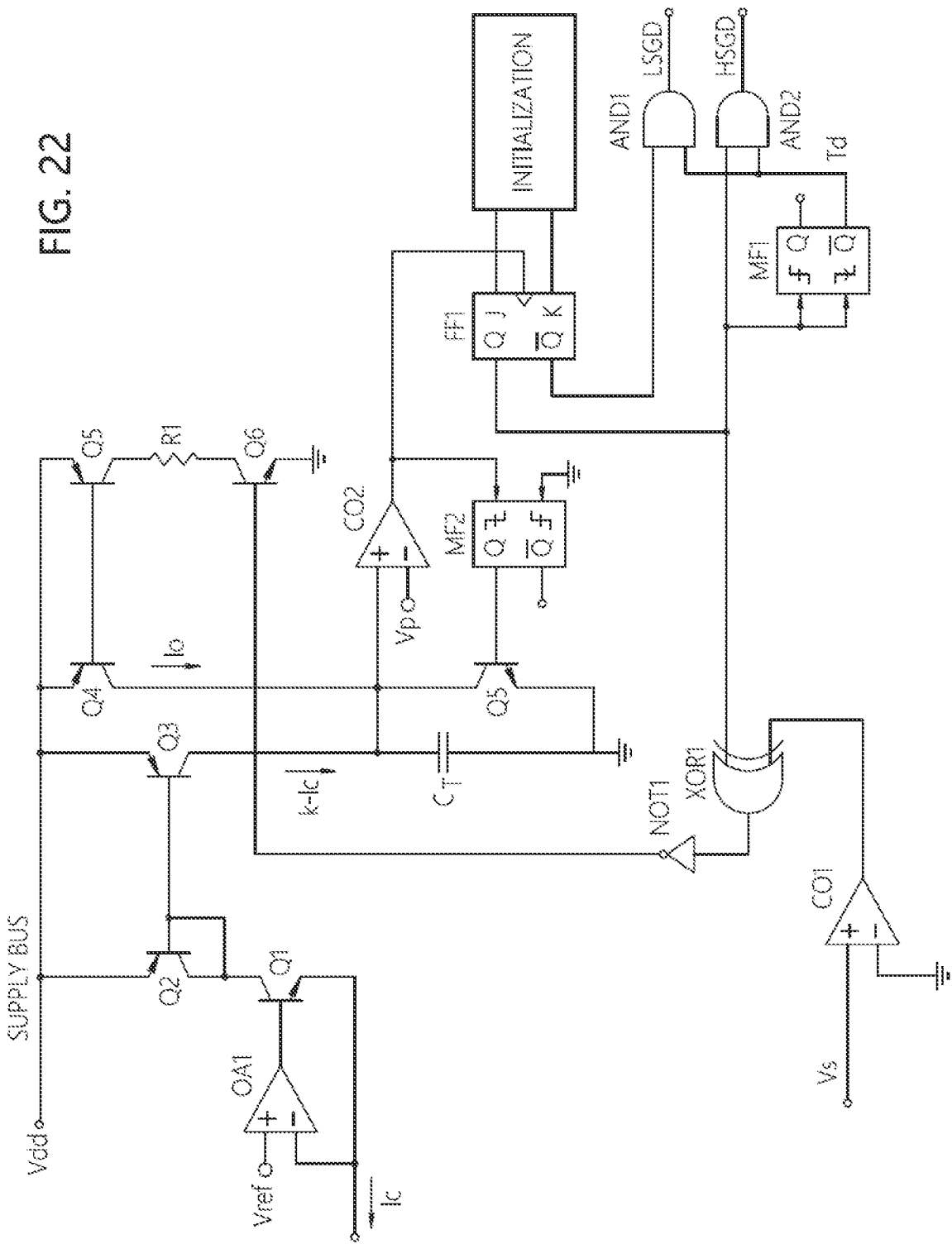
FIG. 22 shows a further embodiment of a control device, which is a modification of the control device illustrated in FIG. 9.

The modifications of the circuits in FIGS. 8 and 9 to swap the currents may be readily appreciated by those skilled in the relevant field, however the circuits illustrated in FIGS. 21 and 22, respectively, show these embodiments in which the circuits of FIGS. 8 and 9 are modified to swap the currents. More specifically, the circuit illustrated in FIG. 21 is the same as that in FIG. 8 with modifications to facilitate the swap in the charge/discharge current of the capacitor $C_T$. Similarly, the circuit illustrated in FIG. 22 is the same as that in FIG. 9 with modifications to facilitate the swap in the charge/discharge current of the capacitor $C_T$.

As FIGS. 8 and 9 are otherwise substantially the same as FIGS. 21 and 22, respectively, the operation of the circuits of FIGS. 21 and 22 can be described exactly as previously described herein with respect to the corresponding circuits (FIGS. 8 and 9), with the sole caution of taking the current swap into consideration, and will not be repeated here.

With reference to the waveforms shown in FIG. 6, which are relevant to the circuit illustrated in FIG. 20, with Vv (for example, equal to 1V) representing the lower threshold or the valley voltage of the waveform on the capacitor $C_T$ and Vp (for example, equal to 4V) representing the upper threshold or the peak voltage of the waveform, the equation describing the charge of the capacitor $C_T$ in a switching half-period starting at t=0 and ending at t=Ts/2 (being Ts the switching period), and where the tank current changes sign at t=Tz by may be written as:

$$Vp = Vv + \frac{1}{C_T}\left[kIcTz + (kIc + Io)\left(\frac{Ts}{2} - Tz\right)\right] \quad (6)$$

Noticing that the commanded time-shift $T_{SH}$ equals Ts/2−Tz, this equation may be rewritten as:

$$Vp = Vv + \frac{1}{C_T}\left[kIcTz + (kIc + Io)\left(\frac{Ts}{2} - Tz\right)\right] \quad (7)$$

Solving this equation for $T_{SH}$, the control law linking the commanded time-shift to the control current Ic may be written as:

$$T_{SH} = \frac{(Vp - Vv)C_T - kIc\frac{Ts}{2}}{Io}. \quad (8)$$

Notice that the commanded time shift $T_{SH}$ is a linear function of the control current Ic, unlike in embodiments previously described where the $T_{SH}$ vs. Ic relationship is hyperbolic.

With reference to the waveforms shown in FIG. 7, which are relevant to the circuit illustrated in FIG. 21, the equations describing the operation of the associated circuit and the resulting control laws can be found by the equations (6), (7) and (8) in which Vv=0.

It is possible to express Ic as a function of Tz. Solving equation (6) for Ic yields:

$$Ic = \frac{2(Vp - Vv)C_T}{kTs} - \frac{Io}{k}\left(1 - 2\frac{Tz}{Ts}\right). \quad (9)$$

Notice that the term Tz/Ts is proportional to the current-voltage phase shift Φ:

$$\Phi = 2\pi\frac{Tz}{Ts}, \quad (10)$$

which, in the spirit of the first-harmonic approximation (FHA) modeling of resonant converters, corresponds to the argument of the input admittance of the resonant tank.

Making Vp−Vv proportional to Ts would result in Ic controlling directly the current-voltage phase-shift. In fact, if in equation (9) we substitute Vp−Vv with λTs, the following relation can be obtained:

$$Ic = \frac{1}{k}(2\lambda C_T - Io) + 2\frac{Tz}{Ts} = \frac{1}{k}(2\lambda C_T - Io) + \frac{\Phi}{\pi}. \quad (11)$$

Figure 23:
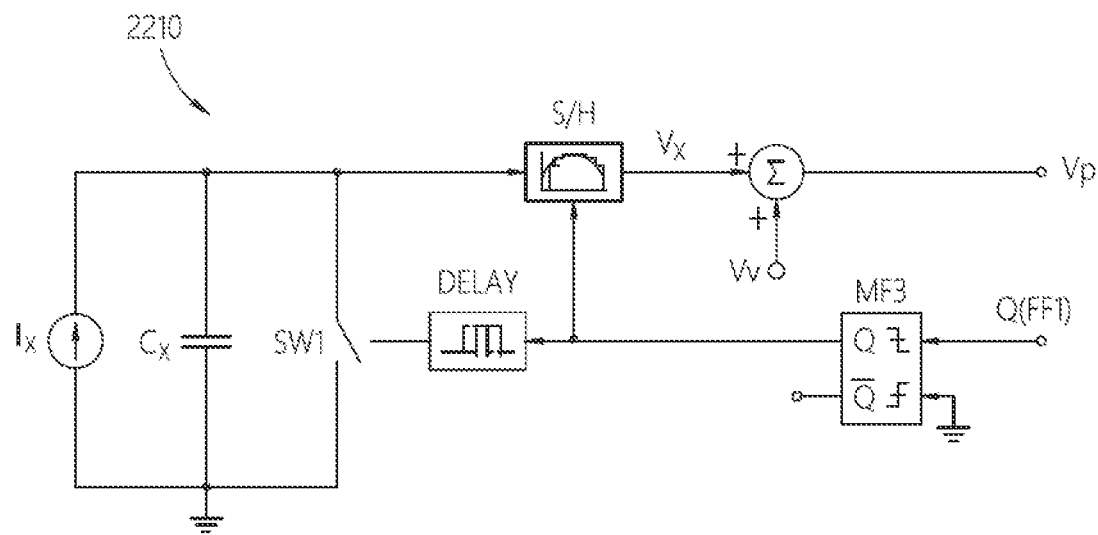
FIG. 23 shows a voltage generator circuit that generates a reference voltage which may be utilized by the control device illustrated in FIG. 21.
Figure 24:
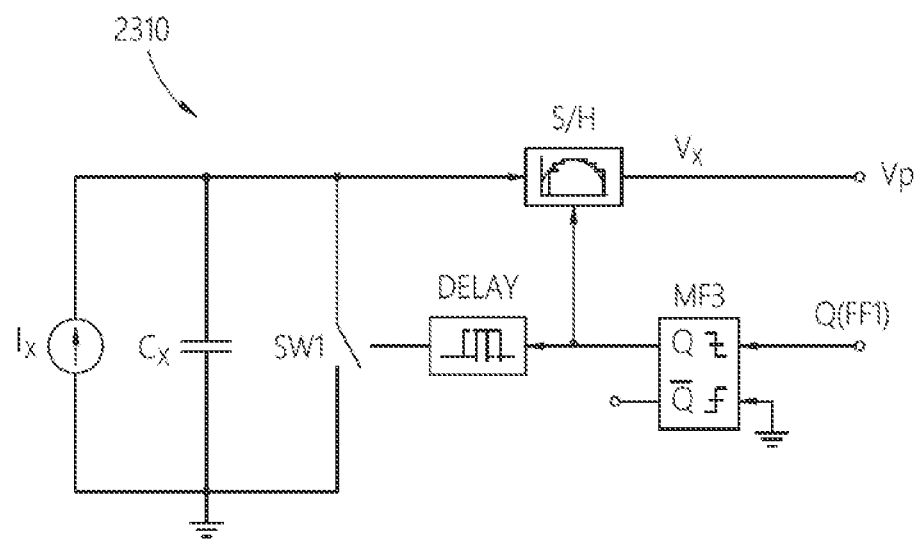
FIG. 24 shows a voltage generator circuit that generates a reference voltage which may be utilized by the control device illustrated in FIG. 22.

This is a purpose of the circuits shown in FIGS. 23 and 24, each of which outputs the voltage Vp used as the reference by the comparator (e.g., the comparator CO2 or CO3 of the circuits illustrated in FIGS. 21 and 22) that resets the SR latch or SR flip-flop FF1. In particular, FIG. 23 illustrates a voltage generator circuit 2210 that generates the reference voltage Vp which may be utilized in the circuit illustrated in FIG. 21 to enable direct control of the current-voltage phase-shift. FIG. 24 illustrates a voltage generator circuit 2310 that generates the reference voltage Vp which may be utilized in the circuit illustrated in FIG. 22 to enable direct control of the current-voltage phase-shift.

The key waveforms of the voltage generator circuits 2210, 2310 are equal to one another and are shown in FIG. 25. The key waveforms of the resulting embodiments shown in FIGS. 21 and 22 are the same as those shown in FIGS. 6 and 7, respectively.

Referring to FIGS. 23 through 25, a timing capacitor Cx is charged with a constant current Ix, generating a voltage ramp $V_{Cx}$. The peak value $V_x = I_x Ts/C_x$ of the voltage ramp $V_{Cx}$ is sampled and held (e.g., by the sample and hold circuit S/H) on the positive-going edges of the signal Q of the flip-flop FF1 via the pulses delivered by the monostable device MF3 (e.g., by the pulses delivered at the Q output of the monostable device MF3). The ramp is reset at zero after a small delay (e.g., a delay that is longer than the duration of the pulse delivered by MF3). The ramp may be reset, for example, by closing the switch SW1 (which in some embodiments may be a transistor, or any suitable switch). The switch SW1 may be controlled, e.g., selectively closed or opened, by an output of a delay circuit (Delay), which may be operated based on the pulses delivered at the Q output of the monostable device MF3. The difference between the voltage generator circuits 2210 and 2310 is that the voltage generator circuit 2210 of FIG. 23 includes an adder which adds the voltage Vv (for example, equal to 1V) to the voltage signal $V_x$. Thus, in the voltage generator circuit 2210 of FIG. 23 (in contrast to the voltage generator circuit 2310 of FIG. 24), $V_x$ is offset by Vv and then it is output as Vp; hence:

$$V_x = Vp - Vv = \frac{I_x}{C_x}Ts \Rightarrow \lambda = \frac{I_x}{C_x}. \quad (12)$$

In accordance with one or more embodiments of the present disclosure, controlling the current-voltage phase-shift brings a number of benefits to the controlled system.

Firstly, a converter controlled in this way is absolutely stable regardless of the operating conditions, provided that the tank current lags behind the applied square wave voltage. This constraint is not a practical limitation because it is the same necessary condition for the switches of the half-bridge to work with soft-switching, which is an important design target for resonant converters.

Secondly, the control quantity (e.g., Ic, in some embodiments) is little dependent on the parameters of the resonant tank and is quite insensitive to their tolerance. This robustness is easily understandable if one thinks that in a resonant converter designed for operating with soft-switching, the tank current lags behind the impressed voltage by an angle included between 0° and 90° while sweeping the whole input voltage and load range, irrespective of the design of the resonant tank and of the operating frequency range.

Finally, controlling directly the phase shift enables a control circuit to cover the entire operating range of a converter with a fixed range of Ic. Referring to equation (11), this implies that limiting the range of Ic to a minimum positive value will limit the minimum phase-shift, which will make sure that the necessary condition for the converter to work with soft-switching cannot be violated. On the other hand, considering light load operation, since the tank current tends to lag behind the impressed voltage by 90° regardless of the design of the resonant tank and of the input voltage, the value of Ic is much more dependent on the load than on everything else, so that it can be effectively used as a load monitor. This enables a simple implementation of functions, such as burst-mode or others, that aim to improve converter efficiency at light load, characterized by a good repeatability of the onset threshold in mass production.

Of course, without prejudice to the principle of the disclosure, the details of construction and the embodiments may vary widely with respect to what has been described and illustrated herein purely by way of example, without thereby departing from the scope of the present disclosure.

For example, while reference has been made mainly to an LLC resonant converter, the present solutions are also applicable to other resonant converters, such as LCC, LLCC, etc., resonant converters.

Similarly, while reference has been made mainly to a half-bridge configuration, nothing prevents from applying the solutions also to converters using the full-bridge configuration, wherein the resonant tank is connected to the intermediate nodes between two half-bridges, and the high-side switch of the first half-bridge is switched together with the low-side switch of the second half-bridge, and the low-side switch of the first half-bridge is switched together with the high-side switch of the second half-bridge.

Moreover, while reference has been made mainly to bipolar transistors, also Field Effect Transistors (FET) may be used, e.g., in order to implement the various current generators, current mirrors or electronic switches.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driver circuit for a resonant converter configured to generate an output voltage or output current at two output terminals from an input voltage applied to a positive and a negative input terminal, said resonant converter comprising:
at least one half-bridge including a high side electronic switch and a low side electronic switch connected in series between said positive and said negative input terminals, wherein an intermediate node between said high side electronic switch and said low side electronic switch represents a switching node; and
a resonant tank, rectifier and filter circuit connected between said switching node and said two output terminals;
wherein said driver circuit comprises:
a first and a second terminal configured to be connected to control terminals of said high-side electronic switch and said low-side electronic switch in order to drive said half-bridge via respective drive signals;
a third terminal configured to be connected to a current sensor in order to receive a signal proportional to a resonant current flowing from the switching node to said resonant tank, rectifier and filter circuit;
a fourth terminal configured to be connected to a feedback circuit in order to receive a feedback signal determined as a function of said output voltage or said output current;
a comparator configured to generate a first control signal indicating when the resonant current changes sign as a function of the signal received at said third terminal;
a first ramp generator circuit configured to output a first ramp signal; and
a comparison circuit configured to determine whether said first ramp signal reaches at least one reference threshold;
wherein the driver circuit is configured to:
drive said high-side electronic switch and said low-side electronic switch via said drive signals during consecutive first and second switching semi-periods, wherein each of said first and said second switching semi-period ends when said comparison circuit indicates that said first ramp signal has reached a respective reference threshold;
once said first switching semi-period is started, open said low-side electronic switch and close said high-side electronic switch after a delay; and
once said second switching semi-period is started, open said high-side electronic switch and close said low-side electronic switch after said delay;
wherein said driver circuit further comprises:
a control circuit configured to generate in each of said first and said second switching semi-periods one or more control signals indicating:
a first interval starting at an instant when a respective semi-period is started and ending at an instant when said first control signal indicates that the resonant current has changed sign; and
a second interval starting at an instant when said first control signal indicates that the resonant current has changed sign and an instant when said comparison circuit indicates that said first ramp signal has reached a respective reference threshold; and
a correction circuit configured to:
modify said first ramp signal provided at input to said comparison circuit, whereby said first ramp signal has a first gradient value during said first interval and a second gradient value during said second interval, said first gradient value being a non-zero value and an absolute value of said second gradient value being greater than an absolute value of said first gradient value; or
modify one or more of the reference thresholds of said comparison circuit by adding a second ramp signal to a respective initial threshold value.

2. The driver circuit according to claim 1, wherein the driver circuit is configured to:
  determine at least one of said first gradient value or said second gradient value as a function of said feedback signal.

3. The driver circuit according to claim 1, wherein the driver circuit is configured to:
  determine at least one of said reference thresholds as a function of said feedback signal.

4. The driver circuit according to claim 1, wherein said first ramp generator circuit comprises an integrator circuit configured to generate said first ramp signal by integrating a first signal, and wherein said correction circuit is configured to modify said first ramp signal by adding to said first signal at the input of said analog integrator circuit a second signal.

5. The driver circuit according to claim 4, wherein said first signal is set to zero during said first interval and to a non-zero value during said second interval, and said second signal is set to a constant non-zero value during said first and second interval.

6. The driver circuit according to claim 4, wherein said first signal is set to a non-zero value during said first and second interval, and said second signal is set to zero during said first interval and to a constant non-zero value during said second interval.

7. The driver circuit according to claim 4, wherein said first signal is set to zero during said first interval and to a non-zero value during said second interval, and said second signal is set to a constant non-zero value during said first interval and to zero during said second interval.

8. The driver circuit according to claim 4, wherein said integrator circuit comprises an integration capacitor and said driver circuit comprises a first current generator configured to generate said first signal, and said correction circuit comprises a second current generator configured to generate said second signal.

9. The driver circuit according to claim 1, wherein said first ramp generator circuit comprises a digital counter configured to generate said first ramp signal by increasing a count value by a step size, and wherein said correction circuit is configured to modify said first ramp signal by:
  setting said step size to a first step value during said first interval and to a second step value during said second interval; or
  setting a clock signal of said digital counter to a first clock signal during said first interval and to a second clock signal during said second interval.

10. The driver circuit according to claim 1, wherein said first ramp generator circuit comprises an integrator circuit configured to generate said first ramp signal by integrating a first signal, and wherein said correction circuit is configured to modify said first ramp signal by adding to said first ramp signal at the output of said analog integrator circuit a second ramp signal, and wherein:
  said first signal is set to zero during said first interval and to a non-zero value during said second interval, and said second ramp signal corresponds to a linear ramp signal during said first and second interval; or
  said first signal is set to a non-zero value during said first and second interval, and said second ramp signal corresponds to zero during said first interval and to a linear ramp signal during said second interval.

11. The driver circuit according to claim 1, wherein said first ramp generator circuit comprises an integrator circuit configured to generate said first ramp signal by integrating a first signal, and wherein said correction circuit is configured to modify one or more of the reference thresholds of said comparison circuit by adding a second ramp signal to a respective initial threshold value.

12. The driver circuit according to claim 11, wherein said first signal is set to zero during said first interval and to a non-zero value during said second interval, and said second ramp signal corresponds to a linear ramp signal during said first and second interval.

13. The driver circuit according to claim 11, wherein said first signal is set to a non-zero value during said first and second interval, and said second ramp signal corresponds to zero during said first interval and to a linear ramp signal during said second interval.

14. The driver circuit according to claim 1, wherein:
  during one of said first and said second switching semi-periods, said first ramp generator circuit is configured to increase said first ramp signal, and said comparison circuit is configured to determine whether said first ramp signal reaches an upper reference threshold; and
  during the other of said first and said second switching semi-periods, said first ramp generator circuit is configured to decrease said first ramp signal, and said comparison circuit is configured to determine whether said first ramp signal reaches a lower reference threshold.

15. The driver circuit according to claim 1, wherein during each of said first and said second switching semi-periods, said first ramp generator circuit is configured to increase said first ramp signal, and said comparison circuit is configured to determine whether said first ramp signal reaches an upper reference threshold, wherein said first ramp signal is reset when said first ramp signal reaches said upper reference threshold.

16. The driver circuit according to claim 1, wherein during each of said first and said second switching semi-periods, said first ramp generator circuit is configured to decrease said first ramp signal, and said comparison circuit is configured to determine whether said first ramp signal reaches a lower reference threshold, wherein said first ramp signal is reset when said first ramp signal reaches said lower reference threshold.

17. An integrated circuit comprising a driver circuit according to claim 1, wherein the first, second, third and fourth terminal of said driver circuit are connected to respective pins of said integrated circuit.

18. An electronic converter comprising:
  a positive and a negative input terminal;
  two output terminals for providing an output voltage or output current;
  at least one half-bridge including a high side electronic switch and a low side electronic switch connected in series between said positive and said negative input terminals, wherein an intermediate node between said high side electronic switch and said low side electronic switch represents a switching node;
  a resonant tank, rectifier and filter circuit connected between said switching node and said two output terminals;
  a current sensor configured to generate a signal proportional to the resonant current flowing from the switching node to said resonant tank, rectifier and filter circuit;
  a feedback circuit configured to generate a feedback signal determined as a function of said output voltage or said output current; and a driver circuit, the driver circuit comprising:
- a first and a second terminal configured to be connected to control terminals of said high-side electronic switch and said low-side electronic switch in order to drive said half-bridge via respective drive signals;
- a third terminal configured to be connected to a current sensor in order to receive a signal proportional to a resonant current flowing from the switching node to said resonant tank, rectifier and filter circuit;
- a fourth terminal configured to be connected to a feedback circuit in order to receive a feedback signal determined as a function of said output voltage or said output current;
- a comparator configured to generate a first control signal indicating when the resonant current changes sign as a function of the signal received at said third terminal;
- a first ramp generator circuit configured to output a first ramp signal; and
- a comparison circuit configured to determine whether said first ramp signal reaches at least one reference threshold;

wherein the driver circuit is configured to:
- drive said high-side electronic switch and said low-side electronic switch via said drive signals during consecutive first and second switching semi-periods, wherein each of said first and said second switching semi-period ends when said comparison circuit indicates that said first ramp signal has reached a respective reference threshold;
- once said first switching semi-period is started, open said low-side electronic switch and close said high-side electronic switch after a delay; and
- once said second switching semi-period is started, open said high-side electronic switch and close said low-side electronic switch after said delay;

wherein the driver circuit further comprises:
- a control circuit configured to generate in each of said first and said second switching semi-periods one or more control signals indicating:
  - a first interval starting at an instant when a respective semi-period is started and ending at an instant when said first control signal indicates that the resonant current has changed sign; and
  - a second interval starting at an instant when said first control signal indicates that the resonant current has changed sign and an instant when said comparison circuit indicates that said first ramp signal has reached a respective reference threshold; and
- a correction circuit configured to:
  - modify said first ramp signal provided at input to said comparison circuit, whereby said first ramp signal has a first gradient value during said first interval and a second gradient value during said second interval, said first gradient value being a non-zero value and an absolute value of said second gradient value being greater than an absolute value of said first gradient value; or
  - modify one or more of the reference thresholds of said comparison circuit by adding a second ramp signal to a respective initial threshold value.

19. The electronic converter according to claim 18, wherein said resonant tank, rectifier and filter circuit comprises:
- a transformer comprising a primary winding and a secondary winding;
- a capacitor and a first inductance connected in series with said primary winding between said switching node and said positive or said negative input terminal;
- a second inductance connected in parallel with said primary winding; and
- a rectifier circuit connected between said secondary winding and said two output terminals.

20. A method of operating an electronic converter according to claim 18, comprising:
- driving said high-side and said low-side electronic switches during the first and the second consecutive switching semi-period by:
  - once said first switching semi-period is started, opening said low-side electronic switch and closing said high-side electronic switch after the delay;
  - once said second switching semi-period is started, opening said high-side electronic switch and closing said low-side electronic switch after said delay; and
- in each of said first and said second switching semi-periods:
  - determining when the resonant current changes sign;
  - generating the first ramp signal and determining when said first ramp signal reaches the at least one reference threshold;
  - determining the first interval starting at the instant when the respective semi-period is started and ending at the instant when the resonant current changes sign;
  - determining the second interval starting at the instant when the resonant current changes sign and the instant when said first ramp signal reaches the respective reference threshold; and
  - modifying said first ramp signal provided at input to said comparison circuit such that said first ramp signal has the first gradient value during said first interval and the second gradient value during said second interval, said first gradient value being the non-zero value and the absolute value of said second gradient value being greater than the absolute value of said first gradient value; or
  - modifying one or more of the reference thresholds by adding the second ramp signal to the respective initial threshold value.

* * * * *